(12) United States Patent
Bogatin et al.

(10) Patent No.: US 12,432,393 B2
(45) Date of Patent: Sep. 30, 2025

(54) METHOD AND SYSTEM FOR PRE-POSITIONING AND POST POSITIONING CONTENT IN A CONTENT DISTRIBUTION SYSTEM

(71) Applicant: Siden, Inc., New York, NY (US)

(72) Inventors: Boris Bogatin, Glenside, PA (US); Christian Saide, Charleston, SC (US); Narayan Parappil Menon, Syosset, NY (US)

(73) Assignee: Siden, Inc., New York, NY (US)

( * ) Notice: Subject to any disclaimer, the term of this patent is extended or adjusted under 35 U.S.C. 154(b) by 232 days.

(21) Appl. No.: 17/827,881

(22) Filed: May 30, 2022

(65) Prior Publication Data

US 2022/0400295 A1 Dec. 15, 2022

Related U.S. Application Data

(63) Continuation-in-part of application No. 17/353,989, filed on Jun. 22, 2021.
(Continued)

(51) Int. Cl.
*H04N 21/218* (2011.01)
*H04N 21/231* (2011.01)
(Continued)

(52) U.S. Cl.
CPC ... *H04N 21/2181* (2013.01); *H04N 21/23106* (2013.01); *H04N 21/238* (2013.01); *H04N 21/26216* (2013.01); *H04N 21/26258* (2013.01)

(58) Field of Classification Search
CPC ............. H04N 21/2181; H04N 21/238; H04N 21/26258; H04N 21/26216; H04N 21/23106
See application file for complete search history.

(56) References Cited

U.S. PATENT DOCUMENTS 5,652,759 A 7/1997 Stringfellow, Jr.
9,407,355 B1 * 8/2016 Lerner ................ H04L 49/9057
(Continued)

FOREIGN PATENT DOCUMENTS

CN 1984118 A 6/2007
CN 105391516 A 3/2016
(Continued)

OTHER PUBLICATIONS

International Search Report and Written Opinion dated Mar. 14, 2023 in corresponding PCT Application No. PCT/US2022/046640.
(Continued)

*Primary Examiner* — Pinkal R Chokshi
(74) *Attorney, Agent, or Firm* — Harness, Dickey & Pierce, P.L.C.

(57) ABSTRACT

A system and method of operating a content distribution system includes generating a first request for first content by a first user device. Based on the first request for the first content, the first content is pre-positioned by communicating the first content to a downstream storage device closer to a second user device without communicating the first content to the first user device using the downstream storage device; and storing the first content in the downstream storage device as pre-positioned content. The method further includes communicating the first content to the second user device from the downstream storage device.

114 Claims, 23 Drawing Sheets

Related U.S. Application Data

(60) Provisional application No. 63/195,129, filed on May 31, 2021.

(51) Int. Cl.
*H04N 21/238* (2011.01)
*H04N 21/262* (2011.01)

(56) References Cited

U.S. PATENT DOCUMENTS

| | | | |
|---|---|---|---|
| 9,456,247 | B1 | 9/2016 | Pontual et al. |
| 10,433,022 | B2 | 10/2019 | Norin et al. |
| 2004/0064325 | A1 | 4/2004 | Syed et al. |
| 2007/0002871 | A1 | 1/2007 | Pekonen et al. |
| 2007/0094023 | A1 | 4/2007 | Gallino et al. |
| 2008/0244657 | A1 | 10/2008 | Arsenault et al. |
| 2008/0273591 | A1 | 11/2008 | Brooks et al. |
| 2009/0040957 | A1 | 2/2009 | Anschutz |
| 2010/0023972 | A1 | 1/2010 | Summers et al. |
| 2011/0044227 | A1 | 2/2011 | Harrang et al. |
| 2011/0059706 | A1 | 3/2011 | Harel et al. |
| 2011/0289126 | A1* | 11/2011 | Aikas ............ G06F 16/172 707/827 |
| 2012/0131622 | A1* | 5/2012 | McDysan ........ H04N 21/6405 725/95 |
| 2012/0278898 | A1* | 11/2012 | Nguyen ............ H04L 63/107 726/27 |
| 2013/0018978 | A1* | 1/2013 | Crowe ............ H04L 67/2885 709/214 |
| 2013/0066936 | A1 | 3/2013 | Krishnan et al. |
| 2013/0254815 | A1 | 9/2013 | Pfeffer et al. |
| 2014/0095307 | A1* | 4/2014 | Dodson ............ G06Q 30/0255 705/14.53 |
| 2014/0149533 | A1* | 5/2014 | Bergman ........... H04N 21/231 709/213 |
| 2014/0280996 | A1* | 9/2014 | Harrang ............ H04L 65/612 709/229 |
| 2014/0334318 | A1 | 11/2014 | Pica et al. |
| 2016/0028448 | A1 | 1/2016 | Park et al. |
| 2016/0360255 | A1 | 12/2016 | Pontual et al. |
| 2018/0138958 | A1 | 5/2018 | Asplund et al. |
| 2018/0139508 | A1* | 5/2018 | Norin ............ H04N 21/2365 |
| 2019/0098343 | A1* | 3/2019 | Knecht ............ H04N 21/8456 |
| 2019/0223029 | A1 | 7/2019 | Clarke et al. |
| 2019/0273801 | A1 | 9/2019 | Luft |
| 2020/0037035 | A1 | 1/2020 | Kaufman et al. |
| 2020/0092601 | A1* | 3/2020 | Bhattacharjee .... H04N 21/4335 |
| 2020/0186847 | A1* | 6/2020 | Warshavsky ........ H04L 65/611 |
| 2020/0195745 | A1 | 6/2020 | Demsey |
| 2020/0243985 | A1 | 7/2020 | Petersson et al. |
| 2020/0296155 | A1 | 9/2020 | McGrath et al. |
| 2020/0328804 | A1 | 10/2020 | Xu et al. |
| 2020/0358646 | A1 | 11/2020 | Lincoln et al. |
| 2020/0374713 | A1 | 11/2020 | Bogatin et al. |
| 2021/0067814 | A1 | 3/2021 | Bogatin et al. |
| 2021/0098873 | A1 | 4/2021 | Veysoglu et al. |
| 2021/0099749 | A1 | 4/2021 | Bogatin et al. |
| 2021/0127167 | A1 | 4/2021 | Kaufman et al. |
| 2022/0060765 | A1* | 2/2022 | Pfeifer ............ H04L 67/5681 |
| 2022/0239971 | A1* | 7/2022 | Bogatin ........... H04W 4/06 |
| 2023/0308733 | A1* | 9/2023 | Gangakhedkar ... H04N 21/2393 |

FOREIGN PATENT DOCUMENTS

| | | |
|---|---|---|
| EP | 1030465 A1 | 8/2000 |
| EP | 3456083 B1 | 3/2020 |
| JP | 2001-313599 A | 11/2001 |
| JP | 2002-152153 A | 5/2002 |
| JP | 2003-169363 A | 6/2003 |
| JP | 2010-027004 A | 2/2010 |
| JP | 2015-532033 A | 11/2015 |
| KR | 2011-0093993 A | 8/2011 |
| WO | WO-03058967 A1 | 7/2003 |
| WO | WO-2011/139305 A1 | 11/2011 |
| WO | WO-2013103828 A1 | 7/2013 |
| WO | WO-2018/001897 A1 | 1/2018 |

OTHER PUBLICATIONS

International Search Report and Written Opinion dated Aug. 1, 2022 in corresponding PCT Application No. PCT/US2022/028725.
International Search Report dated Nov. 4, 2022 in corresponding PCT Application No. PCT/US2022/037896.
Chinese Office Action dated Apr. 3, 2020 in corresponding Chinese Application No. 2017800705362.
Datami website; http://www.datami.com/; 9 pages.
International Search Report and Written Opinion dated Mar. 21, 2022 in corresponding PCT Application No. PCT/US2021/053154.
International Search Report and Written Opinion dated Jul. 17, 2020 in corresponding PCT/US2020/034247.
International Search Report and Written Opinion dated Dec. 9, 2020 in corresponding PCT Application No. PCT/US2020/053313.
International Search Report and Written Opinion dated Apr. 21, 2022 in corresponding PCT Application No. PCT/US2022/013293.
International Search Report and Written Opinion mailed Jun. 21, 2022, in corresponding International Application No. PCT/US2022/021306.
International Search Report dated Feb. 3, 2022 in corresponding PCT Application No. PCT/2021/055714.
Interntional Search Report dated Oct. 21, 2021 in corresponding PCT Application No. PCT/US2021/041116.
Japanese Office Action dated Dec. 1, 2020 in corresponding Japanese Application No. 2019- 547232.
Non-Final Office Action regarding U.S. Appl. No. 15/811,958 dated Oct. 10, 2018.
Notice of Allowance regarding U.S. Appl. No. 15/811,958 dated May 22, 2019.
Partial International Search Report for corresponding PCT/US2017/061760, Mar. 20, 2018, 13 pages.
Pixeom website; https://pixeom.com/; 10 pages.
Requirement for Restriction Election regarding U.S. Appl. No. 15/811,958 dated Jun. 7, 2018.
Yao Jingjing et al., "On Mobile Edge Caching", IEEE Communications Surveys & Tutorials, vol. 21, No. 3, Mar. 29, 2019, pp. 2525-2553.
Symeon Chatzinotas et al., "Cellular-Broadcast Service Convergence through Caching for COMP Cloud RANs", Arxiv. Org, Cornell University Library, 201 Olin Library Cornell University Ithaca, NY 14853, Apr. 30, 2015.
International Search Report and Written Opinion dated Aug. 19, 2022 in corresponding PCT Application No. PCT/US2022/031517.

* cited by examiner

| SEGMENT | BIT RATE | | PRIORITY |
|---|---|---|---|
| 1 | A | URL 12345 | 1 |
| | B | URL 12346 | 3 |
| | C | URL 12347 | 2 |
| | D | URL 12348 | 4 |
| 2 | A | URL 12349 | 1 |
| | B | URL 12350 | 4 |
| | C | URL 12351 | 5 |
| | D | URL 12352 | 6 |
| 3 | A | URL 12353 | 2 |
| | B | URL 12354 | 1 |
| | C | URL 12355 | 3 |
| | D | URL 12356 | 2 |

FIG. 6

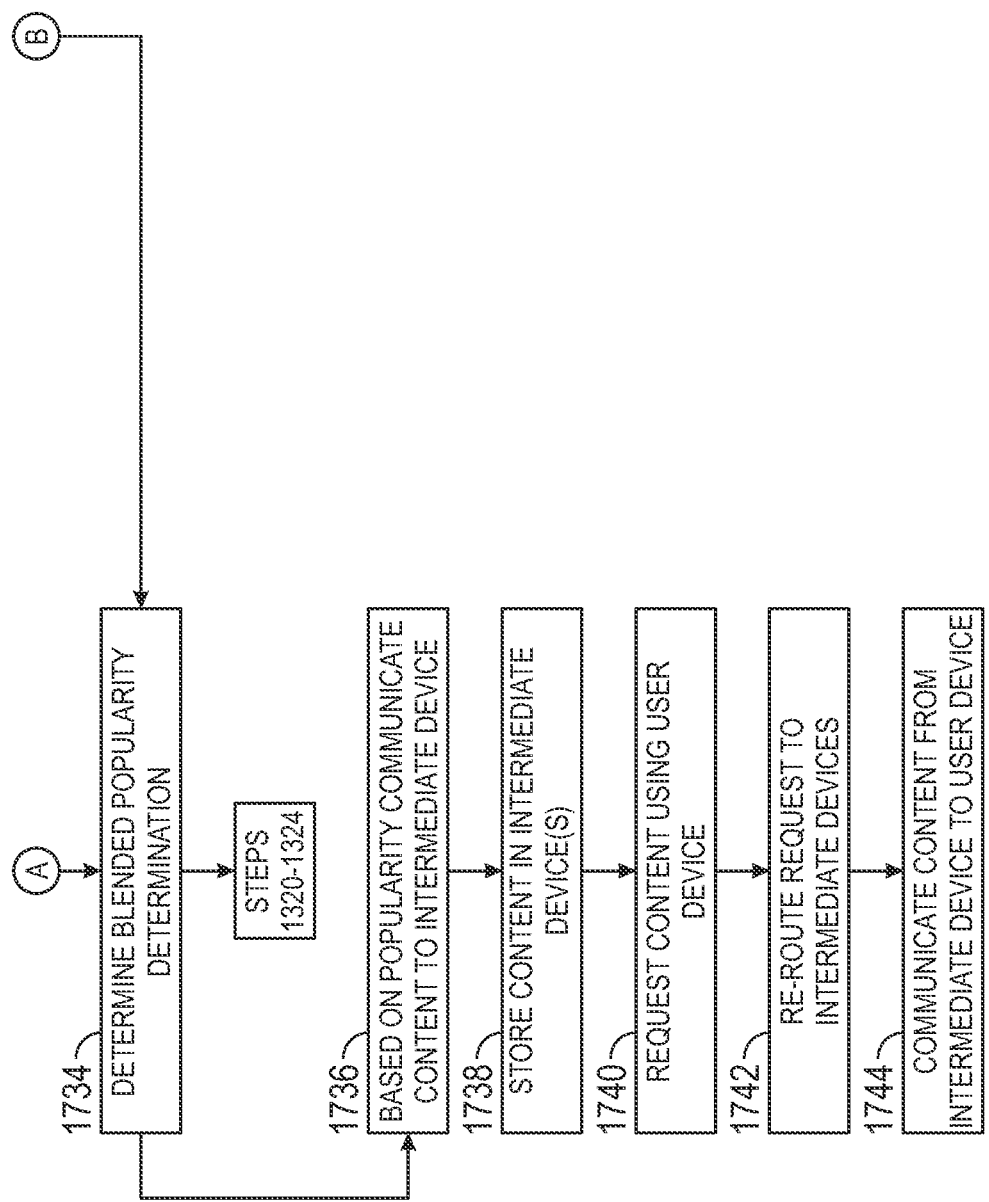

METHOD AND SYSTEM FOR PRE-POSITIONING AND POST POSITIONING CONTENT IN A CONTENT DISTRIBUTION SYSTEM

CROSS-REFERENCE TO RELATED APPLICATIONS

This is a continuation-in-part of U.S. Ser. No. 17/353,989, filed Jun. 22, 2021 and claims priority to provisional application 63/195,129 filed on May 31, 2021, the disclosures of which are incorporated by reference herein. This application incorporates by reference herein the entire disclosures of provisional applications, 63/051,582, filed on Jul. 14, 2020, U.S. Ser. No. 63/050,699, filed on Jul. 10, 2020, U.S. Ser. No. 17/580,817, filed on Jan. 21, 2022, U.S. Ser. No. 17/700,436, filed on Mar. 21, 2022, U.S. Ser. No. 17/741,301, filed on May 10, 2022, U.S. Ser. No. 17/095,686, filed on Nov. 11, 2020, U.S. Ser. No. 16/588,763, filed Sep. 30, 2019, U.S. Ser. No. 17/489,912, filed on Sep. 30, 2021, and U.S. Pat. No. 10,433,022, issued on Oct. 1, 2019.

TECHNICAL FIELD

The present disclosure relates generally to content distribution systems and, more specifically, to a method and system for pre-positioning and post positioning content in various locations within the network.

BACKGROUND

The statements in this section merely provide background information related to the present disclosure and may not constitute prior art.

The provisioning of increasingly higher speed wireless data connectivity has been the focus of wireless carrier infrastructure growth for several decades and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e., TVs, laptops), is placing a requirement on wireless networks to accommodate a markedly higher level of capacity for handling this exploding video data traffic demand over wireless networks.

Content Distribution Networks (CDNs) play a crucial role in today's Internet, in facilitating the placement of content close to clients (users) making requests to consume them. By doing this, CDNs reduce content access (download, streaming) times for the end user, and improve the user's quality of experience as a result. The additional benefit is that repeated requests for the same content do not require content fetching from deep within the network, consequently taxing network capacity (and potential bottlenecks in the network) a lot less. As a result, CDNs have been influential in addressing performance issues that have arisen as a result of the rapid growth of the Web.

Classically, two approaches have been used for placing content in proximal locations to user consumption requests: post-positioning and pre-positioning.

SUMMARY

The present disclosure provides a system and method for strategically using storage devices strategically to reduce system resources in providing content to users.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes generating a first request for first content by a first user device. The method also includes based on the first request for the first content, pre-positioning the first content by, communicating the first content to a downstream storage device closer to a second user device without communicating the first content to the first user device using the downstream storage device, and storing the first content in the downstream storage device as pre-positioned content, and communicating the first content to the second user device from the downstream storage device. Other embodiments of this aspect include corresponding computer systems, apparatus, and computer programs recorded on one or more computer storage devices, each configured to perform the actions of the methods.

Implementations may include one or more of the following features. The method where communicating the first content to the second user device from the downstream storage device may include communicating in response to the second user device generating a second request, communicating the first content to the downstream storage device may include communicating the first content to the downstream storage device closer to the second user device using dormant capacity, communicating the first content to the downstream storage device may include communicating the first content to an intermediate storage device, communicating the first content to the downstream storage device may include communicating the first content to an intermediate storage device using dormant capacity, communicating the first content to the downstream storage device may include communicating the first content to a plurality of intermediate storage devices at least one of which is closer to the second user device, communicating the first content to the downstream storage device may include communicating the first content to a plurality of intermediate storage devices at least one of which is closer to the second user device using dormant capacity, communicating the first content to the downstream storage device may include communicating the first content to a plurality of downstream storage devices closer to a plurality of user devices including the second user device, communicating the first content to the downstream storage device may include communicating the first content to a plurality of downstream storage devices closer to a plurality of user devices including the second user device using dormant capacity, communicating the first content to the downstream storage device may include communicating the first content to a plurality of downstream storage devices closer to a plurality of user devices including the second user device and communicating the first content to an intermediate device closer to the second user device, communicating the first content to the downstream storage device may include communicating the first content to a plurality of downstream storage devices closer to a plurality of user devices including the second user device and communicating the first content to a plurality of intermediate devices at least one of which is closer to the second user device, communicating the first content to the downstream storage device may include communicating the first content to a plurality of downstream storage devices closer to a plurality of user devices including the second user device using dormant capacity and communicating the first content to an intermediate device closer to the second user device using the dormant capacity, communicating the first content to the downstream storage device may include communicating the first content to a plurality of downstream storage devices closer to a plurality of user devices including the second user device using dormant capacity and communicating the first content to a plurality of intermediate devices at least one of which is closer to the second user device using the dormant capacity, communicating the first content to the downstream storage device may include communicating the first content to a plurality of downstream storage devices closer to a plurality of user devices including the second user device using broadcasting, communicating the first content to the downstream storage device may include communicating the first content to a plurality of downstream storage devices closer to a plurality of user devices including the second user device using unicasting, communicating the first content to the downstream storage device may include communicating the first content to a plurality of downstream storage devices closer to a plurality of user devices including the second user device using broadcasting and unicasting, communicating the first content to the downstream storage device may include communicating the first content to a plurality of downstream storage devices closer to a plurality of user devices including the second user device using broadcasting, unicasting or both based on a content priority. The method may include determining the content priority for the first content based on at least one of a wish list or a content timeliness indicator. The method may include determining the content priority based on at least one of content popularity, a likelihood of content consumption, consumption profiles, and viewing patterns of a plurality of devices in a service area, communicating the first content to downstream storage device may include communicating the first content to a plurality of downstream storage devices closer to a plurality of user devices including the second user device using broadcasting, unicasting or both based on radio conditions at the downstream storage devices, communicating the first content to the downstream storage device may include communicating the first content to a plurality of downstream storage devices closer to a plurality of user devices including the second user device using broadcasting, unicasting or both based on available network capacity available for pre-positioning. The method may include discovering from the first request a presence of the first content within a content distribution network. The method may include determining from the first request for the first content an origin uniform resource locator of the first content. The method may include discovering from the first request a presence of the first content within a content distribution network and a uniform resource locator of the first content and communicating the first content to the downstream storage device may include communicating the first content based on discovering the presence of the first content and the uniform resource locator of the first content. The first content may include at least one of a manifest file, a folder, a playlist or a set of manifests. The method may include determining from the first request for the first content, second content based on the first content, and pre-positioning the second content by, communicating the second content to the downstream storage device closer to the second user device, storing the second content in the downstream storage device as pre-positioned content, and communicating the second content to the second user device from the downstream storage device. The second content may include at least one of a manifest file, a folder, a playlist and a set of manifests. The method may include determining a second content from an origin uniform resource locator of the first content, and thereafter pre-positioning the second content by communicating the second content to the downstream storage device closer to the second user device, storing the second content in the downstream storage device as pre-positioned content, and communicating the second content to the second user device from the downstream storage device. The method may include determining a second content from the first request for the first content, said first content may include the second content, and pre-positioning the second content by, communicating the second content to the downstream storage device closer to the second user device, storing the second content in the downstream storage device as pre-positioned content, and communicating the second content to the second user device from the downstream storage device. The method may include determining a second content from the first request for the first content, said second content may include the first content, and may include pre-positioning the second content by communicating the second content to the downstream storage device closer to the second user device, storing the second content in the downstream storage device as pre-positioned content, and communicating the second content to the second user device from the downstream storage device. The first content is less than 10 percent of the second content. The first content are first bytes of the second content. The first content are first bytes of the second content. The method may include determining a plurality of content segments in the first content and URL identifiers for each segment of the plurality of content segments from the first request for the first content, and thereafter pre-positioning at least one of the plurality of content segments based on the URL identifiers by communicating the at least one of the plurality of content segments to the downstream storage device closer to the second user device, storing the at least one of plurality of content segments in the downstream storage device as pre-positioned content, and communicating the at least one of plurality of content segments to the second user device from the downstream storage device, communicating the first content to the downstream storage device may include communicating the first content to an edge cache, communicating the first content to the downstream storage device may include communicating the first content to an edge cache disposed in a base station, a cell tower or a wireless network system component. The method may include determining a second content from the first content, said second content related to the first content, and thereafter pre-positioning the second content by, communicating the second content to the downstream storage device closer to the second user device, storing the second content in the downstream storage device as pre-positioned content, and communicating the second content to the second user device from the downstream storage device. Determining the second content may include determining the second content using collaborative filtering. After communicating the first content to the downstream storage device, communicating the second content to the downstream storage device based on the first content. The method may include determining a popularity of the first content and communicating the first content to the downstream storage device in response to the popularity. Determining the popularity of the first content may include comparing a request rate for the first content from a second request or a plurality of further requests to a first threshold and, when the request rate is greater than the first threshold, communicating the first content to the downstream storage device. Determining the popularity of the first content may include learning of the popularity of the first content from a content provider system or an external source. Determining the popularity of the first content may include learning of a timeliness of the popularity of the first content from a content provider system or an external source. Determining the popularity of the first content may include comparing a request rate for the first content from a plurality of requests at an edge cache to a request rate threshold and, when the request rate to the edge cache is greater than the request rate threshold, communicating the first content to the downstream storage device. Determining the popularity of the first content may include combining at least two of a network cache request rate for the first content and a plurality of edge cache request rates for the first content, to form a blended request rate for the first content and comparing the blended request rate to a request rate threshold and, when the blended request rate is greater than the request rate threshold, communicating the first content to the downstream storage device. Determining the popularity of the first content may include comparing a downstream storage device request rate for a plurality of downstream storage devices to a second threshold and, when the downstream storage device request rate is greater than the second threshold, communicating the first content to the downstream storage device. The method may include determining the popularity of the first content may include comparing a consumption rate for the first content from a first user device to a consumption rate threshold and, when the consumption rate is greater the consumption rate threshold, communicating the first content to the downstream storage device. Determining the popularity of the first content may include comparing the past history change value to a past history change threshold and, when the past history change value is less than the past history change threshold, communicating the first content to the downstream storage device. The method may include determining the popularity of the first content and timing of the popularity and communicating the first content to the downstream storage device in response to a popularity and a timing of the popularity. The method may include determining the popularity for the first content within a first group of devices and communicating the first content to downstream storage devices closer to a second group of devices based on collaborative filtering of the second group of devices based on a plurality of requests for the first content from the first group of devices. The method may include determining a demand for the first content within a first group of devices and communicating the first content to downstream storage devices closer to a second group of devices in response to the demand for the first content within the first group of devices and a timing of the demand, communicating the first content to the downstream storage device may include communicating second content segments of the first content to downstream storage devices closer to a second group of devices in response to the popularity of the first content segments within the first user device or the first group of devices. The method may include pre-positioning the first content in downstream storage devices closer to the first user device or the first group of user devices with second content segments in response to the popularity of the first content segments within the first user device or the first group of devices. The content distribution system is programmed to pre-position the first content in downstream storage devices closer to the first user device or the first group of user devices with second content segments in response to the popularity of the first content segments within the first user device or the first group of devices, communicating the first content to the downstream storage device may include communicating second content segments of the first content to downstream storage devices closer to a second group of devices in response to the popularity and a timing of the popularity of the first content segments within the first group of devices. The method may include pre-positioning the first content in downstream storage devices closer to the first user device or the first group of user devices with the second content segments in response to the timing of the popularity of the first content segments within the first user device or the first group of devices. The method may include determining a popularity of first content at the first user device or within a first group of devices and may include communicating second content to the downstream storage device closer to a second group of devices in response to the popularity of the first content within the first user device or the first group of devices. The method may include pre-positioning the second content in downstream storage devices closer to the first user device or the first group of user devices in response to the popularity of the first content within the first user device or the first group of devices. The method may include determining a popularity of first content at the first user device or within a first group of devices and may include communicating second content to the downstream storage device closer to a second group of devices in response to a timing of the popularity of the first content within the first group of devices. The method may include pre-positioning the first content in downstream storage devices closer to the first user device or the first group of user devices with the second content in response to the timing of the popularity of the first content within the first user device or the first group of devices. The method may include determining a popularity of live content watched by a first group of user devices as individual streams and communicating the live content to the second user device or a plurality of user devices based on popularity and collaborative filtering. The method further method may include determining a popularity of live content watched by a first group of user devices as individual streams and communicating the live content to the second user device or a plurality of user devices may include comparing a number of users in the first group and based on a threshold of group of users and anticipated users, establishing a broadcast session. Implementations of the described techniques may include hardware, a method or process, or computer software on a computer-accessible medium.

One general aspect the system includes a first user device generating a first request for first content. The system also includes a content distribution system, based on the first request for the first content, programmed to pre-position the first content by being programmed to communicate the first content to a downstream storage device closer to a second user device without communicating the first content to the first user device using the downstream storage device, and store the first content in the downstream storage device as pre-positioned content, and said content distribution system programmed to communicate the first content to the second user device from the downstream storage device. Other embodiments of this aspect include corresponding computer systems, apparatus, and computer programs recorded on one or more computer storage devices, each configured to perform the actions of the methods.

Implementations may include one or more of the following features. The system where the content distribution system is programmed to communicate the first content to the second user device in response to the second user device generating a second request. The content distribution system is programmed to communicate the first content to the downstream storage device closer to the second user device using dormant capacity. The content distribution system is programmed to communicate the first content to an intermediate storage device. The content distribution system is programmed to communicate the first content to an intermediate storage device using dormant capacity. The content distribution system is programmed to communicate the first content to a plurality of intermediate storage devices at least one of which is closer to the second user device. The content distribution system is programmed to communicate the first content to a plurality of intermediate storage devices at least one of which is closer to the second user device using dormant capacity. The content distribution system is programmed to communicate the first content to a plurality of downstream storage devices closer to a plurality of user devices including the second user device. The content distribution system is programmed to communicate the first content to a plurality of downstream storage devices closer to a plurality of user devices including the second user device using dormant capacity. The content distribution system is programmed to communicate the first content to a plurality of downstream storage devices closer to a plurality of user devices including the second user device and communicate the first content to an intermediate device closer to the second user device. The content distribution system is programmed to communicate the first content to a plurality of downstream storage devices closer to a plurality of user devices including the second user device and programmed to communicate the first content to a plurality of intermediate devices at least one of which is closer to the second user device. The content distribution system is programmed to communicate the first content to a plurality of downstream storage devices closer to a plurality of user devices including the second user device using dormant capacity and programmed to communicate the first content to an intermediate device closer to the second user device using the dormant capacity. The content distribution system is programmed to communicate the first content to a plurality of downstream storage devices closer to a plurality of user devices including the second user device using dormant capacity and programmed to communicate the first content to a plurality of intermediate devices at least one of which is closer to the second user device using the dormant capacity. The content distribution system is programmed to communicate the first content to a plurality of downstream storage devices closer to a plurality of user devices including the second user device using broadcasting. The content distribution system is programmed to communicate the first content to a plurality of downstream storage devices closer to a plurality of user devices including the second user device using unicasting. The content distribution system is programmed to communicate the first content to a plurality of downstream storage devices closer to a plurality of user devices including the second user device using broadcasting and unicasting. The content distribution system is programmed to communicate the first content to a plurality of downstream storage devices closer to a plurality of user devices including the second user device using broadcasting, unicasting or both based on a content priority. The content distribution system is programmed to determine the content priority for the first content based on at least one of a wish list or a content timeliness indicator. The content distribution system is programmed to determine the content priority based on at least one of content popularity, a likelihood of content consumption, consumption profiles, and viewing patterns of a plurality of devices in a service area. The content distribution system is programmed to communicate the first content to a plurality of downstream storage devices closer to a plurality of user devices including the second user device using broadcasting, unicasting or both based on radio conditions at the downstream storage devices. The content distribution system is programmed to communicate the first content to a plurality of downstream storage devices closer to a plurality of user devices including the second user device using broadcasting, unicasting or both based on available network capacity available for pre-positioning. The content distribution system is programmed to discover from the first request a presence of the first content within a content distribution network. The content distribution system is programmed to determine from the first request for the first content an origin uniform resource locator of the first content. The content distribution system is programmed to discover from the first request a presence of the first content within a content distribution network and a uniform resource locator of the first content and programmed to communicate the first content to the downstream storage device based on discovering the presence of the first content and the uniform resource locator of the first content. The first content may include at least one of a manifest file, a folder, a playlist or a set of manifests. The content distribution system is programmed to determine from the first request for the first content, second content based on the first content, and programmed to pre-position the second content by being programmed to, communicate the second content to the downstream storage device closer to the second user device, store the second content in the downstream storage device as pre-positioned content, and communicate the second content to the second user device from the downstream storage device. The second content may include at least one of a manifest file, a folder, a playlist and a set of manifests. The content distribution system is programmed to determine a second content from an origin uniform resource locator of the first content, and programmed to pre-position the second content by being programmed to communicate the second content to the downstream storage device closer to the second user device, store the second content in the downstream storage device as pre-positioned content, and communicate the second content to the second user device from the downstream storage device. The content distribution system is programmed to determine a second content from the first request for the first content, said first content may include the second content, and programmed to pre-position the second content by being programmed to communicate the second content to the downstream storage device closer to the second user device, store the second content in the downstream storage device as pre-positioned content, and communicate the second content to the second user device from the downstream storage device. The content distribution system is programmed to determine a second content from the first request for the first content, said second content may include the first content, and programmed to pre-position the second content by being programmed to communicate the second content to the downstream storage device closer to the second user device, store the second content in the downstream storage device as pre-positioned content, and communicate the second content to the second user device from the downstream storage device. The first content is less than 10 percent of the second content. The content distribution system is programmed to determine a plurality of content segments in the first content and URL identifiers for each segment of the plurality of content segments from the first request for the first content, and programmed to pre-position at least one of the plurality of content segments based on the URL identifiers by being programmed to communicate the at least one of the plurality of content segments to the downstream storage device closer to the second user device, store the at least one of plurality of content segments in the downstream storage device as pre-positioned content, and communicate the at least one of plurality of content segments to the second user device from the downstream storage device. The content distribution system is programmed to communicate the first content to an edge cache. The content distribution system is programmed to communicate the first content to an edge cache disposed in a base station, a cell tower or a wireless network system component. The content distribution system is programmed to determine a second content from the first content, said second content related to the first content, and programmed to pre-positioning the second content by being programmed to communicate the second content to the downstream storage device closer to the second user device, store the second content in the downstream storage device as pre-positioned content, and communicate the second content to the second user device from the downstream storage device. The content distribution system is programmed to determine the second content using collaborative filtering. The content distribution system is programmed to communicate the second content to the downstream storage device based on the first content after communicating the first content to the downstream storage device. The content distribution system is programmed to determine a popularity of the first content and communicate the first content to the downstream storage device in response to the popularity. The content distribution system is programmed to determine the popularity of the first content by comparing a request rate for the first content from a second request or a plurality of further requests to a first threshold and programmed to communicating the first content to the downstream storage device. The content distribution system is programmed to determine the popularity of the first content by learning of the popularity of the first content from a content provider system or an external source. The content distribution system is programmed to determine the popularity of the first content by learning of a timeliness of the popularity of the first content from a content provider system or an external source. The content distribution system is programmed to determine the popularity of the first content by comparing a request rate for the first content from a plurality of requests at an edge cache to a request rate threshold and, communicate the first content to the downstream storage device when the request rate to the edge cache is greater than the request rate threshold. The content distribution system is programmed to determine the popularity of the first content by being programmed to combine at least two of a network cache request rate for the first content and a plurality of edge cache request rates for the first content, to form a blended request rate for the first content, and compare the blended request rate to a request rate threshold and, communicate the first content to the downstream storage device when the blended request rate is greater than the request rate threshold. The content distribution system is programmed to determine the popularity of the first content may include comparing a downstream storage device request rate for a plurality of downstream storage devices to a second threshold and programmed to communicate the first content to the downstream storage device when the downstream storage device request rate is greater the second threshold. The content distribution system is programmed to determine the popularity of the first content by comparing a consumption rate for the first content from a first user device to a consumption rate threshold and, programmed to communicating the first content to the downstream storage device when the consumption rate is greater the consumption rate threshold. The content distribution system is programmed to determine a past history change value and programmed to compare the past history change value to a past history change threshold and, programmed to communicate the first content to the downstream storage device when the past history change value is less than the past history change threshold. The content distribution system is programmed to determine the popularity of the first content and timing of the popularity and programmed to communicate the first content to the downstream storage device in response to a popularity and a timing of the popularity. The content distribution system is programmed to determine the popularity for the first content within a first group of devices and programmed to communicate the first content to downstream storage devices closer to a second group of devices based on collaborative filtering of the second group of devices based on a plurality of requests for the first content from the first group of devices. The content distribution system is programmed to determine a demand for the first content within a first group of devices and programmed to communicate the first content to downstream storage devices closer to a second group of devices in response to the demand for the first content within the first group of devices and a timing of the demand. The content distribution system is programmed to determine a popularity of first content segments of the first content at the first user device or within a first group of devices and programmed to communicate second content segments of the first content to downstream storage devices closer to a second group of devices in response to the popularity of the first content segments within the first user device or the first group of devices. The content distribution system is programmed to determine a popularity of first content segments of the first content at the first user device or within a first group of devices and programmed to communicate second content segments of the first content to downstream storage devices closer to a second group of devices in response to the popularity and a timing of the popularity of the first content segments within the first group of devices. The content distribution system is programmed to pre-position the first content in downstream storage devices closer to the first user device or the first group of user devices with the second content segments in response to the timing of the popularity of the first content segments within the first user device or the first group of devices. The content distribution system is programmed to determine a popularity of first content at the first user device or within a first group of devices and programmed to communicate second content to the downstream storage device closer to a second group of devices in response to the popularity of the first content within the first user device or the first group of devices. The content distribution system is programmed to pre-position the second content in downstream storage devices closer to the first user device or the first group of user devices in response to the popularity of the first content within the first user device or the first group of devices. The content distribution system is programmed to determine a popularity of first content at the first user device or within a first group of devices and further programmed to communicate second content to the downstream storage device closer to a second group of devices in response to a timing of the popularity of the first content within the first group of devices. The content distribution system is programmed to pre-position the first content in downstream storage devices closer to the first user device or the first group of user devices with the second content in response to the timing of the popularity of the first content within the first user device or the first group of devices. The content distribution system is programmed to determine a popularity of live content watched by a first group of user devices as individual streams and communicating the live content to the second user device or a plurality of user devices based on popularity and collaborative filtering. The content distribution system is programmed to determine a popularity of live content watched by a first group of user devices as individual streams and communicate the live content to the second user device or a plurality of user devices by comparing a number of users in the first group and based on a threshold of group of users and anticipated users and programmed to establish a broadcast session. Implementations of the described techniques may include hardware, a method or process, or computer software on a computer-accessible medium.

Further areas of applicability will become apparent from the description provided herein. The description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a diagrammatic view of a manifest.

FIGS. 17A and 17B are a continuous flowchart of a method for pre-positioning content in an intermediate storage device.

DETAILED DESCRIPTION

Figure 1:
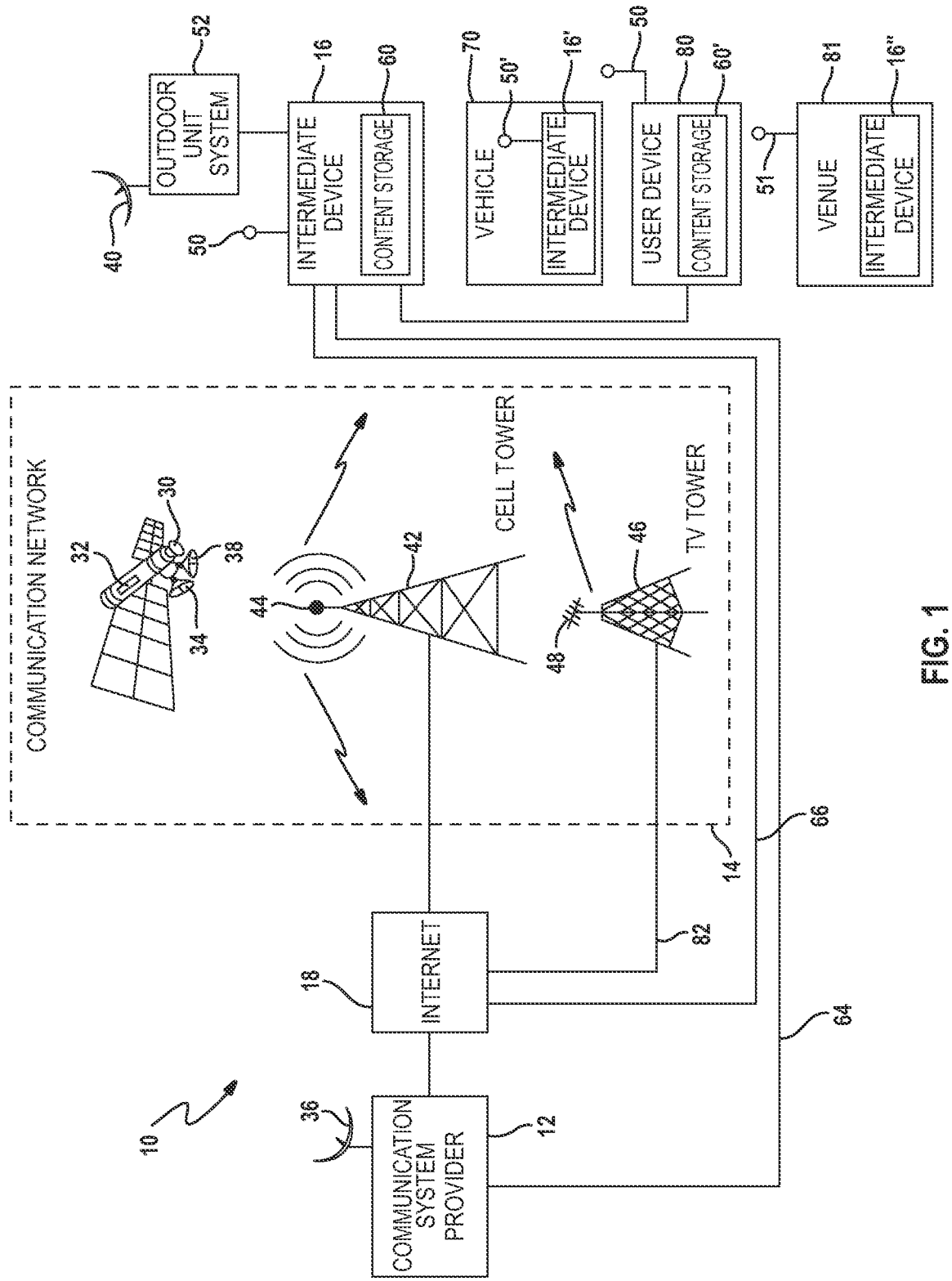
FIG. 1 is a high-level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that is programmed to perform instructions (instruction signals) to carry out the steps performed by the various system components. A content or service provider is also described. A content or service provider is a provider of data to the end user. The service provider, for example, may provide data corresponding to the content such as metadata as well as the actual content in a data stream or signal. The content distribution system, service provider and end user devices may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media data and content type, for example, audio, music, data files, web pages, advertising, software, software updates, IoT data, weather, application, application data, "best of web" content, e-delivery of materials, etc. Additionally, throughout this disclosure reference is made to data, content, information, programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and network systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point distribution system (MMDS), Local Multi-point distribution system (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider, user devices and intermediate devices as described below can be reallocated as desired without departing from the intended scope of the present disclosure.

User devices and intermediate devices may be coupled to the Internet through a constrained network or not even coupled to the Internet at all. In a constrained network, the speed or available resources may not be sufficient to provide a quality level of service. In the present examples, dormant capacity of the constrained network or a second less constrained network may be used to pre-position content at an intermediate device or a user device. The pre-positioned content may then be provided from the intermediate device storage directly or through a second communication network (i.e., local network) when demanded at the user device for real-time consumption, without having to rely on using the constrained network for that real-time consumption. The intermediate device may be located between the cellular network or other communication network and the user devices. In certain instances, the word "user" is used interchangeably with a device associated with a user (a user device) since each user has a user device associated therewith. The intermediate devices may also be referred a user device. That is, functions of the intermediate device such as storage for later content consumption may be incorporated into the user device.

Dormant capacity is a resource or a plurality of resources that are not being used for transmitting data or content by a content system provider during regular customer use. Capacity may refer to the amount of bandwidth or spectrum available. Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that can be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, dormant capacity may be the bandwidth not being used for voice or data content requested from users in real-time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real-time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost-effective content distribution. By utilizing the dormant capacity that would otherwise be wasted, the present system allows communication system providers to use it to offer other services to customers or to sell the capacity to others.

The dormant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use can be generated by simply broadcasting this content, instead of unicasting it, and by having some users use it for real-time consumption, and for the dormant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such dormant capacity can be used in-full for non-real-time consumption, by unicasting or broadcasting content using dormant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All of the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), likelihood of consumption, content most popular for most users (popularity or short-tail optimization), as well as the remainder of content may all be used in prioritizing within queues.

The present system provides a high-capacity broadcast delivery system or a targeted unicast delivery system for pre-positioning content, that combines the strategic use of excess capacity or dormant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the dormant capacity of a system over the same exact spectrum (in the case of spectrum re-use) as real-time consumption by broadcasting content to users including to those requesting it for real-time consumption and to others using the dormant spectrum capacity for pre-positioning, instead of just unicasting it to only the users requesting it for real-time consumption, or over dormant capacity left-over from non-peak-use of networks for real-time consumption, by unicasting or broadcasting content for pre-positioning. As will be further described below, the system may use dormant capacity of different types of communication systems including but not limited to mobile or cellular systems such as an LTE system, a satellite system or a digital television system. Content such as video content may be provided to an intermediate device, which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high-speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high-speed cable and fiber networks, or any of the aforementioned networks, to be alleviated by combining content delivery through pre-positioning using the dormant capacity and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of dormant capacity for pre-positioning of content and subsequent use from local content stores, and peak or regular capacity for serving users' real-time/live voice and data requests. If content that is likely to be consumed by the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, dormant capacity approach with a real-time voice and data request, peak or regular capacity approaches, lower speed broadband service providers may compete head-to-head with established cable or fiber providers while any of the aforementioned networks improve their performance such as net spectral efficiency) by leveraging such a combination of approaches.

It is also desired for a system to be able to serve users requests from a first user for real-time consumption, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the dormant broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the likelihood of consumption, the popularity of the content in the request, and the likelihood that the cost of serving those users using unicast transmissions at a future time will be greater than the cost of using a broadcast transmission vs a unicast transmission at the current time.

Further, such system could also include a mechanism for determining whether any given device should receive the dormant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the dormant broadcast transmission and store movie #1 for non-real-time consumption by the 63% of the users. In the future, some of the users whose devices stored movie #1 for non-real-time consumption, request to watch movie #1 at some future times, and movie #1 is served to them directly from their devices instead of using the network.

In the URL example, optimized usage of a multiplicity of resource types (storage, computing, networking), based on cost, performance and demand requirements is set forth. Traditionally, systems have looked at these resource types individually and one-dimensionally. For example, radio resource management focuses on optimal usage of RF resources based on service requirements, contentions between competing requirements and user Service Level Agreements (SLAs). Another individual resource typically considered is the management of fixed network resources, e.g., Software Defined Network (SDN) style approaches. Storage and compute management and cloud-based architectures have been considered individually.

In the present example a cohesive, a combinatorial use of such a diverse set of resources to facilitate cost-effective, performance-optimized delivery of content, based on user needs and demand patterns is provided.

While existing systems look to leverage in-network compute, storage and networking resources in a traditional cloud framework, this disclosure extends the concept to a "System as a Cloud" model—wherein resources (compute, storage and networking) can be interchangeably assigned and arbitraged across the entire system, including but not limited to the traditional cloud—processing and storage farms in the network core, wireless core network components and gateways, network edge nodes—such as base stations, access points/routers, small cells, cable edge boxes (e.g. CMTS), and the like, intermediate storage/caching devices, in the network or in the home or office, end user devices, e.g. smartphones, tablets, personal computers, and the like. This may include using the available storage of mobile devices as intermediate devices for non-real-time consumption, by applications of those mobile devices. This may also include using the available storage of the mobile devices for non-real-time consumption, by applications of other mobile devices completely separate from the first mobile devices. The present example determines, at any given time, the optimal combination of resources, across the entire system, to deliver content based on cost, performance (net spectral efficiency) and user demand considerations.

In the present system, wireless networking is used to enable orchestrated content distribution over a fabric of unicast and broadcast transmissions though one or more communication networks. A cohesive group of mechanisms is designed to enable optimal real-time and non-real-time content delivery, leveraging a continuum of broadcast and unicast delivery schemes in a coordinated manner, over any type of network available to the service provider. The system views any content transmission as a potential unicast or broadcast transmission and makes continual decisions on choice of transmission mode. The dynamic blending of unicast and broadcast deliveries creates a "breathing" apparatus, where the decision to broadcast or unicast a transmission is continually evaluated in view of various user device conditions and network conditions. Blending refers to determining the transmission modes of communication through which various devices receive content. The blend may be established as using all broadcast as the mode, all unicast as the mode or some devices using broadcast mode and some devices using unicast mode. Various conditions in the blend determination may be taken into consideration. The conditions include but are not limited to user device conditions and network conditions such as user behavior, actual consumption and likelihood of consumption or a content popularity metric, spectral efficiency of each transmission choice, available capacity in all accessible networks, network loading levels and the criticality of fulfilling real-time versus prepositioned requirements.

The content distribution system or distribution system leverages the right mix of devices using unicast mode and broadcast mode transmissions through the wireless network to cover communicating content to the user devices efficiently relative to the network loading (with optimal use of radio resources), while delivering an optimal quality of user experience.

The delivery set forth herein is performed for a variety of delivery and consumption scenarios. For example, content delivery may be performed for live streaming. Live streaming is when multiple users view (consume) the live stream in real-time (at the same time). Some devices may also receive the live stream as part of content pre-positioning or caching for future real-time consumption from the cached location. Real-time content delivery, e.g., audio and video streaming, with an opportunistic broadcast. Real-time consumption by one user, with content pre-positioning or caching for future real-time consumption for any of the rest of the users. One example is set forth in U.S. Pat. No. 1,115,705 and is entitled "Method and System for Providing Non-Real-Time Content Distribution Services," the disclosure of which is incorporated by reference herein. Other use cases are for non-real-time consumption scenarios where content is pre-positioned or cached for future real-time consumption by users.

At the same time, the distribution system uses the most suitable network to deliver its content through, taking into account the capabilities of the networks it has access to, and the cost of delivering through each network. All of this is done "over-the-top", i.e., at the content distribution layer, which works above the IP layer. In contrast to the more transport-layer schemes adopted by wireless networks, this approach enables the system to be cognizant of application/content level popularity, usage and delivery success characteristics. The distribution system is far more aware of aspects like the assets it is delivering, device consumption patterns with response to these assets, asset popularity levels, etc. than traditional broadcast functionalities that sit at the transport layer and are simply purveyors of this content.

By gathering performance (spectral efficiency) feedback or collecting radio metrics from devices, the distribution system is further able to adjust its decisions on delivery mode to be used (broadcast vs. unicast). For example, the broadcast mode may be enabled if the distribution system 10 determines there are sufficient participating devices experiencing radio conditions better than a radio quality threshold value (or simply threshold). Additional users can be pulled into the broadcast segment of an ongoing transmission if those devices exhibit radio conditions better than the radio quality threshold. In this manner, the system always selects the most spectrally efficient mode of delivery. One consideration in the selection of the most spectrally efficient mode is the consumption pattern. The consumption pattern may include how many user devices need something now, how many user devices are predicted to need the content in the future, and how much cache do they have to store the content.

Another performance consideration is spectral efficiency. A comparative spectral efficiency of delivering content via unicast or broadcast is performed. Further, a comparative spectral efficiency of delivering content using different blends of unicast and broadcast may also be performed using different proportions of available capacity for broadcast and unicast, and accommodating different sizes of user groups for broadcast and unicast. Lastly, the relative "rigidity" of unicast vs. broadcast in precluding support of real-time traffic in a sufficiently dynamic manner. Further details are provided below.

Referring now to FIG. 1, a high-level block diagrammatic view of a content distribution system 10 is set forth. In this example, a communication system provider 12 is a system that is in communication with a communication network 14 and controls the operation of the communication network 14. The communication network 14 is in communication with one or more intermediate devices such as an intermediate device 16. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of different networks or even different types of networks. That is, the network capacity of one or more networks may be combined deliver content to the intermediate device 16 or user device 80. The communication network 14 may be wireless. The communication network 14 for communicating content to the intermediate device 16 or user device 80 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16 or user device 80. The antennas 34, 36, 38 may represent multiple antennas or multiple types of antennas. The satellite components may be referred to as a satellite network.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television network comprising a television tower 46 having an antenna 48 thereon. The TV tower 46 may communicate content to the intermediate device 16 or user device 80 from the communication system provider 12.

The communication network 14 may communicate using real-time capacity, dormant capacity, or a combination of both as will be further described below. The dormant capacity may include various types of resources that are not being used for serving users' real-time/live voice and data requests and their real-time/live voice and data consumption, and that are more ideally used for pre-positioning of content to the intermediate device 16 or user device 80. As mentioned above, the communication network 14 may effectively distribute (pre-position) content on real-time or a non-real-time basis to the intermediate device 16 or user device 80, for subsequent consumption by users directly from the intermediate device 16 or user device 80 instead of from the communication network 14. The communication network 14 may use a combination of broadcasting and unicasting for communicating content for real-time use.

The communication network 14 may communicate with the local area network 310, which would in turn communicate the content to the intermediate device 16 or user device 80, or the intermediate device 16 or user device 80 directly, using various types of access systems so that a maximum amount of content may be provided to the various intermediate devices. or user device 80. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used. As mentioned above, functions of the intermediate device may be included in a user device and therefore the intermediate device may be referred to as a user device.

The intermediate device 16 or user device 80 may also have an antenna 50 disposed thereon. The antenna 50 may communicate with the antenna 44 and the antenna 48 of the communication network 14. By making the intermediate device portable, the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid-state content storage (memory), a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network, which, as demonstrated, is presented as wireless systems. The back haul network 64 may be a wireless network as well. Content storage 60' may also be incorporated into the user device 80.

The system 10 may be suitable for both prepositioning content and distributing in real-time live or stored content using a wired network 66 as well. That is, the intermediate device 16 or user device 80 may also be coupled to the Internet 18 through the wired network 66. Content may be prepositioned using the dormant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the satellite antenna 38, the antenna of the cell tower 42 and/or the antenna 48 of the TV tower.

The cell tower 42 may use LTE technology or other cellular technology. In particular, the cell tower 42 may use LTE-B technology to communicate with the intermediate device 16 or user device 80. A wired connection 82 may be disposed between the communication network 14 and the internet 18 and/or communication system provider 12. As will be described below, the intermediate device 16 may be part of the cell tower 42 and thus the antenna 44 may act as a Wi-Fi or WiMAX antenna for communicating with the user devices.

The connection between the communication network 14 and the internet 18 or the communication system provider 12 may also include dormant capacity. This dormant capacity may be utilized by the system in a similar way as the afore described dormant capacity, to distribute pre-positioned content to the communication network 14 or to the internet 18, for their in-turn distribution of the pre-positioned content, including using dormant capacity, to ultimately reach the intermediate device 16.

More than one of the systems and devices illustrated in FIG. 1 may be incorporated into a system. In fact, more than one system or device is likely whereby it encompasses a broad geographic area.

Figure 2:
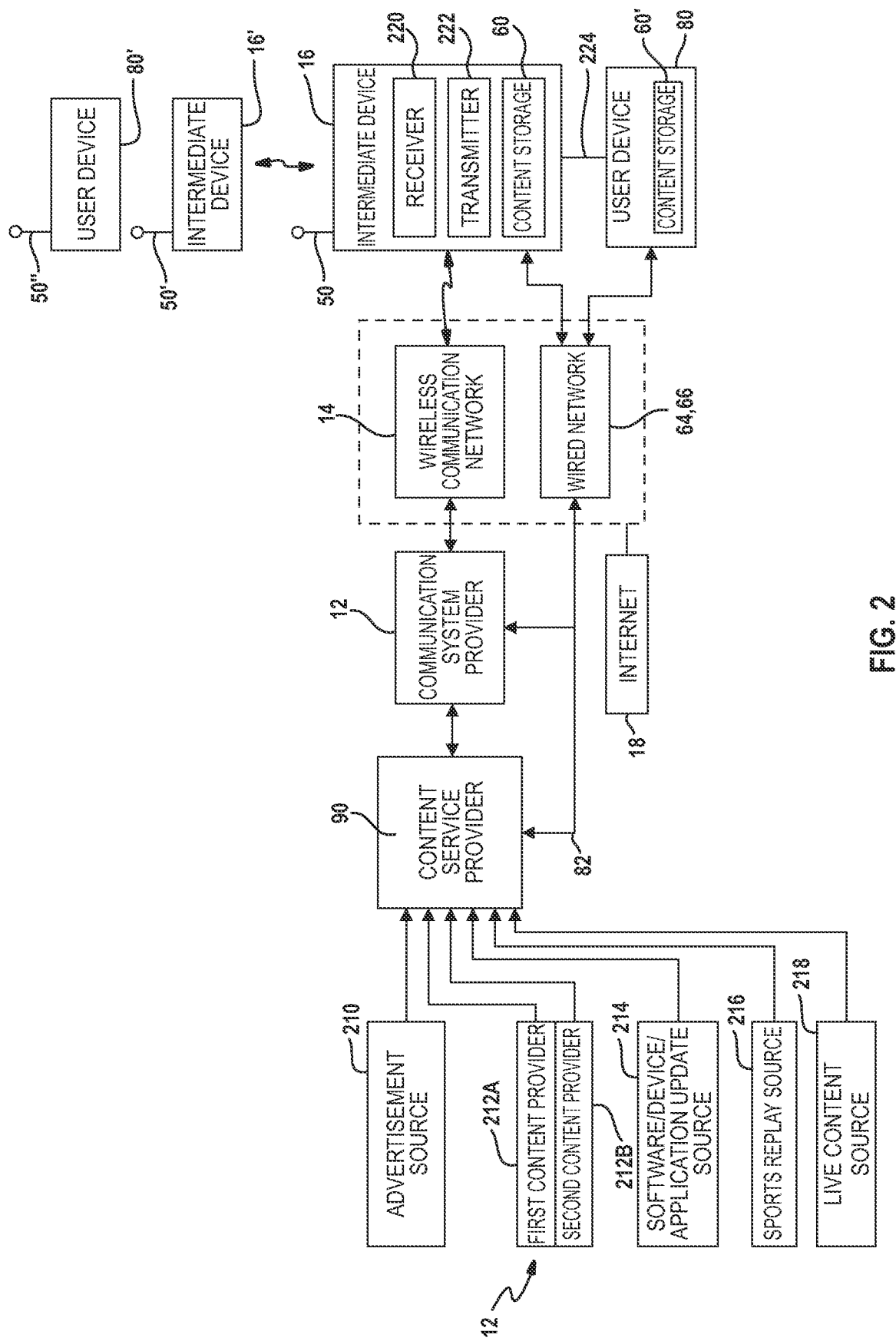
FIG. 2 is a block diagrammatic view of a more detailed communication system of FIG. 1.

Referring now to FIG. 2, the communication system provider 12 may be more than one entity. The communication system provider is shown in the first content provider 212A, the second content provider 212B communication with a content service provider 90. The content service provider 90 is a system that is used for providing content to the communication system provider 12. The content service provider 90 and the communication system provider 12 may be business entities. The content service provider 90 may purchase the dormant capacity of the communication system provider 12. The content service provider 90 may be a service provider that is subscribed to by the users of the user device 80. However, the content service provider 90 may include pre-existing services such as mobile phone service providers, cable providers, digital television providers and the like. The content service provider 90 communicates various instructions to the communication system provider 12 so that the content is distributed in a desirable way. In one example, stored content is communicated with bit rate data or metadata corresponding to the speed the content is recorded or to be played out so that the desired communication speed for real-time consumption is provided. By the communication system provider 12. Details of the intercommunication between the systems are described in further detail below.

The content service provider 90 may receive content from various sources including an advertisement source 210, the first content provider 212A, the second content provider 212B, a software/device/application update source 214, a sport replay source 216 and a live content source. The advertisement source 210 may communicate advertisements to the content service provider 90. The advertisements may include video, audio and metadata associated therewith. The metadata associated with an advertisement may include desired targets for which users would find the content desirable. Metadata may also include and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

A live content source 218 may also be included with in the system 10. The live content source 218 may provide live or real-time content that is broadcasted by the system. Real-time or live content may also be unicasted. The live content is communicated in a live content stream and has various characteristics including a playout bit rate. The live content stream may be played back or viewed in real-time at various user devices or intermediate devices. As will be described below, other devices may receive a unicast of the live content as well. Preferably, the content or stream can be communicated with at least the bit rate at playout. Details of a mix of broadcast and unicast for communicating content is described in detail below.

The content providers 212A, 212B, the sports replay source 216 and the live content source may also provide data or instructions to communicate certain content to specified devices. Metadata included with the various types of content described above allows the content to be distributed to the proper intermediate device, intermediate devices or user device 80 on the right schedule while accommodating any other content distribution priorities while using the dormant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16 or a direct or wired connection with the networks 14, 64,66. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network, which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content that are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and only be able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
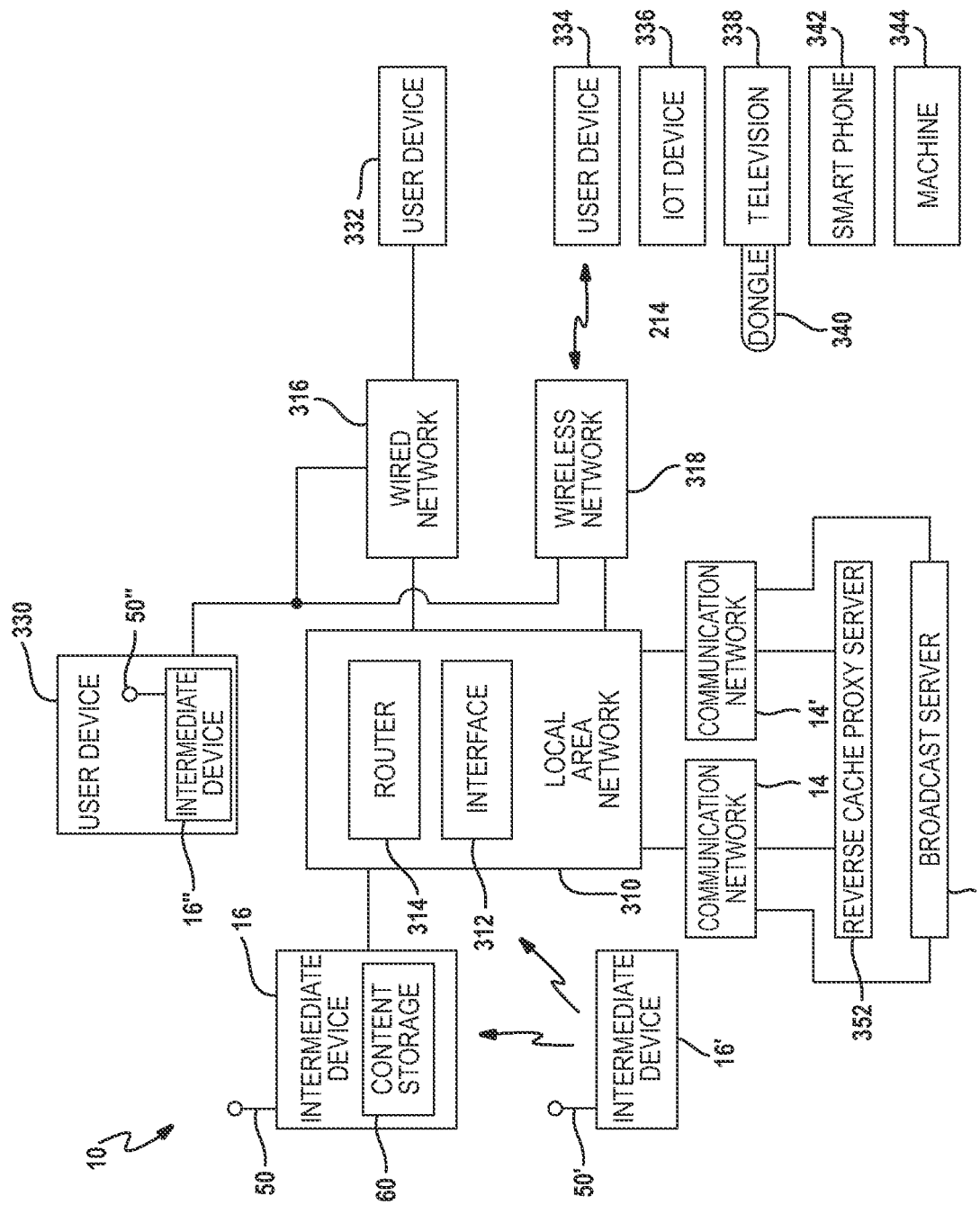
FIG. 3 is a block diagrammatic view of a plurality of user devices in a local area network.

Referring now to FIG. 3, the communication system provider 12 may be in communication with a local area network 310 through the communication networks 14, 14' as described above. Only the communication networks 14 and 14' are illustrated for simplicity even though more may be a part of a system. FIGS. 1 and 2 do not illustrate the local area network 310. The local area network 310 may have an interface 312 for communicating with the communication networks 14, 14'. The interface 312 may be a modem.

The local area network 310 may also be coupled to the second communication network 14'. The second network 14' may be the primary two-way connection to the Internet for the user devices 332-344. The second network 14' may represent dial-up or a digital subscriber line. As described in the examples set forth herein, the system 10 may be used to pre-position content in the intermediate device 16 or a user device 332-344. The supplementation of content is particularly useful when the second communication network 14' for providing regular internet service to the user devices 332-344 is slower than the speed of the communication network 14, although not necessarily. It is possible that the local area network 310 may not have a two-way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50" for communicating with the local area network 310. The intermediate device 16" may receive content using the dormant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like. The user device may be referred to later collectively as the user device 80.

An internet of things (IoT) device 336 may be coupled to the local area network 310 through the wireless or wired networks 316, 318. The IoT devices 336 may require software and application updates suitably delivered via dormant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 directly or from at least one of the intermediate devices 16, 16' and 16". The application for retrieving and serving content to the user devices 330-344 may be in the devices 330-344, in the intermediate device 16, in the local area network 310, in the router 314 or in the interface 312. The user devices may 330-344 may also have content storage incorporated therein. The integral storage may allow the user device to act as an intermediate device.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

A broadcast server 350 may be coupled to the communication networks 14, 14'. The broadcast server 350 may be used for broadcasting content to various user devices 80 and intermediate devices 16. The broadcast server 350 may broadcast content that is stored or provided by a content provider or source. The broadcast server 350 may also communicate content in real-time that is live. The broadcast server 350 is a network component that manages broadcast sessions across a multiplicity of networks. The distribution system may identify to the broadcast server the preferred network to be used for the broadcast with an identifier signal having a network identifier.

A reverse cache proxy server 352 is also in commute communication with the communication networks 14, 14'. The reverse cache proxy server 352 is described in further detail below. The reverse cache proxy server 352 caches content for efficient delivery to proximal users. The reverse cache proxy server 352 may be within or next to the wireless network, or elsewhere in the broader network.

Figure 4:
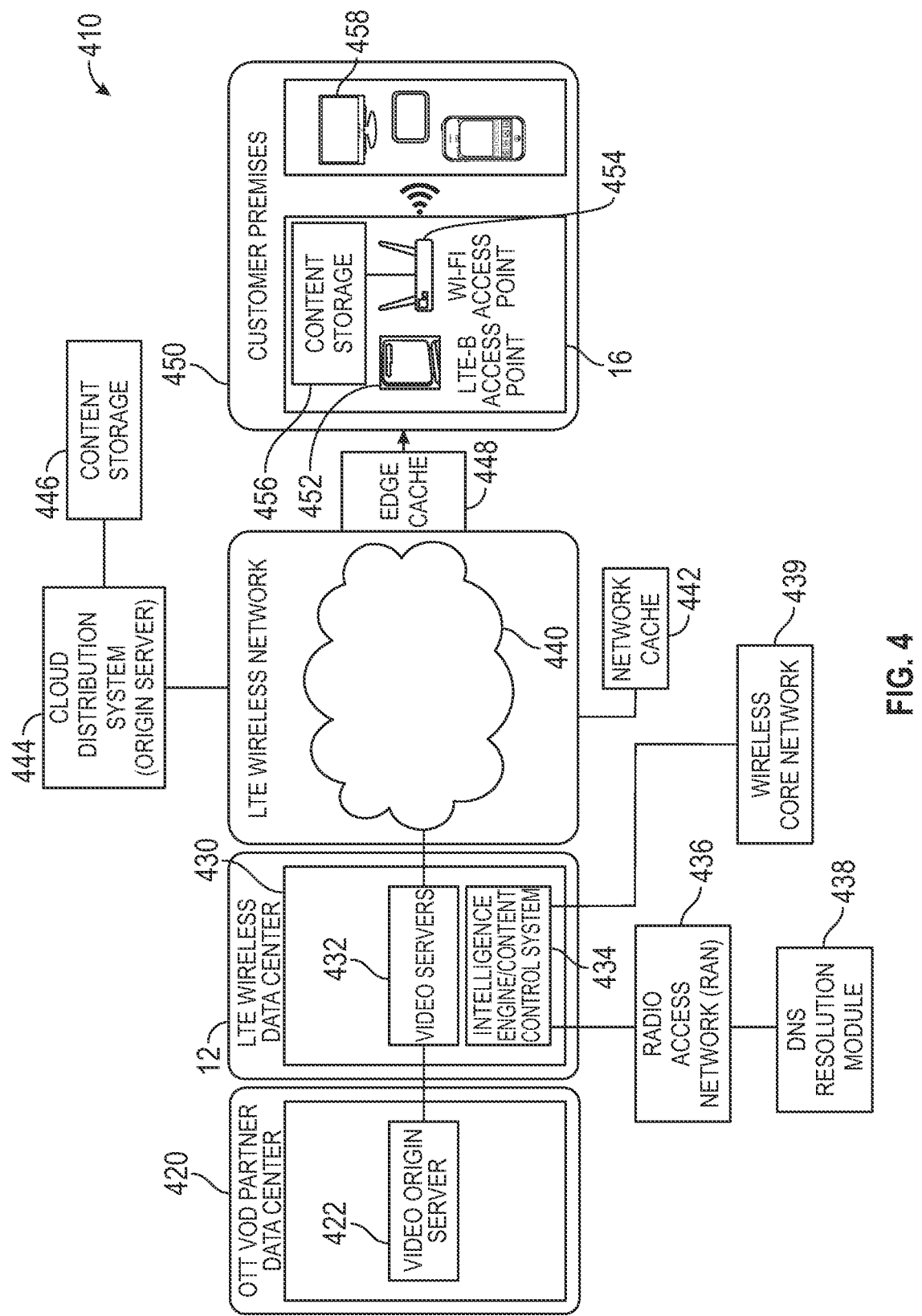
FIG. 4 is a high-level block diagrammatic view of a communication system using an LTE wireless network.

Referring now to FIG. 4, an LTE content delivery system 410 is illustrated. In this example, the communication modules are specifically directed to an LTE system that provides an over-the-top video system. However, other cellular phone systems may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is an LTE wireless data center 430. The LTE wireless data center 430 includes video servers 432 that are in communication with the video origin server 422. The wireless data center 430 is also in communication with an intelligence engine/content control system 434. The intelligence engine/content control system 434 may be used for various functions as will be described in detail below. The intelligence engine/content control system 434 may, in general, be used for identifying dormant capacity, including that of LTE wireless network 440, and scheduling the delivery of content to the intermediate devices, including using LTE wireless network 440. The intelligence engine/content control system 434 may also be responsible for managing the content at the intermediate devices by removing the content when necessary. The intelligence engine/content control system 434 may also be responsible for calculating the optimal amount of content, the frequency of such content re-distribution, and the relative timing of different content to be distributed by the LTE wireless network 440 and to be distributed to any intermediate device 16.

The data center 430 may have a radio access network (RAN) 436. The radio access network 436 sets up the links between the cell towers and the user devices and intermediate devices within a network. A domain name server (DNS) resolution module 438 may be coupled to the wireless data center 430. The DNS resolution module 438 may also be located at different places within the network. The DNS resolution module 438 tracks the address location of each of the contents within the network. That is, the DNS resolution module 438 can determine a presence of a content within the network. Once a request for a content is made, the presence of the content within the content distribution network and the URL may be discovered. Ultimately, content is communicated to the downstream storage device comprises communicating the first content based on discovering the presence of the first content and the uniform resource locator of the first content.

The DNS resolution module 438 may change the address location in a request for content as will be described below. That is, when a request is made for content and communicated to a particular device such as the intermediate device 16, the content may be located at a different location and therefore the address may be changed accordingly. Also, because the content may be positioned in various levels of the network, the DNS resolution module 438 will return the location of the content geographically closest or the location that would least burden the network.

The data center 430 may also be coupled to a wireless core network 439. The wireless core network 439 may control the session routing and authentication of the devices in the system. Many of the signals described below pass through the wireless core network 439.

The wireless network 440 may be coupled to various devices including a network cache 442. The network cache 442 is a storage device that is used for storing content that is received from content providers or a cloud distribution system 444 that may be referred to an original server. A number of network caches 442 may be provided within a particular system an may be geographically separated. The cloud distribution system 444 stores content in a content storage device 446.

The wireless network 440 may also be coupled to an edge cache 448. A plurality of edge caches 448 may be included within the content distribution system. The edge cache 448 may be closely associated with the radio access network 436 and in a similar or the same geographic location. A network may include a plurality of edge caches 448 distributed geographically so that the content is located closer to the system and therefore when content is desired, the content does not have to transverse the entire network. Pre-positioning of content in the edge cache 448 and the network cache 442 are described in further detail below. Likewise, post-positioning of content in the edge cache and the network cache 442 are described. Likewise, the intermediate device 16 may also act as a caching device for content in a pre-positioning and post-positioning method.

The video servers 432 of the wireless data center 430 is in communication with an LTE wireless network 440. The LTE wireless network 440 is in communication with customer premises 450. The customer premises 450 may include an intermediate device 16. The intermediate device 16 may include an LTE-B access point 452 used for accessing the content at the wireless network 440. The access point 452 may also be used for receiving instructions for tuning to the wireless network 440. Specific instruction signals may be provided for tuning to content at specific times. Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the LTE-B access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5:
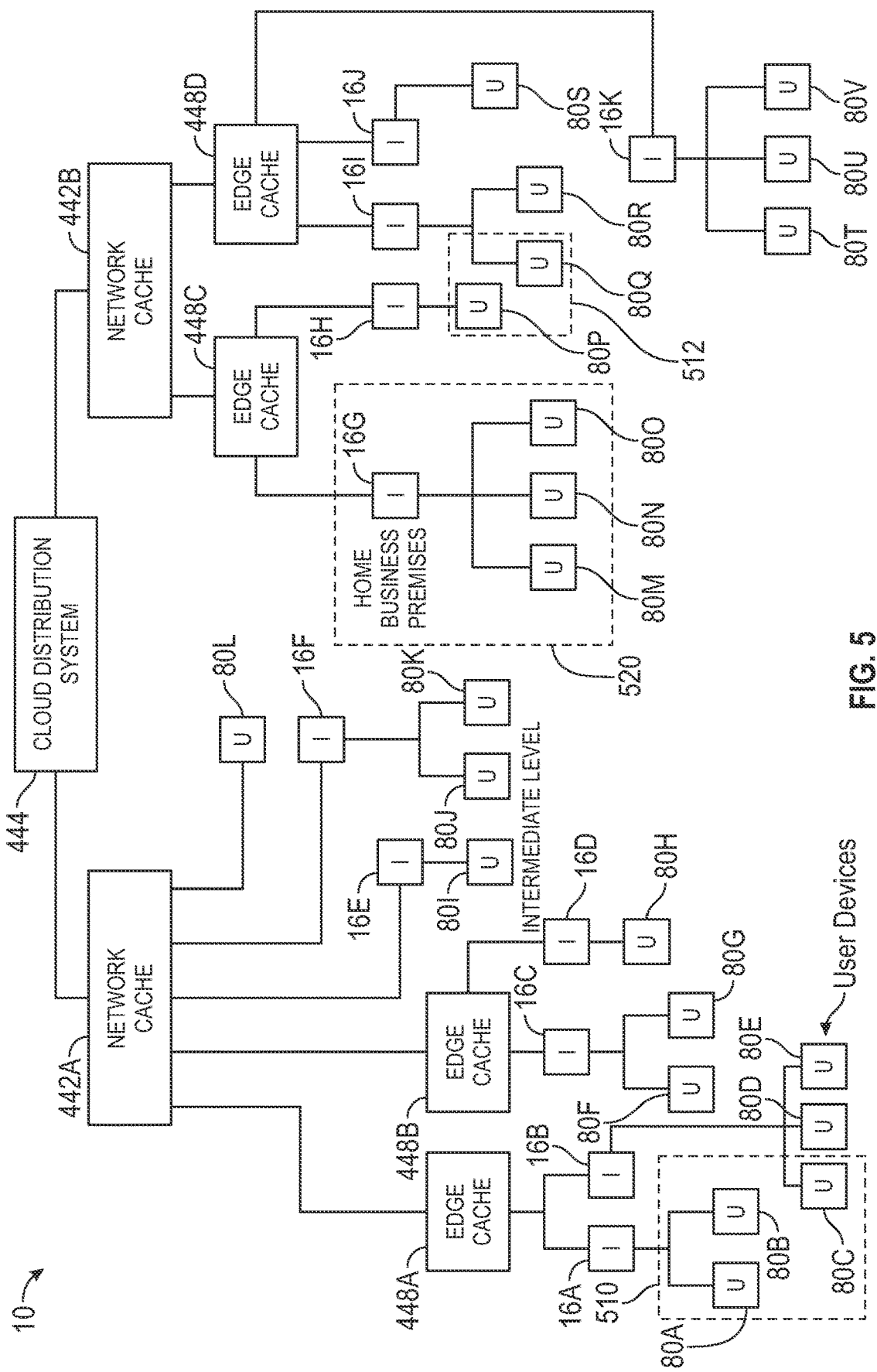
FIG. 5 is a schematic view of the various levels and various devices in a system.

Referring now to FIG. 5, the content distribution system 10 is illustrated in further detailed with various aspects and branches illustrated. A cloud distribution system 444, in this example, has a pair of network caches 442A, 442B. Each network cache 442A, 442B may have edge caches in communication therewith. The edge caches 448A, 448B are in communication with the network cache 442A. Edge caches 448C and 448D are in communication with the network cache 442B. The intermediate devices 16 may be in communication directly with the network caches 442A, 442B or with the edge caches 448A-448C. In particular, intermediate devices 16A and 16B are in communication with edge cache 448A, intermediate devices 16C and 16D are in communication with the edge cache 448B, intermediate devices 16G and 16H are communication with the edge cache 448C and intermediate devices 16I, 16J and 16K are in communication with the edge cache 448D. The intermediate devices 16E and 16F are in communication with the network cache 442A direct without an edge cache therebetween.

User devices 80 may also be in communication with the intermediate devices or directly with the network cache 442. In particular, the user devices 80A, 80B are in communication with intermediate device 16A. Intermediate device 16B is in communication with user devices 80C, 80D and 80E. User devices 80F and 80G are in communication with intermediate device 16C. User device 80H is in communication with intermediate device 16D. User device 80I is in communication with intermediate 16E. User devices 80J and 80K are in communication with intermediate device 16F. User device 80L is in directly communication with the network cache 442A. User devices 80M, 80N and 80O are in communication with intermediate device 16G. User device 80P is in communication with intermediate device 16H. User device 80G and 80R are in communication with intermediate device 16I. A user device 80S is in communication with intermediate device 16J. User devices 80T, 80U and 80V are in communication with the intermediate device 16K.

The upstream and downstream relationship of the different devices is illustrated in FIG. 5. Downstream devices are more toward the bottom of the figure. That is, the most upstream devices, the cloud distribution system 444, the network caches downstream from the cloud distribution system, the edge caches are downstream from the network cache, the intermediate devices are downstream from the edge caches, the user devices and the user devices are downstream from the intermediate devices.

In FIG. 5, various groups of user devices 510 and 512 are illustrated. As will be described in more detail below, the first group of user devices 80A, 80B and 80C may have common demographics and or other common interest associated therewith. The priorities of the pre-positioning for the group of user devices 80P and 80Q may be determined from the priority or use of content at the first group 510.

Also illustrated in FIG. 5 is a premise 520. The premise 520 includes the intermediate device 16G and the user devices 80M-80O. The premises 520 may have or want content to be pre-positioned for all of the user devices 80M-80O. As further described in more detail below, the pre-positioning of content to a user device such as user device 80P that has similar interest to those of group 510 may be pre-positioned at the network cache 442B and/or the edge cache 448C and/or the intermediate cache 16H.

Of course, the groupings, the number of layers and the definition of each of the layers may be changed for various system. Obviously, orders of magnitude of user devices, intermediate devices, edge caches, and network caches may be included within a content distribution system.

Referring now to FIG. 6, the content to be communicated has a manifest 610 associated therewith. The manifest 610 may include a URL identifiers or multiple URLs identifying the location of the content for the user device or the intermediate device to use in retrieving the content. A number of segments, such as segment 1, segment 2 and segment 3, are illustrated. Each segment may have bit rate associated therewith. Each segment and its associated bit rate may be referred to a bit rate portion. In this example, four different segments having different bit rates are provided for each of the segments. Each segment and bit rate have a corresponding URL. In this example, URL identifier 12345 through 12356 are associated with each bit rate of each segment respectively. A content may be divided into 10s or 100s of different segments, each having their own bit rate portion. The popularity of each segment and bit rate may be different within a content. Thus, pre-positioning of the segment bit rate portions may be scheduled based upon the popularity of each of the individual segments at the individual bit rates. A column showing the priority is also illustrated. The priority is not part of the manifest 610 and is determined in the content distribution system based on various determinations set forth below. The column shows that the priority of different portions may vary within a content and within a segment. For prepositioning purposes different bit rate portions may be prepositioned.

A content may have multiple manifests (a set of manifests) that have content grouped into folders. In the present example, the segments may a be folders with different bit rate segments therein. That is, each segment may represent a folder, one folder 612 is illustrated. A playlist may also be associated with a content. The playlist may be organized in a manner similar to a manifest in that it proved a way in which to playback instructions.

A folder may also be a high level menu structure. For example, "Action Movies" may be a high level folder. Within the high level folder a number of superhero films like Batman and Spiderman may be pre-positioned. Based on the URL of the folder that is contained in a request for content from a user (or a plurality of users), the popularity of the other content in the folder may be deemed popular and pre-positioned. The folder may be part of a directory and therefore the directory may be used to determine content to be prepositioned. More than one content based on a first content may be determined for pre-positioning based on the directory and/or folder.

As will be described in more detail below, the segments may be reviewed to determine the popularity. The first few bytes may be monitored such as two, three four or five bytes. In one example only 10 percent or less of a content may be monitored to determine its content or content type to be used in collaborative filtering. Collaborative filtering and popularity may be based on the small fraction of monitoring. Further, this speeds the system decision faster and reduces overall computational power needed in a system.

Figure 7:
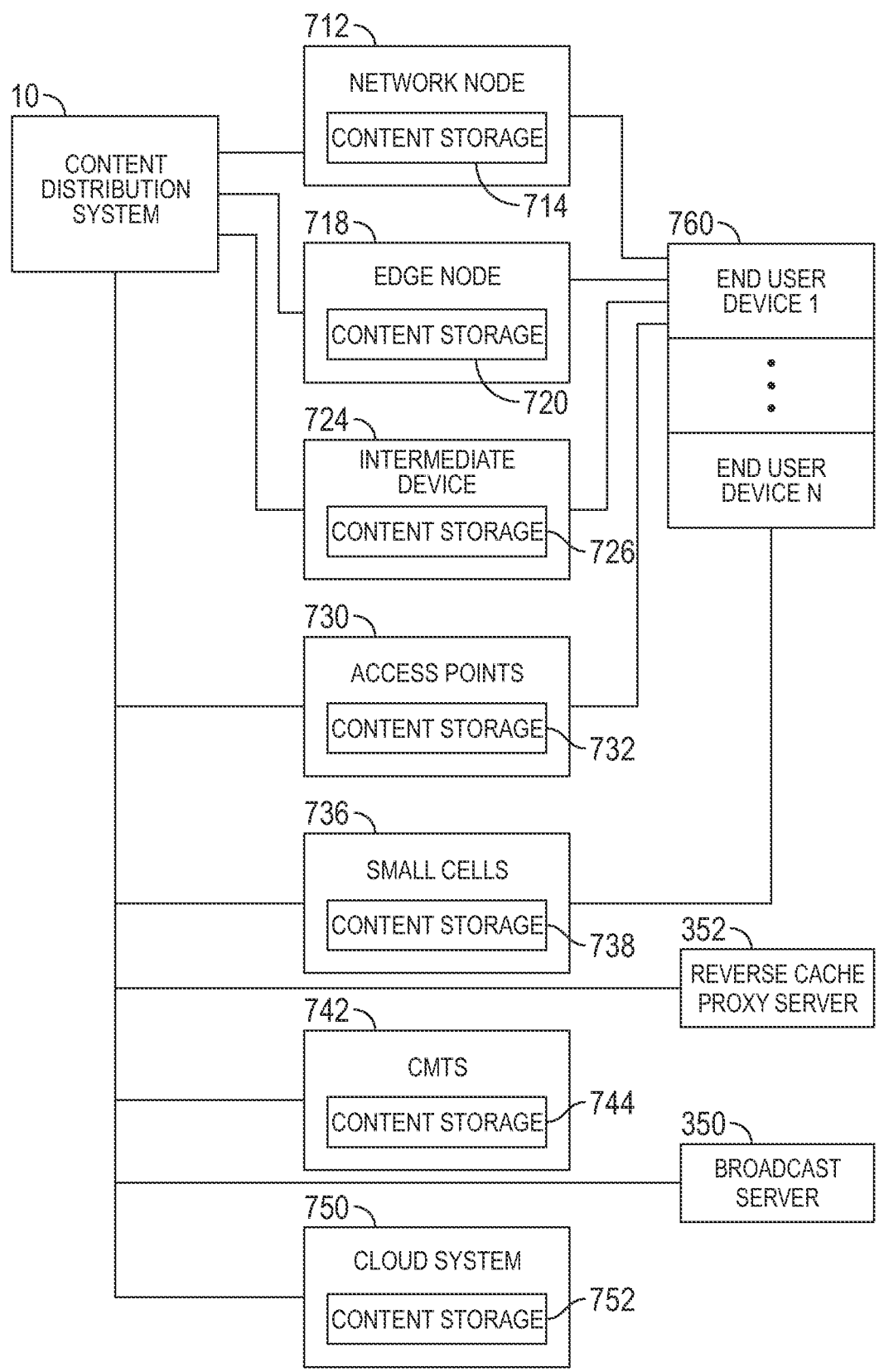
FIG. 7 is a block diagrammatic view of a simplified communication system with a content distribution system ultimately communicating with end user devices.

Referring now to FIG. 7, a content distribution system 10 is illustrated. The content distribution system 10 is the system that is used for distributing content throughout communication system. The content distribution system 10 may be a standalone system or may incorporate various aspects of FIGS. 1-3 above. That is, the content distribution system 10 may include one or more aspects of the communication system provider 12, the first content provider 212A and the second content provider 212B, as well as the content provider 90 and the communication system provider 12. The content distribution system 10 is used for determining the resources and timing for providing content to the storage devices and from the storage devices to the end user. As mentioned above, the two functions may be separated in time. That is, the content may be provided to the content storage at a time that is different from the time that the content is ultimately communicated to the end user. This may be referred to as non-real-time content distribution.

The content distribution system 10 determines whether to serve the content from the network or from the storage depending on the speed, the capacity and the costs of the aspects of the communication network and the delivery. The resources may be opportunistically leveraged at different points of the network. Both the storage costs and the communication costs may be taken into the consideration. Ultimately, the optimum combination of resources is leveraged for the distribution of a particular content.

The content distribution system 10 communicates to various network resources that may include, but are not limited to, a network node 712 that has a content storage 714 associated therewith. The network node may be a wireless or a wired network node. The network node 712 may control access to a particular type of wired or wireless network.

An edge node 718 may provide access to the edge of a network. The edge node 718 may include content storage 720 for storing content therein. An intermediate device 724 may be one of the devices described above in FIGS. 1-3 as the intermediate device 724 may be incorporated into various types of devices as mentioned above. The intermediate device 724 has content storage 726 associated therewith.

The content distribution system 10 may also be in communication with access points 730 that have content storage 732 associated therewith. The access points 730 may be an access point for accessing various types of networks including a wired or wireless network.

The content distribution system 10 may also be in communication with small cells 736. The small cells 736 may also be associated with content storage 738. The content distribution system 10 may also be communication with a cable modem termination system 742. The cable modem termination system (CMTS) may also have content storage 744 associated therewith. A cloud system 750, having a content storage 752, may also be in communication with the content distribution system 10. It should be noted that all of the nodes or devices 712-750 are illustrated in parallel. However, these devices may also be combinations of parallel and serial distribution points. For example, a Wi-Fi access point 730 may be located downstream of a network node 712 or an edge node 718. A plurality of user devices 760 may be located throughout the communication system. In this example, a number of user devices 760 are provided within the system. The user devices may be located at different portions of the system and may be associated with one or more of the nodes or devices 712-750.

The content distribution system 10 may also be in communication with the broadcast server 350 and the reverse cache proxy server 352. The broadcast server 350 and the reverse cache proxy server 352 are described above in FIG. 3.

Figure 8A:
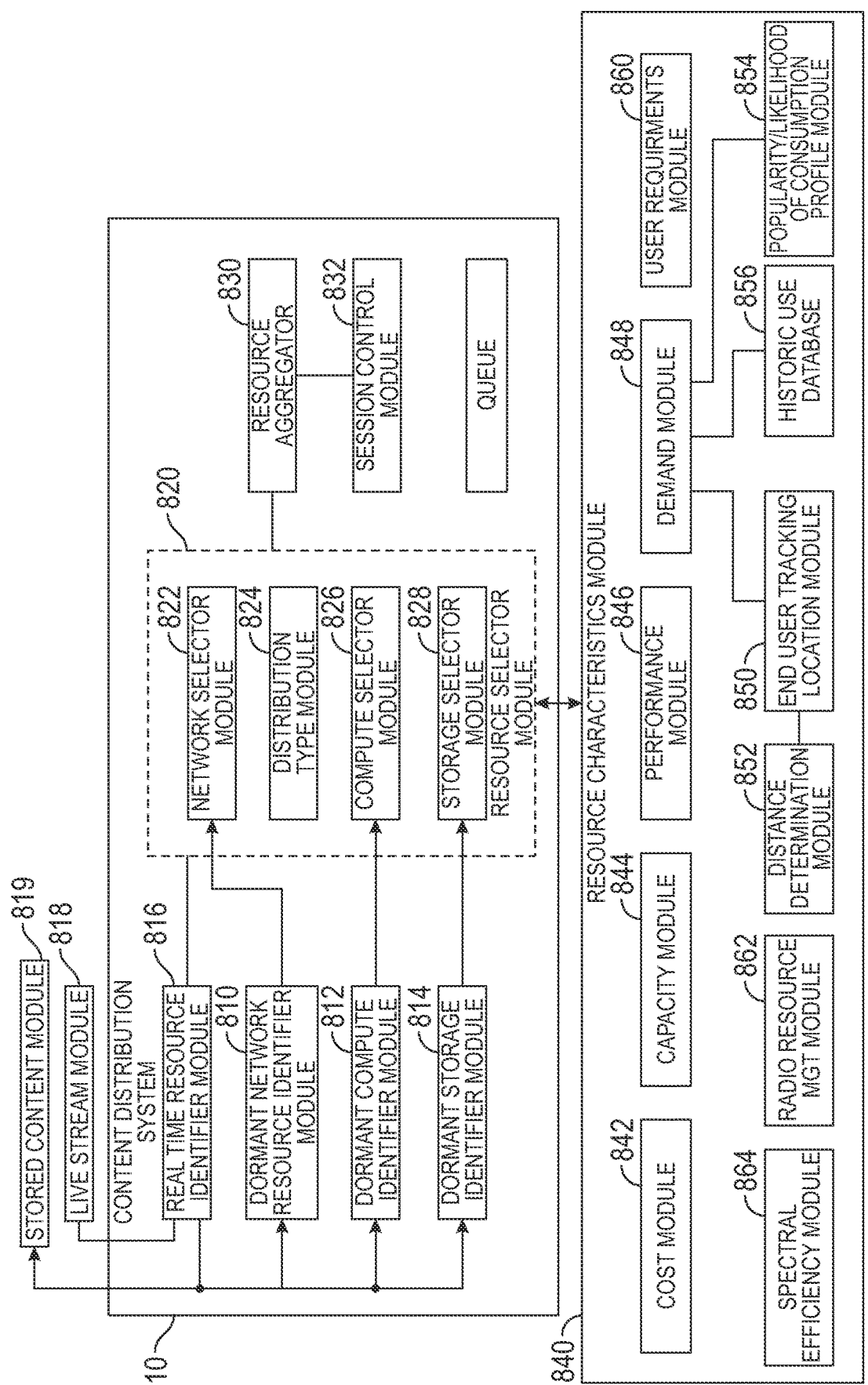
FIG. 8A is a block diagrammatic view of a content distribution system.

Referring now also to FIG. 8A, the content distribution system 10 is illustrated in further detail. The content distribution system 10 determines a combination of the compute, storage and network resources to communicate content and store the content therein. In another aspect, the content distribution system 10 also determines the communication resources to communicate the content from storage to the end user devices using dormant capacity. In this example, the system includes a dormant network resource identifier module 810, a dormant compute identifier module 812 and a dormant storage identifier module 814. The content distribution system 10, as illustrated in FIG. 7, is in communication with the various nodes and devices 712-750. Probe signals may be generated at the content distribution system 10 to obtain the network resources that are dormant, the compute resources that are dormant and the amount of storage that is dormant within the communication system. Each of the modules 810-814 may generate a probe signal. However, one probe signal may be sent for determining all the dormant resources within the network as provided in this example.

A real-time resource identifier module 816 is also incorporated into the content distribution system 10. In the present example, the real-time resource identifier module 816 is coupled to a live stream module 818 and a stored content module 819. The live stream module 818 is used for communicating live stream content to the user devices for real-time consumption. That is the live stream module 818 identified the content that is to be communicated using real-time resources identified by the real-time resource identifier module 816. Based upon various considerations as mentioned above and will be described in detail below, the content may be communicated in real-time using various network resources and types of distributions such as unicast or broadcast. In addition, the live stream module 818 together with the real-time resource identifier module 816 may allow devices that do not consume the live stream content in real-time to store the content. Various intermediate devices may store the content for later consumption by the intermediate device or transmission to the user devices within a local or unconstrained network or other user devices.

The stored content module 819 is in communication with the real-time resource identifier module 816 and the dormant network resource identifier module 810, dormant compute identifier module 812 and the dormant storage identifier module 814. The stored content identified by the stored content module 819 may be communicated in real-time using regular network resources or dormant network resources.

A resource selector module 820 is used for selecting the resources for storing the content or communicating the stored content to an end user device or intermediate device. The resource selector module 820 includes a network selector module 822 for communicating the network or networks through which the content is communicated in route to the content storage or from the content storage to an end user device.

The resource selector module 820 may also include a distribution type module 824. The distribution type module 824 may select the distribution type for the network. For example, the distribution type module 824 may select broadcast or unicast based upon various characteristics described below.

A compute selector module 826 is used for selecting the compute to be used for communicating the content to the content storage or communicating the content from the content storage to the end user. As mentioned above, the compute comprises the program or programs for applications used for storing the content or communicating the content to the end user.

The resource selector module 820 may also include a storage selector module 828. The storage selector module selects the location for storing the content. The storage selector module 828 also selects the storage from which to communicate the content to the end user device. The determination of the resources is determined for a particular time in the network whether it is for content storage or for distribution to one or more end users.

It should be noted that the network selector module 822, the compute selector module 826 and the storage selector module 828 may select different resources from different parts 712-750 of the network. For example, the compute may be part of a cloud system 750 whereas the storage may be located associated with the network node 712. Likewise, the storage may be located in the cloud system 750 as the content storage 752 but the compute resource selected may be located in a physical location associated with a different component of the network 712-742.

The content distribution system 10 includes a resource aggregator 830. The resource aggregator 830 selects the network, compute and the storage resources for communicating content to the storage or communicating the content from the storage to the end user device. The resources, as mentioned above, may be aggregated from different positions within the network.

A resource characteristic module 840 is used for determining the resources at the resource selector module. The resource characteristic module 840 may provide a cost for providing the resource at the cost module 842. The cost module 842 may determine a dollar cost or an opportunity cost for providing content. Although a cost module 842 is illustrated within the content distribution system 10, each of the resources, such as the network, compute and storage, may provide cost data of costs to the content distribution system 10.

A capacity module 844 is used to determine the capacity of the network (spectrum) associated with the communication system and the capacity of the storage that is available throughout the network. The capacity module 844 may determine the total capacity of the system, e.g., the total spectral capacity of the wireless system. The dormant capacity may also be determined. As well, the capacity module 844 can determine or help determine home much capacity could be dedicated to broadcasting or unicasting (in various iterations described below). In a 4G or 5G system, the capacity may be measured by the physical resource blocks (PRBs) that are available for broadcast or unicast or a combination thereof.

A performance module 846 determines the performance of the resources of the system. For example, the performance module 846 may determine the transmission speed or throughput of a network, the speed at which the compute can store the content, and the speed that the content storage can store the content. The performance module 846 may obtain radio conditions such as throughput or network speed at a device from feedback signals from the devices themselves. Multiple devices may provide radio condition signals to the content distribution system 10 in order to obtain a broader view of the network conditions. Ultimately the conditions determined at the performance module 846 are used to determine the spectral efficiency and ultimately the net spectral efficiency or the maximum net spectral efficiency when spectral efficiencies are compared.

A demand module 848 may determine actual demand and predict a future demand for a particular content or related content. The output of the demand module 848 may be in a user demand number. For example, a first number of user devices are demanding live content and a second number of user devices may actually request the content in the future (not in real-time). A consumption pattern for content may be determined based on various factors. The demand module 848 may be associated with or determine demand from a wish list for each of the devices within the network. The demand module 848 may also determine demand from a push list. provided by a content provider. A content provider may determine that certain users enjoy certain content. Devices may have content pushed to them in response to the push list. The push list may take into consideration past use, geographic area (location) and other considerations. The home location of the user may correspond to certain content such as sporting events. However, while travelling, other content relevant to the current location of the user device may be provided to a user. The demand module 848 may also be associated with an end user tracking and location module 850. The end user tracking location module 850 can track the mobile end user devices and the stationary end user devices to determine the amount of demand within a geographic area.

A distance determination module 852 may determine a distance to the end user or the content storage system. The distance determination module 852 may also determine the distance from the content storage to an end user. By knowing the demand at the demand module 848, the geographic area of the demand (geographic demand) and the potential movement of the end user devices, content may be strategically located and communicated. An example where this may be useful is in a particular neighborhood with a particular ethnicity or sports team affiliation. A content genre may be relevant more to certain geographic areas (geographic popularity). For example, a high school football game may be relevant to people within a limited number of square miles nearby a certain school. The location of the user may therefore be used to change the number of users. This is especially true in a system that is geographically distributed, and portions are served by different resources. The demand predictions for certain content may be for certain geographic areas.

A popularity/likelihood of consumption profile module 854 may also be communication with the demand module 848. The popularity/likelihood of consumption profile module 854 may determine a popularity and/or how likely it is for a user device to consume a particular content. The likelihood of consumption may be based on one or more of collaborative filtering, or demographics, use of content by others. The users may therefore have a consumption profile used in collaborative filtering to compare with the consumption profiles of other individual user devices or groups of user devices. Collaborative filtering takes into account interests or tastes of many users. Collaborative filtering may be to learning the level of popularity and demand. As well, a timing of the demand may be determined. A demand or popularity and timing of the demand or popularity from a first user device or a first group of user devices may be used to determine whether to pre-position content based on that level of demand or popularity and the timing of the demand or popularity to a second group of devices. This may include a determination as whether to choose broadcasting or unicasting of the content. The learning of level of popularity and personalization for the second group may be performed through collaborative filtering of the second group against the first group requesting the content through post-positioning and then prepositioning content to the second group based on the prepositioning.

The level of timeliness for a given group may be learned through collaborative filtering as well. The rate of increase in popularity determined through hits or requests for the content may be monitored. As the hits increase, the timeliness increases. The content may therefore be propositioned base on the popularity and the timeliness.

The content priority is used to define a content priority schedule for the second group based on the determinations from the first group. Prepositioning with the right priority level may be performed, whether by unicasting or by broadcasting. The higher priority content is positioned immediately of in the very near future from the determination. Lower priority content is prepositioned in the future or not at all. As well, higher priority for the group may correspond to broadcasting for the group.

Content partners or other external source such as Nielsen may also provide a timeliness indicator and a level of popularity (a supplemental content priority) to augment what was learned from level of popularity determinations above and demand from end users. That is, the learned content priority and the supplemental priority may be used to determine what, when and where to preposition content.

Likelihood of consumption may be determined by collaborative filtering including determining actual consumption of similar content to the content, a prequel to the content, or sign-ups for similar content to the content, actual consumption of the content and actual consumption of the similar content to the content, the prequel to the content, or the sign-ups for similar content to the content by other users. User data corresponding to the interests, tastes and demographics of a user may allow the system to determine that the user of the device is in a particular gender, in a particular age group, in a particular ethnicity, and in a particular income and may be interested in a content and therefore likely to consume the content. Use-based likelihood of consumption may predict likelihood of consumption when other users watch similar content. "Watching" content is a form of actual consumption This may be combined with other users watching (actually consuming) similar content and then watching (actually consuming) the content in question. That is, another user device having watched similar content as others may also watch the content in question because others have. Content may be divided into parts. Parts of a series (episodes, prequels, sequels and the like) or parts of the content divided into smaller segments, portions or chunks. Another indication of likelihood of consumption is the actual consumption of the first part of the content by other users. This may mean they may be likely to want to consume a second part. In addition, actual consumption of the second part of the content by other users may be used as part of the actual likelihood of consumption of further parts. As mentioned above the popularity of different parts of a content may be used in the pre positioning decision. That is within the content itself the manifest may have URLs for different content portions with different bit rates. The likelihood of consumption of a content portion at a certain bit rate may be determined by the consumption of another segment at another bit rate. Not all bit rate versions of each segment may be pre-positioned. The likelihood of consumption of parts of the content may be used as an indication that other users are more likely to consume the content. The popularity of a content may be determined from audience measurement or from a predictor of popularity as determined by a human entity. Demand is similar to popularity but refers to the actual consumption rather than predicted or predetermined values. The popularity may be determined based on a number of users that have signed up for a content. For example, a number of users that have signed up to stream a real-time content or live-content. When live content becomes more popular, and potentially popular with other user devices not currently receiving the live stream based on collaborative filtering, the live content may be switched from several individual live streams to one live stream.

Popularity may also be determined based on past popularity of content that is similar. Similar content may be part of the same series of movies or programming, have the same genre, the same or similar actors and the like. Similar or the same genres may also be used to determine popularity for past popularity. Popularity could be determined from a wish list or wanted list as well. Users provide input on content they would like to view in the future in a wish list. Certain content may be inherently popular at certain times. For example, the providing of Olympic content during the Olympics may have an increased popularity. On Sundays in the United States, National Football League content may be more popular.

The popularity of content may also be determined in several ways with several different inputs. The popularity of the content may be determined by the network cache request rate. That is, the amount of times that the content is requested from any device from the network cache 442 may be determined. When the network cache request rate is greater than a network cache request rate threshold, the content may be determined as being popular. A geographic popularity using a geographic request rate may also be determined in the popularity/likelihood of consumption profile module 854. When user devices in a particular geographic area request the content from the network cache 442, the popularity is increased. Likewise, a request rate may also be determined of users with similar consumption preferences or profiles. That is, users that download or request similar content may be used as a prediction as to whether similar consumption may take place at another user device. Multiple access consumption requests may also be considered by the system as being popular. For example, various types of gaming and programs may be accessed multiple times by a user and thus the popularity may be high.

A past history change value of a content may also be considered when determining the popularity of content. For example, a past history of infrequent changes to the content may increase the popularity because the content itself rarely changes and therefore once it is stored within a cache, it may not need to be updated very often. The past history change value nay be compared to a past history change threshold. When the past history change value is below the past history change threshold, the content may be popular. Therefore, it makes sense for content distribution system 10 to store the content at a cache closer to the user devices.

As users desire content, content may be missing from the home cache and from a network cache. The popularity may be determined at the same time. Pre-positioning may be performed to accommodate live consumption by a second group of users. The popularity takes into consideration content communicated live as well. The popularity may be used to change how the content is distributed. Opportunistic broadcast may be performed as a combination of above. When enough users that have similar interests (collaborative filtering) are watching individual streams of the same live content, the system may switch the users to a broadcast by monitoring the profiles of the groups of users and users likely to join in. That is, when the number of users are receiving individual live streams exceeds a broadcast threshold, the live stream may switch from individual streams (like unicast) to a broadcast stream for all devices. Further, the anticipated users may be included in the broadcast threshold comparison. For example, the individuals receiving the content stream and the anticipated number of users that may view the live stream determined through collaborative filtering may be compared to a broadcast threshold. When the threshold is exceeded the content is broadcasted.

The popularity also applies to a correlation between segments of a first content, or between pieces of content for one user or across users. That is, when segments 1-5 of a content have a high popularity or a being demanded, other segments may be pre-positioned based on the popularity, demand and timing of the popularity. If a content or content segments are in demand, other related segments of content may be demanded and thus the popularity may be increased. In addition to the first content, pre-positioning other pieces of first content or a second (different) content or content segments may pre-positioned. Correlating across segments of content has two general cases. First determining from the popularity of parts of the first content that a user (and other users) are going to watch other parts of the same content. e.g., if a user has watched the first episode of Breaking Bad, that user is likely to watch other episodes and the rest of that episode. Likewise, certain other "correlated" users are likely to watch those episodes as well. In a second aspect, the popularity of the first content is used to determine a second content that a user and other users are likely to watch may be determined. For example, if a user has watched Shrek, he is likely to watch Finding Nemo and certain other "correlated" users are likely to watch Finding Nemo as well. Content segments or the entire content of a second content may be pre-positioned based on the first content.

A historical use database 856 may store user participation for various content, content genres and content related to a particular content. A genre is for content are similar forms, style or subject matter. Examples include but are not limited to action, romantic comedies, comedies, drama, thriller, horror, historical, western and adventure. Historical trends for certain content and genres of content may be used to predict future (non-real-time) user device consumption for particular content. For example, actual consumption of a prequel may indicate the popularity or likelihood of consumption of a certain content. As will be described below prepositioning as well as real-time predicting may use data in the historical database to determine the mode such as broadcast or unicast for content or a live stream.

A user requirements module 860 may also be incorporated within the resource characteristic module 840. The user requirements module 860 may associate various user requirements with each end user or end user device. The user requirements module 860 may include the definition of the service to which the subscriber has subscribed. For example, some users may value rapid response in terms of updating or providing content. This may signal the content distribution system 10 to locate the content closer to the end user.

The resource characteristic module 840 may also have an efficiency module that is used for determining a consolidated efficiency metrics that is used for the determination of which combination of resources to use. The costs per byte per user may be determined.

A radio resource management module 862 may also be included in the resource characteristic module 840. The radio resource management module 862 may take into consideration a service resource agreement from various service sources and various service level agreements from the devices and nodes 720-750 of FIG. 7 in order to determine whether to use a particular resource.

A spectral efficiency module 864 may be used to determine the efficiency of the spectrum used for each transmission choice. By determining the spectral efficiency of each transmission choice (a unicast spectral efficiency and a broadcast spectral efficiency), the appropriate transmission resources such as the network, the distribute type, the compute and the storage may be determined appropriately. The spectral efficiency and the capacity module 844 together with other data are used for making the selection of the appropriate resource at the resource selector module 820.

In summary, the content distribution system 10 determines, for any content to be distributed, the optimum combination of resources to leverage at a particular time. Real-time or live content distribution requires immediate resources that may be chosen as combinations of broadcast and unicast. Broadcasting may be used not only for real-time consumption but also for simultaneously populating storage devices in user devices or intermediate devices. In other considerations, if cost minimization is the prime consideration, positioning content as close to the user as possible (e.g., in an intermediate storage device in the home, office, or in the user's end device itself) might make the most sense. In this scenario, performance optimization is a natural by-product, since delivering the content from close to the device will maximize throughput and minimize latency and jitter effects.

On the other hand, if the piece of content has a high enough popularity level (i.e., a large number of users are likely to watch (actually consume) the content), it could make sense to locate the content a bit deeper in the system (e.g., in one of the access network nodes or even in the core cloud). In this case, even though the networking cost can be higher, it can be amortized across a larger number of paying users. The timing of the popularity may also be factored in. As well, the content may be segmented into content portions or chunks and the determination whether to pre-position is performed for various segments of the content.

It is therefore helpful to view the decision determination in terms of a consolidated efficiency metric that enables the content distribution system 10 to decide which combination of resources to use. An example of a metric is cost/bit/user—or some equivalent of this. The cost/bit component reflects the price and performance aspect of the delivery option and normalizes the cost incurred relative to the performance rendered. The "User" denominator then normalizes the metric further, to factor in demand/popularity, and the number of users interested in the content.

In terms of a distribution and delivery strategy, various principles may be followed. Such principles may include pre-positioning content, using dormant network capacity (or, at least, the least expensive network path(s)), at one or more sites, edge nodes, home access points, or end user devices the idea being to move content as close to the interested user population as possible, using free or inexpensive resources.

Another determination in the distribution and delivery strategy is leveraging the dormant storage and computing where the dormant storage is available in the system. The best location or locations for pre-positioning is determined in view of the cost and performance of the ultimate delivery to the end user device.

Another determination is picking the best time to pre-position content while factoring in available dormant capacity and the ability of the storage device to efficiently receive data to be pre-positioned. The location may also be a consideration. That is, communicating when the device is in strong radio conditions may be important. The end user device may be exposed to varying conditions when mobile. An example of a determination could be: does the distribution system deliver live from the network at the time of consumption, vs. store now at Location A and deliver at consumption time from A, vs. store now at Location B and deliver at consumption time from B, vs. store now at Location C and deliver at consumption time from C, and so on. Basically a "least cost route" option is set forth that factors in how many users can be covered from each location or route.

Another determination is the best network path to leverage to pre-position content in the device. When the user is ready to consume the content, delivery is enabled with minimal cost involved, e.g., if the caching was done at storage local to the user, network costs at consumption time would be zero or minimal.

In the following, a few use cases are presented. The first case is wish list content. For wish list content that is part of a user's wish list (e.g., specific movies, episodes of a TV show etc.). The content distribution system 10 may determine that the optimal approach here is to pre-position this content to the user right away, after the user indicates that their desire for a particular content since the user does not need to immediately consume the content.

The content distribution system 10 may decide to pre-position or cache the content in, e.g., an intermediate storage device in the user's home, or in the end user device itself (if the user is known to regularly use a specific device to consume streaming content). The deeper in the content is positioned, the lower the eventual cost of delivery (e.g., delivery from local storage—no network costs involved) and the better the user's quality of experience.

When the content distribution system 10 determines that this content has a high enough popularity level, the content distribution system 10 may cache the content at a further upstream point in the network (relative to the end user devices), e.g., a base station, or a wireless network node. Upstream storage allows for the content to be available to a larger number of users. The content distribution system 10 may also decide to cache portions of the content bundle at different locations, e.g., position metadata, program information etc. locally on the end user device, and the core content further upstream. Such decisions may be performed at the resource aggregator 830.

In either case, the content distribution system 10 could make a decision to deliver content to any (or more than one) of the storage nodes mentioned earlier, based on the cost and performance tradeoff of such a delivery with the cost and performance of the storage and its compute. The likelihood of the storage being able to fulfill a real-time video serving request and the volume of users that would be addressable by the storage, may also be considered. For each potential content storage positioning location being considered, the content distribution system 10 takes into account the cost of storage, and (at the point of delivery to users) what the compute and network delivery costs would be. The popularity level and the timing of the popularity level (consequently how many users would have access to the content from each location) can also be factored in to a decision to deliver content or content segments using unicast delivery or broadcast delivery, since broadcast delivery is somewhat less efficient than unicast delivery to a single node, but much more efficient than unicast delivery when attempting to deliver something to multiple nodes simultaneously, since the delivery efficiency would be higher (and the cost would be effectively amortized) if a larger number of users can be serviced.

For example, if the cost of storage in the home is $1, the cost of real-time delivery is $10, and the cost of pre-positioning using dormant capacity is only $2, then the likelihood of video consumption (for example 50%) may be taken into account. The effective cost of real-time delivery compares to a $6 cost (($1+$2)/50%) of pre-positioning and subsequent serving given the likelihood of such an event. Now if this example is expanded, and the cost of pre-positioning using broadcast over dormant capacity is $6 (since less efficient for any 1 user), but 100 users can be addressed by the broadcast, and the likelihood of video consumption is 33% across the group of 100, then the effective cost of pre-positioning and subsequent serving given the likelihood of such an event drops to $3.18 (($1+$6/100)/33%). Finally, if the cost of storage in the home is entirely a sunk cost, and is shouldered by the user, the above costs or pre-positioning and subsequent serving drop further to $4 and $0.18, providing dramatic cost and performance (such as spectral efficiency) improvements.

For gaming applications, the content distribution system 10 may decide to pre-position or cache a gaming application requested by the user. In this case, the content distribution system 10 may place real-time-critical and bandwidth intensive components of the application such as but not limited to graphics data and intensive user interface and rendering components close to the user (e.g. in an intermediate storage device in the home, or in the user's commonly used gaming device(s)) and place the compute-intensive pieces further upstream, where a larger pool of compute and memory resources may be available. In this manner, the caching location can be used to store just a portion of the total content, application or web payload while the low-bandwidth portion of the payload can be served from the origin server, which may provide higher compute capacity.

Another use case is for pre-positioning software updates. A software service provider may need to do this from time to time. That is, software updates may be required for end user devices. Dormant network capacity may be used to preposition a software update in a user device or in an intermediate storage device close to the user. The user can incorporate the updates at a subsequent time of their choosing.

In general, the decision to pre-position content may be driven by a user, or users, placing the content on their wish lists, or the content distribution system 10 proactively deciding to place the content in suitable locations based on the content's popularity profile relative to the population of user and specific personalized reference for any given use and hence, expected demand in the near future. In every case, the content distribution system 10 will need to select the combination of storage and compute resources in the system based on various factors including candidate storage locations having the requisite storage capacity. Another factor is the cost of storage. Another factor is whether dormant (unused) storage space available at that location and whether the dormant capacity can be leveraged free of charge, or at a lower cost.

With respect to compute power similar factors may also be consider. These include if the location has sufficient compute power to support delivery of the service when the user chooses to consume the content. Also, a more upstream location, with a larger aggregate compute capacity may be chosen instead of a closer location.

With respect to the network when the user decides to consume the content, the network communications cost be at that point and for real-time consumption may be considered. The cost of pre-positioning distribution using dormant capacity and the dormant (unused) capacity available at that point in time may also be considered along with the relative cost of such distribution. The cost efficiency may also be considered for pre-positioning distribution using broadcasting or unicasting. Another consideration is how many other users are likely to be interested in the content.

Clearly, the trade-off factors here are compute or storage capacity and cost, vs. networking cost, and the content's popularity profile. Typically, upstream caching locations are likely to provide large storage and compute banks, suitable especially for compute-intensive applications. However, the networking expense could be higher (at the time of content consumption), and performance may be inferior (if the content has to traverse a long segment of the network). But, at the same time, a larger population of users could be served, when the service delivery location chosen is further upstream.

The end result of these determinations is that the content is cached at one or more locations in the system. Typically, an access network edge node (e.g., small cell, base station, access point) used as the caching location might provide more limited, and more expensive, compute and storage resources. However, the communication costs might be lower, and performance is likely to be better, compared to a more upstream location, because network backhaul costs and latencies are being cut out of the equation.

The related decision the content distribution system 10 must also select the mode of transport such as unicast or broadcast. If the pre-positioning location is in the network, a point-point (unicast) approach can be applied. If the decision is to locate the content in the user's end device or intermediate storage device in the home, the content distribution system 10 may decide to opportunistically push the content to multiple users (especially if the content's popularity profile is high) using a much more spectrally efficient broadcast approach when distributing the same data to multiple users at once.

When the user is ready to consume the content (i.e., requests delivery), the content distribution system 10 delivers from the most appropriate storage location. The content distribution system 10 will look at all points where the content is currently cached or is available (including the origin server in a cloud location) and determine the best location from which to deliver from based the communication system conditions at the time. The conditions include the network delivery cost from each candidate location and the current compute power available at the location, vs. the computing needs of the application. The content distribution system 10 then delivers the content using the best (possibly least expensive) network resources available that can handle the performance requirements. If delivery is from local storage, networking resources may not be needed.

The live streaming (consumption) case is a subset of the content delivery scenario described above. If the user is requesting content that has not been pre-positioned anywhere, the content distribution system 10 delivers it from the origin server in its cloud.

The radio resource management processing used by the distribution system 10 for a live broadcast has some differences from that used for pre-positioning of content for non-real-time consumption. The distribution system 10 performs a set of radio resource management determinations while contemplating the introduction of a broadcast session to carry the live stream. For live broadcasting (for real-time consumption), the target throughput is determined, and participating devices need to meet channel quality (radio conditions/metrics) requirements.

First of all, the distribution system 10 may pick a delivery bitrate for the broadcast. This is to at least equal the bitrate of the selected version of the audio/video to be live-streamed. The system will select a bitrate version of the multimedia content to be delivered—a high enough bitrate that delivers a high-quality user experience. The audio/video playout rate of the content on the device's client has to equal this recorded bit rate of the audio/video. Which means the delivery bitrate of the broadcast has to at least equal this recorded bitrate (buffering possibilities are limited in a live stream so the communications bitrate has to equal or exceed the playout or recorded bitrate).

The target throughput for the broadcast is at least equal the audio/video bitrate. This, in turn, determines the spectral efficiency level (i.e., modulation and coding scheme or MCS) to be used, given the spectral capacity (KHz of spectrum) available for use. The system, therefore, selects a target spectral efficiency level that enables the performance target (target throughput in this example) to be achieved. The spectral efficiency is the bits per second per frequency (bps/Hz) which in turn corresponds to a modulation and coding scheme. When the conditions are good, a high modulation can be used. Likewise, a higher coding scheme (fewer redundant bits) may be used. The spectral efficiency is related to the throughput such as the target throughput divided by the available capacity.

Spectral efficiency (bits/s/Hz)=Target Throughput/ Available spectral capacity (Hz)

The available spectral capacity (spectrum) is determined by the content distribution system 12 or 10 based on the received capacity reports from the network. As mentioned above, the available capacity may be reduced by a margin to the target available capacity utilization goal. Capacity usage reported by the network could be expressed as % of total channel (e.g., cell) capacity; in which case, spectral capacity (Hz) can be derived by applying that percentage against total spectral capacity (Hz) available in the channel (or cell). The spectral efficiency level that is tolerable by the device (tolerable spectral efficiency) may be determined based on the radio channel metrics gathered from the device. The content distribution system 12 or 10 uses the radio channel quality of the device 16 (measured by signal strength, signal/noise-interference ratio (SINR), channel quality indicators, and other similar metrics) to determine a target modulation scheme and coding scheme (MCS) level for the device. The mapped MCS level reflects the highest modulation order to that the particular device in its current radio conditions, can reliably demodulate; as well as the level of channel coding (forward error correction) that needs to be applied to correct errors. The determined MCS level can be directly translated to a spectral efficiency data value, and the content distribution system 12 combines spectral efficiency with available capacity (as outlined earlier) to target throughput. Note the target throughput may be determined for each device individually based on the radio conditions at each of the particular devices. In the present system all of the determinations may be done in the cloud (by the content distribution system 12) which effectively integrates radio quality information with content distribution specifics as a cross-layer optimization.

This, in turn, implies that the devices participating in the broadcast must be experiencing radio conditions at least as good as required to receive delivery at this target spectral efficiency level. A device whose radio conditions are weaker than the radio condition (quality) threshold level will receive a degraded user experience, or receive no content at all since it will not be able to demodulate much of the signal being transmitted.

The distribution system 10 includes in a potential broadcast of this stream, from the pool of participating devices, only those that pass the radio quality threshold. The rest of the devices (the radio-disadvantaged devices) can stay on unicast.

Additionally, the distribution system 10 determines the most spectrally efficient transmission mode, i.e. the optimum combination of broadcast and unicast user group sizes, given the participating devices' radio conditions. The distribution system 10 evaluates overall spectral efficiency for each combination of broadcast and unicast user group sizes. As was described many iterations may be calculated before one is selected. This is described in detail below.

With unicast, radio resources (e.g. carrier frequency slices allocated across time slots and spatial layers) are allocated to each device, typically on a delivery-by-delivery basis. In other words, radio resources are allocated per device delivery. However, some devices may be in radio-advantaged conditions (i.e., higher radio metrics such as SNR/SINR/ CQI), and, consequently, use fewer radio resources to achieve a given target throughput (i.e., are more spectrally efficient). (The use of Massive MIMO or broadcast beams can improve radio conditions of such devices). In contrast, devices on poorer radio channels will end up using more radio resources to achieve the same target throughput desired for delivery of the content in question.

With broadcast, the same set of radio resources is shared across all participating devices (for example, on a cell in a wireless system). Individual per-device radio resource allocation does not happen. Also, a common spectral efficiency level is used for data delivery across a session—to all participating devices. This is typically at a "middling" level (it can even be at a "least common denominator" level)—so that a large enough number of devices can receive the broadcast successfully. (Devices that are radio-disadvantaged enough to not tolerate this target broadcast spectral efficiency level will receive little or none of the content). Hence, a highly spectrally efficient unicasting device (i.e., having better radio conditions, and by itself, achieving throughputs with fewer radio resources) will typically experience a lower spectral efficiency when moved over to broadcast. On the other hand, the radio resource sharing feature of a broadcast raises overall spectral efficiency since more devices are being served using the same quantum of spectrum.

This tradeoff—between drop in per-device spectral efficiency for radio-advantaged users, vs. increased spectral efficiency from resource sharing is a factor to assess while making unicast vs. broadcast choices.

With this approach, the distribution system 10 determines the capacity (e.g., number of PRBs in a 4G/5G system) available to the live stream delivery. This can be a percentage that can be allocated to the broadcast. Based on the required delivery bitrate and capacity allocated to the broadcast, the target spectral efficiency is determined for the particular iteration. Given the target spectral efficiency, a list of devices that are able to participate in the broadcast (i.e., whose radio conditions are at least as good as required to receive delivery at this target spectral efficiency level) is determined. The remaining participating devices will need to receive the real-time or live content delivery via unicast. The net spectral efficiency for this combination of broadcast and unicast is determined (i.e., factoring in throughputs achieved for the broadcast and unicast deliveries, and total spectrum used up. This will be dependent on the target spectral efficiency for the broadcast component, and the spectral efficiency levels used for deliveries to the unicast devices).

The distribution system 10 will perform several iterations of the process, with each iteration factoring in a different percentage of the available spectral capacity being used for the broadcast part of the live stream. For example, the first iteration can assume 0% of capacity used for broadcast (i.e., the live stream is done entirely using unicast deliveries). Subsequent determinations may increase the percentage. The final iteration can factor in all (100%) of the available capacity being applied to the broadcast component of the live stream, i.e., no unicast deliveries for the live stream.

As part of delivery of the content, the content distribution system 10 may choose to opportunistically cache the content in targeted locations, which it retrieves to serve to any given requesting user at that time, in anticipation of future needs for the same content by other users. For example, in one example broadcasting may be consumed in real-time by various uses while intermediate devices or other user devices cache the content for later consumption. Further, the content may be post-positioned in an upstream node in a wireless network (e.g. a PDN Gateway or User Plane Function) but much closer to the user than the content origin server such that it can be delivered to a larger interested population of users from a closer point of access when the system is responding to a first user requesting such content and the system needing to retrieve such content from the content origin.

Figure 8B:
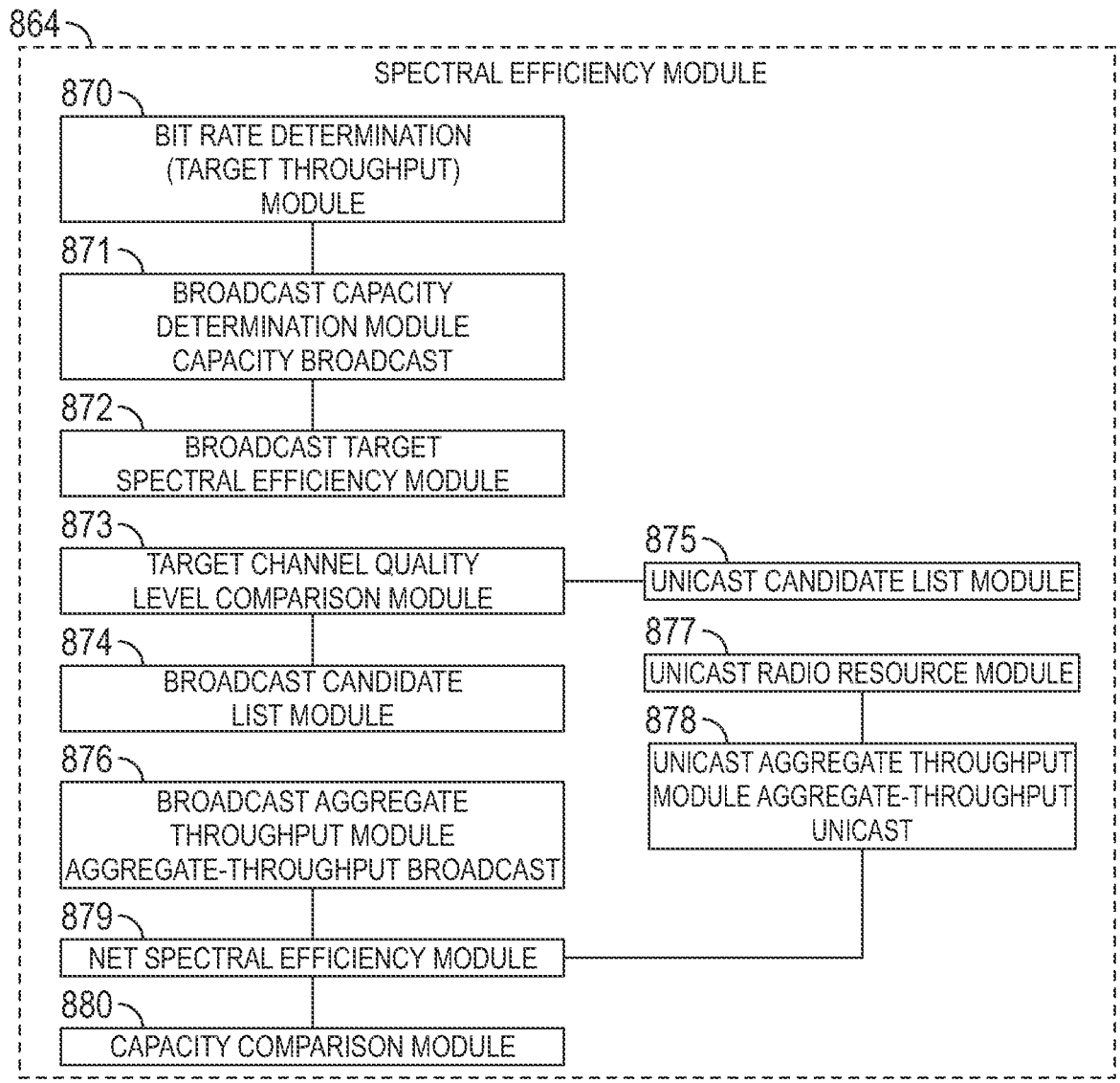
FIG. 8B is a block diagrammatic view of the spectral efficiency module of FIG. 8A.

Referring now to FIG. 8B, the spectrum efficiency module 864 of FIG. 8A is set forth in further detail. In FIG. 8A, a bit rate determination module 870 is used to determine the target throughput. The target throughput may be chosen as the bit rate of the audio/video live stream.

The determinations below are performed in a number of iterations with each iteration factoring in a different (increasing in this example) percentage of the available spectral capacity being used for the broadcast part of the live stream. In this example, the first iteration or start iteration is determined with 0% used for broadcast, which means the live stream is done entirely using unicast deliveries. For a live stream, once the candidate list of "broadcastable" user devices is determined, the next step would be to determine whether a broadcast should be started up for the live stream delivery, the optimum distribution of capacity across broadcast and unicast deliveries, plus the optimum blend of broadcast user group size and unicast user group size. The optimum blend will result in the highest net spectral efficiency.

Each iteration loop determines the broadcast target spectral efficiency for each iteration. First the target spectral efficiency to be used for the broadcast delivery to generate the bitrate, based on spectrum available for broadcast (available spectrum) in this iteration. A broadcast determination module 871 is used for determine the broadcast capacity for each iteration.

CapacityBroadcast=% capacity used for broadcast in
this iteration*wireless capacity (e.g.,
PRBs*Hz/PRB) available for the live stream
delivery.

Using the above, a broadcast target spectral efficiency module 872 determines the broadcast target spectral efficiency by:

Target Spectral Efficiency (bits/s/Hz)=Target
Throughput/Capacity$_{Broadcast}$

A target channel quality level comparison module 873 compares the channel quality (radio metrics) of the potential broadcast only devices to a target channel quality level (target radio metrics). The radio metrics or channel quality level may, for example, be the signal to noise ratio, the signal inference to noise ratio or the channel quality indicator (CQI). The comparison allows only devices that have a high enough radio condition to reliable receive the content to be consider to receive the broadcast signal. A broadcast candidate list module 874 provides a broadcast candidate list for the devices that exceed the target channel quality at the target channel quality level comparison module 873. Other devices that are to receive the live content that do not meet the channel quality level are provided in a unicast candidate list module 875.

Ultimately, a net spectral efficiency is determined. The net spectral efficiency, as further described below, has both a broadcast and unicast component.

For the broadcast component of the live stream, broadcast aggregate throughput module 876 determines an aggregate achievable throughput for the broadcast user group in the current iteration is given by:

Aggregate-ThroughputBroadcast=Target Throughput*
(#devices in the current broadcast candidate list
potentially participating in the live broadcast+a
number of devices where content can be pre-
positioned for future consumption*de-rating
factor)

The aggregate achievable throughput takes into account the number of devices that would receive the broadcast real-time, as well as the number of devices that may be interested in future consumption of the content, and in which the content could be opportunistically pre-positioned in an intermediate device or a user device. Using the de-rating factor, a lower weight is applied to the number of devices considered for pre-positioning, as the marginal value of spectrum for real-time use would be higher than that for non real-time (future) use—the latter being determined on a "likelihood of consumption" basis. The lower weight can be applied, for example, by de-rating the number of pre-positioned devices by a factor (less than 1 in value).

The multiplication by the number of devices is used to account for radio resource sharing since with broadcast, the assigned quantity of resources is shared by all participating devices. Broadcasting may use a lower per-device spectral efficiency level than could be used by radio-advantaged devices in unicast mode; but the resource-sharing aspect boosts net spectral efficiency.

For the unicast component of the live stream (unicast user group), the unicast radio resource module 877 determines the overall spectrum used by all of the unicast devices (Capacity$_{unicast}$). The spectral aspect of each device is taken into consideration since each receives a separate signal that uses a separate piece of spectrum:

For each unicast device such as a user device, the quantum of radio resources required (e.g. spectrum from Physical Resource Blocks or PRBs in an LTE or 5G system) needed to achieve the target throughput for the live stream is determined based on the known spectral efficiency of the device being determined. The spectral efficiency for device-i (spectral efficiency at which the i-th device can receive the unicast delivery, based on its radio conditions) is given by:

Spectrum required (Capacity-RequiredDevice-i)=Target Throughput/Spectral EfficiencyDevice-i The sum of the resources for unicasting is thus determined by:

Capacity$_{unicast}$=SUM(Capacity-RequiredDevice-i
across all devices in unicast group)

An aggregate throughput module 878 determined the unicast aggregate throughput as:

The unicast aggregate throughput determined at the aggregate throughput module 878 is determined by:

Aggregate-ThroughputUnicast=Target
Throughput*Number of Unicast devices

Taking into consideration both the broadcast aspect and the and the unicast aspect of the above, the net spectral efficiency module 879 determines the Net Spectral Efficiency by:

Net Spectral Efficiency=(Aggregate-ThroughputUnicast+Aggregate-ThroughputBroadcast)/(CapacityUnicast+CapacityBroadcast)

Thereafter, to ensure that total capacity requirement is within available capacity for the live stream the capacity comparison module 880 performs a comparison of the unicast and broadcast capacities and compares the sum with the available capacity:

When CapacityUnicast+CapacityBroadcast>Total Capacity available, the broadcast/unicast combination from the candidate list for the iteration id discarded. The next iteration of the loop using a different amount of broadcast percentage for the overall capacity is determined. In all, a plurality of blends have their net spectral efficiency determined.

The distribution type module 824 of the distribution system 10 then picks a mode blend from the iterations from above loop. The mode blend may, for example, be provided in terms of a percentage such as: broadcast capacity %, unicast capacity %. The blend that is chosen from the plurality of blends results in the highest net spectral efficiency.

If the selection reflects that a broadcast session needs to be started (i.e., the selected blend has a non-zero broadcast %) at the session control module 832 of FIG. 8A. The session control module 832 instruct the devices from the broadcast candidate list whose SNR/SINR/CQI radio metrics exceed Target Channel Quality level to shift to the broadcast session being set up, in the selected network. The session control module 832 keeps or instructs the non-broadcasting user devices in the unicast candidate list module to remain in or instructs them to receive the content in in unicast mode. Therefore, a blend of unicast receiving user devices and broadcast receiving user devices receive the same content transmission simultaneously in different modes.

A queue 834 is incorporated into the content distribution system 10. The queue 834 may communicate content to user or intermediate devices in a particular order. The order may be based on the interest in a content, popularity of a content, a timing of the popularity, the demand for the content and the like. The queue 834 may be used for pre-positioning content to interested user devices using broadcasting as is described in further detail below.

The above process is described with respect to delivery of a live stream. A similar process performed at the distribution system may be used for migrating a live stream from unicast mode to a broadcast mode. The system can decide to migrate the stream to a broadcast mode in part or in full. That is, the system may continually perform determinations to see if broadcast and/or unicast transmission may be enable for the live stream. A combination of unicast transmissions and broadcast transmissions may be performed. Details of this process are described below. The same is also true for migrating a live stream from a broadcast to unicast. That is, because of various ongoing conditions, the use of unicast rather than broadcast may be desirable.

The system may also be applied to real-time consumption of stored audio/video content. That is, a user may request stored content that is pulled on-demand by a specific user at a specific time. In other words, the actions are not a live event that is time-synchronous to cross a population of users. Even if multiple user devices are viewing the same content simultaneously, grouping the user devices into a live broadcast stream is difficult since their views are not likely to be time-synchronized. When a user starts a stored content viewing stream, the other user devices may pause, rewind or otherwise manipulate the stream so that viewing at the same point is nearly impossible. However, when a user requests a stored content stream to be delivered in real-time, other devices may opportunistically receive the signal using the broadcast mode of the communication system.

Another use of the distribution system is for pre-positioning content in user devices for future consumption. A system that identifies the content generally desired by consumers that broadcast such content over the network in advance of the time it is desired to be consumed by consumers, store such content locally at a consumer premises or within an intermediate device. The final delivery to the user may be performed using a Wi-Fi home network and therefore the medium is constrained. Details of this will be described in further detailed below.

When the broadcast mode is selected or an ongoing transmission is switched from unicast broadcast mode, the distribution system 10 can select one or more out of all the available transmission networks. As mentioned above, various resources from the different networks may be selected by the resource selector module 820. However, the network selector 882 may be used to select a particular network. The best network may be chosen based upon a performance perspective, e.g., the one with the highest spectral efficiency. Multiple paths may also be accessed that are used to achieve the best performance. As mentioned above, a cost perspective may also be used in selecting the best network.

When selecting between different networks, the bandwidth across multiple networks, using multiple pathways available to the user, may be used simultaneously. As will be mentioned in more detail below, underutilized or dormant capacity may also be used for communicating content and live streams to the user devices. That is, when the regular use of a network is low on a consistent basis, the unused capacity may be used for communicating content. When real-time streaming and consumption occurs, the distribution system 10 may choose a broadcast-centric network to deliver the broadcast. For example, a TV network may be used. Further, a low frequency band, such as 600 MHz, may be used because such frequencies communicate data and in longer ranges. Relative to an LTE or 5G network, off-loading various broadcasts to a TV broadcast system may be advantageous. The LTE or 5G wireless network may therefore be used to handle its regular load depending upon the time of day and traffic therethrough.

Figure 9:
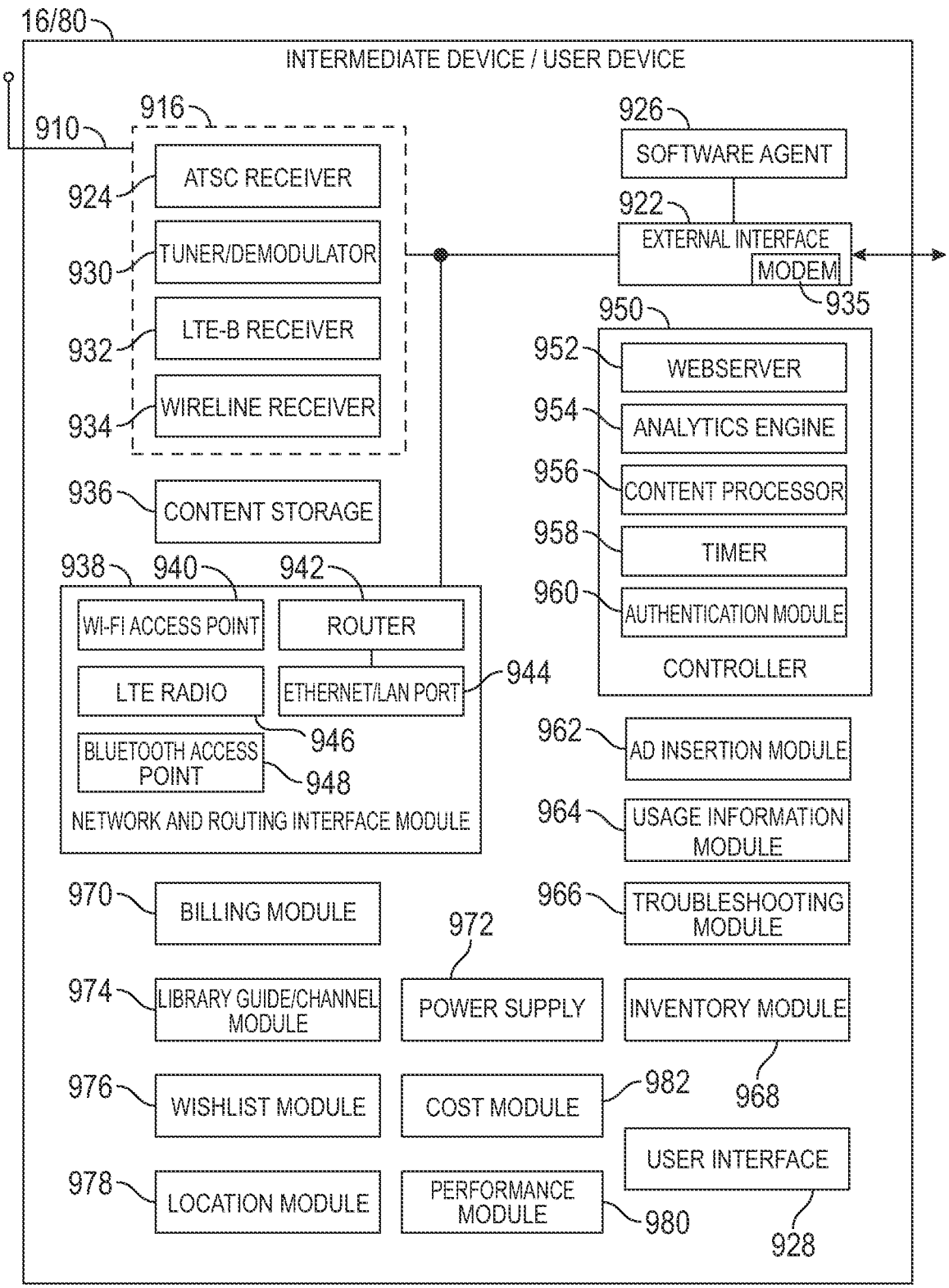
FIG. 9 is a block diagrammatic view of a device within system such as the intermediate device.

Referring now to FIG. 9, the intermediate device 16 or user device 80 is illustrated in further detail. However, the block diagram is also applicable to the node/devices 712-750 and an end user device 760 of FIG. 7, at least in part or in full and therefore specific block diagrams for those devices are not provided. An antenna 910 such as a television antenna or an LTE antenna may be used and interface with the interface 916. The interface 916 may thus be configured to receive LTE-B (eMBMS or MBSFN) or may interface with an ATSC receiver 924 or an LTE-B receiver 932 or for receiving over-the-air television signals with dormant capacity. The ATSC receiver 924 may be an ATSC 3.0 receiver. Thus, the intermediate device 16 may have a tuner demodulator 930 for tuning to and demodulating the signal received over an external input interface 922. A software agent 926 may communicate to and from the intermediate device 16/user device 80. Certain data may be required to be received in certain formats from different devices. Likewise, data can be communicated to other devices though the software agent 926. The software agent 926 may be an application used for requesting and receiving content for use, such as playback. A user interacts with the software agent 926 or application using the user interface to identify the content to be played back or data requested. More particularly, when the application is in a user device and the content or data is stored in an intermediate device and the user of the user device wants to use the data in non-real time (from the first time when it was stored in the intermediate device), a request for the content is made from the application at a second time. The second time is later than the first time and thus real-time consumption from the point of view of when the content is stored at the intermediate device is not performed. Non-real time consumption of the content or data at a first user device of the plurality of user devices is performed at a second time later than the first time. Later and in real time, the content or data from the intermediate storage device is communicated to the user device and is consumed at the user application and the user device immediately when requested. The content may be communicated though a local area network from the intermediate device to the requesting user device.

A user interface 928 such as a keyboard, a remote control, a mouse, a touchscreen, a button or buttons, a switch or switch, a dial or dials may be used to communicate to the intermediate device 16 or the user device 80. Content selections, wish list selections control selections may be controlled or indicated though the user interface 928.

The tuner demodulator 930 may also tune and demodulate the L-band signal or an ATSC signal received through the input interface 922. The tuner demodulator 930 may also have error correction therein such as forward error correction (FEC). The LTE-B receiver 932 for receiving external inputs from the interface 922. The LTE-B receiver 932 receives the broadcast signals over an ATSC system. A wireline receiver 934 may be used to receive networking traffic. The wireline receiver 934 may be a USB or HDMI interface.

The external interface 922 may also represent a connection to the Internet 18 through the wired or wireless communication network. That is, the external interface 922 may comprise a modem 935 for communicating content to the intermediate device 16/user device 80.

The intermediate device 16/user device 80 includes content storage 936 that is used to store content therein. The content storage 936 may include solid-state devices or a hard disk drive.

A networking and routing interface 938 may include various network and routing access points. For example, a Wi-Fi access point 940 may be used to interface with a router 942. However, the router 942 may also be used for wired communications using the Ethernet/LAN port 944. The networking and routing interface 938 may include an LTE radio 946 for communicating LTE radio signals from the device. The LTE-B receiver 932, as well as the LTE radio 946, may be incorporated into a signal unit. The intermediate device 16/user device 80 may also communicate using Bluetooth. That is, a Bluetooth access point 948 may be incorporated into the network and routing interface module 938.

The intermediate device 16/user device 80 may include a controller 950. The controller 950 may perform many functions, including as a web server 952, an analytics engine 954 and a content processor 956. Although individual interconnections are not illustrated in FIG. 9, the controller 950 may control the underlying timing and functions of the various modules within the intermediate device. The web server 952 may communicate content from the intermediate device in an IP format. The controller 950 may also tune to the data at predetermined times as determined by the timer 958. The timer 958 may be synchronized with various other intermediate devices within the system using GPS or internet-based time standard. The content processor 956 tunes to receive the content at predetermined times as a broadcast and/or a unicast, manages the storage of the content, verifies the integrity of the stored content and receives and manipulates manifest files, which provide instructions for downloading the content. The analytics engine 954 handles the intermediate device-based analytic functions for the system.

Neighboring intermediate or other devices may also receive and transmit from the intermediate device 16/user device 80. The network and routing interface 938 may communicate with other intermediate devices for receipt of content, content chunks or missing content at the content storage 936. Missing content may occur when network errors, hardware errors or weather prevent the content from being received at the content storage 936. Communication with other intermediate devices may take place using the web server 952 using an internet protocol.

The network and routing interface 938 may communicate a request signal to the communication system provider 12 or the content service provider 90 to request content chunks or missing content at the content storage 936. The communication system provider may communicate the requested content in a unicast manner using dormant capacity to the requesting intermediate device. A complete broadcast retransmission may also be performed in response to the request. Retransmission may occur if a significant number of intermediate devices request particular content.

An authentication module 960 may also be included within the controller 950. The authentication module 960 may communicate authentication signals to the communication system provider or for the content service provider so that the devices may intercommunicate properly. An unauthorized device may not be able to receive content from the communication system provider.

An ad insertion module 962 may be used for inserting ads at predetermined times during a broadcast. The ad insertion module 962 may splice ads based upon user preferences that are predefined. The ad insertion module 962 may act in response to a trigger for inserting advertisements that may be stored within the content storage 936.

A usage information module 964 may provide the communication system provider 12 or the content service provider 90 with information as to the usage of various information, content and programming within the intermediate device 16/user device 80. By providing the usage information, content of interest may be communicated to the intermediate device 16/user device 80. Usage information may also be data related to monitoring the utilization of the network that communicates the signals to the intermediate device 16/user device 80. The intermediate device or user device may provide to the distribution system with data regarding the use or downloading of certain content or content genres.

A troubleshooting module 966 is used for transmitting troubleshooting information over the outbound signals to the analytics engine for analysis to identify problems with sourcing video files or the installation of the intermediate device 16/user device 80.

An inventory module 968 stores an inventory of the content stored within the content storage 936. The inventory module 968 may also be used to remove content that has expired per the metadata received with the content. After the content expires, the inventory module 968 removes the content to free space within the content storage 936.

A billing module 970 may transmit billing information from the intermediate device 16/user device 80 to the content service provider 90. The billing module 970 may collect viewed content and other information to provide billing to the owners of the intermediate device 16/user device 80. The billing module 970 may also report inventory data from the inventory module 968 to the intermediate device.

The intermediate device 16/user device 80 may also include a power supply 972 for powering the various modules therein.

The intermediate device 16/user device 80 may also include a library guide/channel module 974. The library guide/channel module 974 will be described in further detail below. The library guide/channel module 974 may be used to assemble a program guide or virtual channel based upon the contents stored within the content storage 936.

The intermediate device 16/user device 80 may also include a wish list module 976. The wish list module 976 may allow the user of the intermediate device or other device to establish a wish list for content to be received in the future. As mentioned above, the wish list set forth in the wish list module 976 allows the content distribution system 10 to pre-position desired content by the users.

A location module 978 may also be provided in the intermediate device 16/user device 80. The location module 978 may be coupled to a GPS of a mobile device. The location may vary due to movement and thus the delivery of content and the resources associated therewith may be adjusted as mentioned above. In a stationary device, the location module 978 may be configured during setup with an address. Both the wish list module 976 and the location module 978 may be coupled to the content storage 936 for storing the data therein.

A performance module 980 may also be disposed within the intermediate device 16/user device 80. The performance module 980 may monitor the network conditions both upstream and downstream of the device. The performance module 980 may communicate back to the content distribution system 10 a signal that corresponds to the performance feedback or radio metrics of the communication network or networks. An efficiency metric may be determined that corresponds to the efficiency of that portion of the communication network associated with the particular device. The performance module 980 generates a data signal that provides data corresponding to the upstream or downstream efficiency of the network of the system around the particular component of the communication network. The efficiency metric data is communicated to the content distribution system 10. Examples of performance feedback or radio metrics include but are not limited to signal-to-noise ratio (SNR), signal-interference-to-noise ratio (SINR), channel quality indicator (CQI) and other related metrics.

A cost module 982 may also be incorporated into the intermediate device 16/user device 80. The cost module 982 may have a cost associated with the use of the network, a cost associated with the use of the compute, and a cost associated with the use of storage. The cost may vary depending upon the time of day and various system resources. The cost may be provided in monetary terms or in some relative data.

Figure 10:
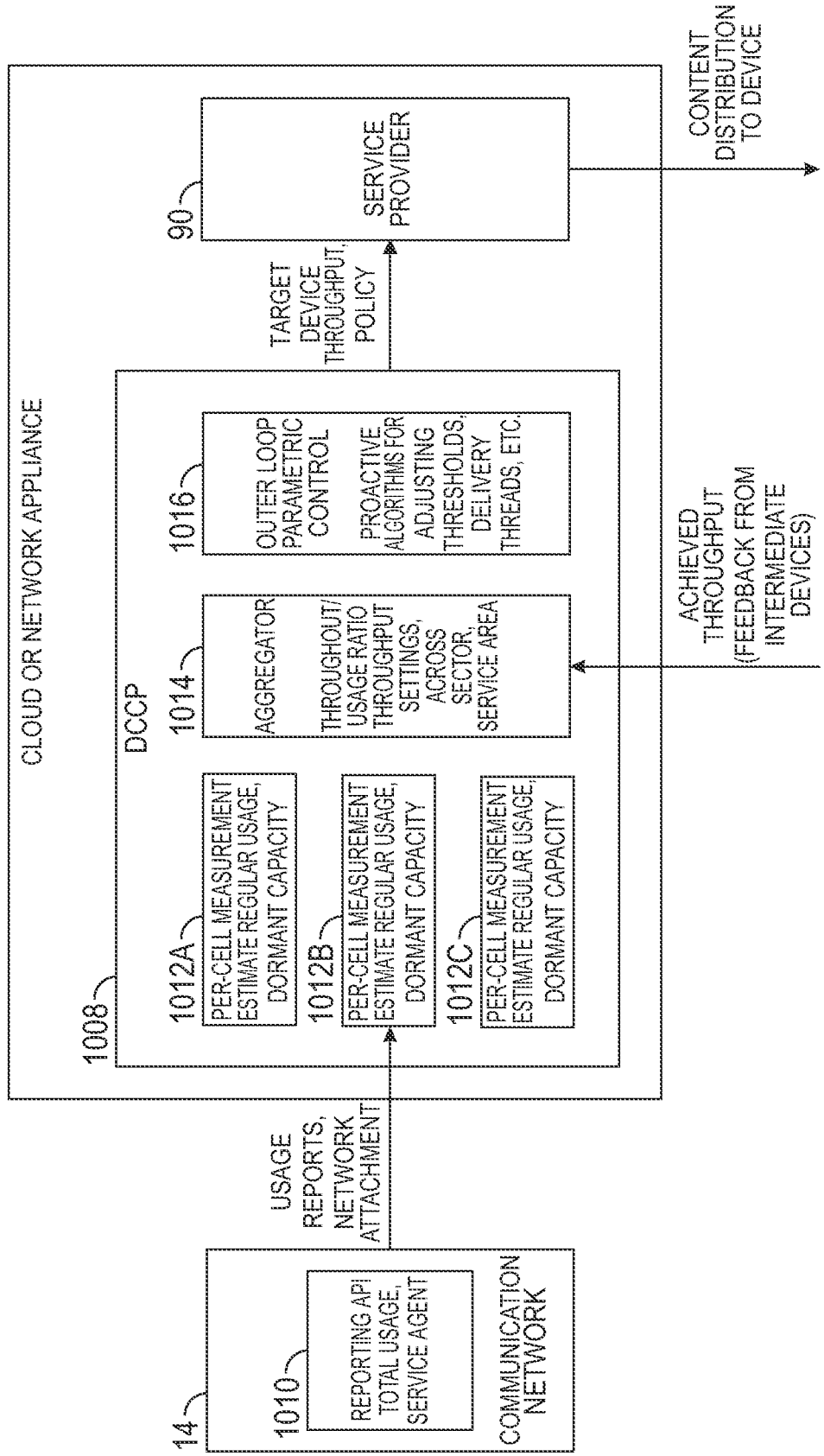
FIG. 10 is a high-level block diagrammatic view of a dormant capacity control protocol system.

Referring now to FIG. 10, dormant capacity can be capacity available outside of the capacity that is required to serve a similar type of traffic that is increasingly served during peak network use and served less-so during non-peak network use. Dormant capacity can also be capacity available for content pre-positioning at the intermediate devices or user devices and within their content storage and subsequent consumption of that content by users directly from the intermediate devices, and which is not the capacity required for real-time voice and data requests from users or for distribution of content to users and for its immediate consumption. To identify dormant capacity usage patterns of the "primary, non-dormant" network may be reviewed. Dormant capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as broadcast communication networks such as cellular, television broadcast, cable television, satellite and the like.

The dormant content delivery system may also be used for delivering device, software and application updates that are associated with the intermediate device or user devices associated with the intermediate device. An inventory list may also include device identifiers, software identifiers and application identifiers. The inventory list may also list the devices associated with the various software and applications.

In FIG. 10, a dormant capacity control protocol (DCCP system) 1008 is used to harvest unused or dormant capacity in networks so that content is stored in the intermediate devices 16 or the devices 712-750 in locations close to where the user consumes the content using an unconstrained medium, such the local area network 310 (Wi-Fi, Ethernet etc.). In the example set forth below, the DCCP system 1008 manages dormant radio resources in a wireless cellular network. However, the teachings are equally applicable to other types of networks, such as satellite systems or combinations of different types of networks such as those described above.

The content distribution service of interest (referred to herewith as "service") provided by the content service provider 90 uses inputs from the DCCP system 1008 to determine how much data can be delivered and preposition content using dormant capacity. The goal is to leverage as much of dormant capacity as possible, without contending with regular network traffic at all. The system continually adjusts its operational parameters and capacity usage targets, based on metrics received from the network 14 and the intermediate devices 16, to provide elastic dormant capacity management. The desired dormant capacity may vary by time of day and may be determined by input from the operator of the communication system 12. For example, at certain times of the day more dormant capacity may be used as a buffer, such as in rush hour, than other times of the day such as after in the overnight hours.

DCCP system 1008 uses reports from a reporting application interface (API) the network 14 on resource usage to determine network capacity usage—and hence estimate available dormant capacity. The network capacity may be calibrated when no service data is being communicated. This may be performed at various times. In an exemplary cellular network, the reports are communicated using report signals and may by provide data, for example, on physical resource block (PRB) usage within the radio network, received from the network 14 on a per-cell basis. In a cellular network, PRB usage is most effective as a capacity usage measurement metric, since it gives a concrete view of how much of a radio capacity of a cell is being used. DCCP system 1008 uses the metrics to determine the rate at which the service provider can deliver data to devices through the network 14.

The DCCP system 1008 uses resource usage reports to determine the total usage level in the network 14 (referred to herewith as "total usage"). The DCCP system 1008 also determines, from the report data, the level of the capacity of the network being used by regular traffic (e.g., in a wireless network, the percentage of a cell's radio resource blocks used by regular traffic). The regular capacity associated with the communication system provider is referred to as herewith as "regular usage". The DCCP system 1008 then determines the maximum dormant capacity (in this example, in terms of the percentage of network resources) available for use by the service provider 90. This is the available dormant capacity, which may be expressed as the percentage of the total or overall system capacity, and is referred to herewith as a maximum dormant capacity) Max Dormant Capacity.

An upper bound can be used for the Max Dormant Capacity. For example, a 70% threshold could be employed, which means that the DCCP system 1008 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The service provider 90 utilizes changing dormant capacity to the fullest extent possible while not causing contention with regular network traffic or creating disruptive traffic spikes. The maximum dormant capacity may be expressed as Max Dormant Capacity=total usage threshold−regular usage The DCCP system 1008 also uses the network reports to estimate the level of usage of network resources by the service provider 90 (referred to as "service usage"). In an exemplary cellular network, service usage would signify the average instantaneous percentage usage of a cell's capacity by the Service. The DCCP system 1008 measures the actual throughput (amount of data over time) achieved by each device such as a user device 80 or an intermediate device 16 (referred to from here on as "intermediate device") that receives a delivery during the reporting period. Each intermediate device 16 may communicate the throughput as an achieved throughput signal that is ultimately communicated to an aggregator 1014 of the DCCP system 1008.

Service usage can either be reported explicitly by the communication network 14 or can be estimated by DCCP system 1008 from total usage and regular usage, e.g., service usage=total usage−regular usage. If the communication network 14 reports to the DCCP system 1008 the total usage and regular usage for a reporting period, service usage can be accurately determined.

If only total usage is reported by the communication network 14, the DCCP system 1008 can estimate service usage in one of two ways. In the first way, a previously reported (by the communication network 14) accurate value of regular usage, and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+the previous period's regular usage), and using the delta (Δ) between actual total usage (reported for the current period) and this target to estimate regular usage and service usage. For example:

Delta (Δ) (for this reporting period)=total usage−
(Max Dormant Capacity used in Current
Period+Previous Period's regular usage)

regular usage (for this period)=regular usage (previous period)+Delta*<Factor-1, e.g. ½> service usage (for this period)=Max Dormant Capacity used in Current Period+Delta*<(1−Factor-1), e.g. ½>

The "Max Dormant Capacity used in current period," in turn, is estimated based on the Max Dormant Capacity value determined at the end of the prior cycle, i.e., the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the Service, i.e., asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold−regular usage.

The approach serves to continually adjust the operational settings of the DCCP system 1008 to counter spikes and dips in network capacity usage driven either by increases in regular network usage or service usage.

Throughput targets are set based on DCCP system 1008's learned correlation between achieved throughput and resource usage. DCCP system 1008 uses prior measurements of achieved throughput and resource utilization to establish a throughput to usage ratio. DCCP system 1008 then uses this ratio, in conjunction with available dormant capacity, to set and throttle throughputs to intermediate devices moving forward.

For unicast delivery, DCCP system 1008 learns the correlation between the achieved throughput for an intermediate device 16 and the network resource utilization for the delivery of content to that intermediate device 16 in prior reporting cycles. For a single cell wireless sector, for example, resource usage would be the usage in the cell of interest. For a multi-cell (multi-carrier) wireless sector, this would be the average resource usage across the cells in the sector. The throughput to usage ratio is an efficiency or radio metric that reflects the quality of radio conditions that the intermediate device 16 has been experiencing. The usage is resource usage (Percent or a fraction of cell capacity used). A higher ratio value would indicate more favorable radio conditions, since the intermediate device 16 is able to extract a higher throughput for a given level of resource usage. This ratio is combined with available dormant capacity to determine the throughput target to an intermediate device 16 for a given content delivery cycle. The throughput to usage ratio is continually refined and fine-tuned, based on continuous (cycle-by-cycle) measurements of throughput and resource usage.

The throughput to usage ratio and associated adjustment procedures provides another level of elasticity or "breathing" to the system. This approach uses continual measurements of network resource usage (by regular network traffic and by the service), as well as intermediate device throughputs, to fine-tune the ratio and continually calibrate target throughputs.

The associated content distribution service provider 90 may utilize unicast or broadcast transport schemes to deliver and preposition content to intermediate devices 16 using the dormant capacity. For example, modern cellular networks provide both broadcast and unicast transport types. With unicast, the service provider 90 delivers content to one device at a time. The service provider 90 can adopt a round-robin scheme to simulate broadcast delivery to devices. With broadcast, the same content stream is delivered to multiple devices simultaneously. Broadcast uses radio resources much more efficiently and delivers significantly improved spectral efficiency, since it uses the same set of radio resources to service many devices. The DCCP system 1008 manages dormant capacity to service both unicast and broadcast delivery approaches.

Within a delivery cycle, the DCCP system 1008 determines an appropriate mix of unicast and broadcast loads to be targeted by the service provider 90. This mix may be a proportion and can be managed to optimize for capacity (system throughput) or coverage. Such a decision would determine the broadcast/unicast "cutoff", i.e., the coverage threshold (e.g., signal strength, SINR) below which a particular device's link is deemed to be too weak for the device to be included in the broadcast group.

The proportion can be managed to optimize for capacity (system throughput) or coverage, or any other number of parameters including proportion of content to be delivered destined for one or a small number of intermediate devices, vs. proportion of content to be delivered destined too many intermediate devices, and the overall level of priority of that content. That is, if content to be delivered destined for one or a small number of intermediate devices becomes significantly higher priority than the content to be delivered to many intermediate devices, then unicast delivery can be used to deliver that content (since it's more efficient than broadcast for delivery to only one intermediate device or a small number of intermediate devices, until such priority is equalized, at which point broadcast can be used to deliver content to be delivered destined for many intermediate devices.

In essence, this becomes a linear optimization problem— optimizing the mix of number of devices included in the group, vis-a-vis the modulation and coding scheme (MCS) that can be applied to transmissions to the group (the MCS, in turn, directly influences the data rate), and the revenue obtainable to the service provider 90 from the service being delivered.

One dimension of the decision between broadcast and unicast may revolve around whether to choose a smaller broadcast group of devices with much better radio conditions (enabled for higher throughput covering fewer devices), and delegate the other devices to unicast, vs. choosing a larger broadcast group with a lower SNR/signal strength cutoff, enabled to receive lower throughput but covering a large number of devices—effectively maximizing the aggregate throughput achieved. The decision may be different for different communication system providers. One choice may be that may be used in determining broadcast versus unicast is when creating a smaller broadcast group of intermediate devices when significantly higher-fidelity conditions (receiving a higher modulation and coding scheme (MCS), higher throughput) maximizes system throughput. Higher MCS use translates to higher spectral efficiency. Another choice may be when creating a larger broadcast group of intermediate devices, some in slightly weaker radio conditions (i.e., having a lower cut-off) produce a higher throughput product. Broadcasting delivers higher overall spectral efficiency, given the same set of radio resources being used to serve a number of users. Hence, a larger broadcast/unicast split would increase spectral efficiency.

The linear optimization is an attempt to arrive at the right mix that produced the highest throughput and spectral efficiency.

Another dimension of the broadcast unicast mix decision may revolve around revenue maximization. That is, a smaller broadcast group of premium (high-paying) users may be prioritized when higher aggregate revenue from the content being served is higher. Conversely, a significantly larger group of lower-revenue users may be chosen to be unicasted when higher aggregate revenue is generated.

An additional constraint may be a predetermined upper broadcast capacity limit on the amount of broadcast capacity of the dormant capacity usable by the service provider 90 that is used. The predetermined upper broadcast capacity limit may be a percentage or fixed amount of system resources that are applied to broadcast (e.g., capping broadcast capacity of the dormant capacity at 60%+/−5% of total system capacity), which may be set forth as Target Broadcast Usage=MIN (Max Broadcast Usage, Max Dormant Capacity)

Unicast Service Traffic can then use the remaining dormant capacity

Target Unicast Usage=Max Dormant Capacity−target broadcast usage

Therefore, if unicast is the only delivery mode in use by the service provider 90, then:

Target Unicast Usage=Max Dormant Capacity

The DCCP system 1008 correlates past service usage to achieved end device throughput in a ratio, i.e., throughput to usage ratio=throughput achieved for an intermediate device/ service usage or simply throughput to usage ratio.

The throughput to usage ratio is maintained separately for each intermediate device 16 and is an efficiency metric that reflects the radio conditions of the intermediate device 16 and, in a wireless network, the modulation and coding scheme level (MCS) that the intermediate device 16 is able to use. That is, if the intermediate device's signal-noise ratio (SNR) is high, the system is able to achieve a higher throughput with a given level of resource usage).

The DCCP system 1008 then uses the throughput to usage ratio, and available dormant capacity (Max Dormant Capacity), to set throughput targets ("target throughput") for all the intermediate devices for the next delivery cycle. The throughput targets can be per-device target throughputs for unicast (point-point) delivery, or an average target throughput for broadcast delivery. For example, target throughput=throughput/usage*target unicast usage.

The above calculation has a target unicast usage to achieve the target throughput, based on the known correlation between Throughput and service usage. The service provider 90 then uses target throughput settings, derived from DCCP system 1008, to adjust service usage throughput dynamically to utilize available dormant capacity, maintaining total usage in the cell within an upper bound of the total usage threshold. The idea is to use as much of the dormant capacity as possible, without going over the total usage threshold and creating any contention with regular network users. The process continues, through each reporting/delivery cycle. At the start of each delivery cycle, target throughputs are used to regulate data flow to the intermediate devices. At the end of each delivery cycle, the resource usage report for the period enables DCCP system 1008 to determine actual service usage for the cycle and re-estimate the throughput to usage ratio per intermediate device. As described earlier, Max Dormant Capacity (and hence, target unicast usage) may also be adjusted period-to-period, based on adjustments made to regular usage.

A sudden spike in regular usage results in total usage spiking up (potentially exceeding total usage threshold). This can result in a higher service usage estimate than target unicast usage, and a lower throughput to usage ratio estimate for this cycle. In other words, the DCCP system 1008 sees more resources having been consumed to achieve the target throughput than earlier estimated (i.e., target unicast usage). At the same time, if regular usage is adjusted upwards, target unicast usage may also be reduced. Consequently, a lower target throughput setting is determined for the intermediate device than for the current delivery cycle. In this fashion, DCCP system 1008 self-corrects to bring down total usage to within the total usage threshold, moving forward. The converse happens if there is a sudden drop in regular usage, the throughput to usage ratio is increased, and a higher service throughput is targeted to fill the void.

The service usage determined for a cycle can be higher or lower than the target usage level (target unicast usage) because either: (a) regular usage spiked up or down, resulting in the calculated service usage going up or down; or (b) the prior throughput to usage ratio estimate was not accurate, and service usage was higher or lower than the dormant capacity target. In either case, DCCP system 1008 self-adjusts target throughput to correct the situation. This elasticity, or breathing mechanism, helps maintain total usage within bounds, while using as much of the dormant capacity as is desired.

The logic described above can be applied to a multi-cell (multi-carrier sector) scenario in a wireless network. If a sector has multiple carriers (service providers), each carrier is treated as a cell. A service provider 90 can turn on carrier aggregation in a multi-carrier sector, e.g., in an LTE or 5G network. The DCCP system 1008's multi-carrier handling factors in two dynamics: The intermediate device can move between carriers (cells) within the sector. This can manifest itself as a handover if the intermediate device is active and connected to the communication network. Here, the LTE network becomes immediately aware of the cell change and flags this to the service provider 90. The intermediate device can execute a cell reselection procedure and change cells, in the case where the intermediate device is not actively connected to the wireless network. In this case, the network does not immediately become aware of the cell change. Further, carrier aggregation can occur, i.e., the intermediate device can be simultaneously connected to, send through and receive from, more than one carrier (cell). In LTE, for example, this can happen dynamically—the Network can add cells to/remove cells from an intermediate device at any time. The decisions are typically made by the wireless network's scheduler The multi-cell nature of this scenario leads to the premise that the intermediate device has potential access to the full bandwidth of the sector, i.e., to all carriers in the sector. Two approaches are the possible sector averaging approach and multi-cell attachment aware approach.

In the sector averaging approach, the DCCP system 1008 does not depend on knowing precisely to which cells the intermediate device is connected. It assumes that each intermediate device receiving delivery has access to the overall bandwidth of the sector, and uses sector-averaged values of the key resource usage parameters, i.e., target unicast usage, total usage, service usage and regular usage.

The DCCP system 1008 receives per-cell usage reports from the Network. The network also needs to inform DCCP system 1008 as to which cells (carriers) are configured for the sector, and the primary cell that an intermediate device 16 is connected.

DCCP system 1008 uses various parameters in its calculations and include but are not limited to total usage=average of total usage values for all carriers (cells) in the sector, regular usage=average of regular usage values for all carriers (cells) in the sector, service usage=(average of service usage values for all carriers (cells) in the sector)/number of intermediate devices simultaneously receiving delivery in the sector (the assumption here is that resource usage was shared equally amongst all the intermediate devices that received delivery). Another parameter is target unicast usage=average of target unicast usage values for all carriers (cells) in the sector. Yet another parameter may be throughput achieved=achieved throughput (measured by the system) by the intermediate device in a delivery cycle The numbers are used in the same calculations described generically in earlier sections—to derive throughput to usage ratios and target throughputs for intermediate devices.

The Multi-Cell Attachment Aware Approach factors in precise cell attachment awareness, i.e., DCCP system 1008 is aware of which cells (carriers) the intermediate device 16 is attached to at any given point in time. The assumption here is that the communication network 14 informs DCCP system 1008 when cells are added to and removed from the intermediate device's connection to the communication network 14.

In the Multi-Cell Attachment Aware Approach, the DCCP system 1008 determines per-device resource usage numbers based on measurements from the actual cells that the intermediate device has been connected. The DCCP system 1008 uses one of more of the following parameters in its calculations total usage=average of total usage values across the carriers (cells) the intermediate device has been connected to, regular usage=average of regular usage across the carriers (cells) the intermediate device has been connected to, service usage=average of service usage values across the carriers (cells) in the sector that the intermediate device is connected to, target unicast usage=average of target unicast usage values for all carriers (cells) in the sector and throughput achieved=achieved throughput (measured by the system) by the intermediate device in a delivery cycle.

The numbers are used in the same calculations described generically in earlier sections—to derive throughput to usage ratios and target throughputs for intermediate devices.

For purposes of adjusting targeted throughput, the intermediate device 16 is assumed to have access to the full dormant capacity in the sector, i.e., target unicast usage averaged across all cells in the sector.

Target throughput for an intermediate device for its next delivery period=target unicast usage*throughput/PRB The DCCP system 1008 also manages the number of active threads in the system. Each enabled thread can be considered to be a content delivery task and does round-robin delivery to the intermediate devices, delivering to one intermediate device at a time—a "simulated broadcast" scheme. The round-robin, threaded scheme is another level of protection, aimed at preventing traffic spikes and regular traffic being affected. The number of parallel threads enabled per sector will depend on the regular usage in the sector. An example of a thread allocation scheme is: if regular usage for the sector<a Lower threshold, light up (N−1) Threads, where N=number of carriers in the sector. If regular usage for the sector is between the Lower threshold and an Upper threshold, light up one Thread. If regular usage for the sector>the Upper threshold, then light up 0 Threads (i.e., the system is paused)

The DCCP system 1008 therefore provides an "outer layer" of control in the outer loop policy control module 1016, modulating the use of capacity based on regular usage in the Network. This Thread management adds a layer of multi-carrier elasticity to the "breathing" provided by the base component of the algorithm. The threshold values are configurable and dynamically adjustable based on traffic load.

With broadcast delivery, the Service is able to serve multiple intermediate devices with the same content, using the same set of radio resources simultaneously. Hence, service usage leveraged by broadcast is exploited by multiple intermediate devices.

Broadcast functionality in wireless systems can also leverage simultaneous transmission of identical broadcast streams from multiple time-synchronized cells using the same radio channel. The synchronized multi-cell transmissions are received and combined by a device to achieve a higher signal-noise ratio (SNR), especially for cell edge devices that can hear transmissions from multiple cells. This feature extends broadcast into a multi-cell transmission paradigm, enabling a larger number of devices to receive a broadcast with good quality. Such a set of cells synchronized for broadcast constitutes the service area.

When estimating dormant capacity availability for broadcast, the DCCP system 1008 considers all cells in a service area. How well an intermediate device is served by a broadcast session depends on: (a) the radio conditions the intermediate device is experiencing; and (b) the available capacity of the cells the intermediate device can access.

A related innovation relates to the service provider 90, while using the broadcast service of the communication network, the traffic load may be divided up into multiple broadcast sessions. In this example, a broadcast period consists of multiple broadcast sessions, each representing a portion of the content that the service provider 90 needs to download and preposition in the participating intermediate devices 16 in the service area. The service provider 90 establishes the broadcast sessions in the communication network 14, using available dormant capacity. This is done to make the process more granular, i.e., if the communication network is unable to support the total throughput requested, it will decline some sessions. However, not all sessions are declined.

At the start of a broadcast period, DCCP system 1008 determines available dormant capacity in the cells that comprise the service area and establishes the target throughput for the broadcast period. This target throughput is split across the broadcast sessions established by the service provider 90 through the communication network 14. In an ideal situation, each participating intermediate device 16 should receive the full target throughput. Realistically, this may not happen, because: (a) the intermediate device 16 may not successfully receive all broadcast sessions; and (b) the intermediate device 16 may not receive the full throughput of a session it has received.

One issue is the communication network 14 may decline one or more of the broadcast sessions the service provider 90 has requested to be established. This is part of admission control functionality typically supported by wireless networks. For example, if the service provider 90 has requested the establishment of 20 broadcast sessions at 1 Mbps each, the communication network 14 may decide to admit just 12 of the sessions. This can vary across the cells in the service area. For example, one cell may have the capacity to admit all 20 sessions, whereas another cell in the service area may only have the capacity to admit 15 sessions.

The disparity in the number of sessions may happen because the regular user traffic of the communication network requires enough capacity from the system, to allow for only 12 of the broadcast sessions to be carried out while preserving sufficient capacity for the rest of the regular user traffic. Therefore, some sessions may be admitted only by a subset of the cells in the service area; and hence may not be received by all intermediate devices 16 in the service area. Hence, a given intermediate device that is part of the broadcast period may receive only a subset of the sessions delivered. This occurs when one or more cells allows the establishment of a different number of sessions from the 20 requested, due to the contention with regular user traffic as described above. In this case, cells may have only 12, 15, or 18 or any other subset of 20 sessions admitted.

Similarly, the modulation and coding scheme (MCS) rate chosen for the broadcast in a given service area may effectively be deciphered by only a subset of the devices in a given cellular area. This may be as a result of the SINR of the individual devices in any given cell within the service area, providing for a device to effectively decode a certain MCS rate, or otherwise not be able to decode it due to inferior RF conditions. As such, the throughput achieved by the broadcast session across a cell, may be as high or lower, than the raise sent by the broadcast session. That is, if only 80% of the users are able to receive the 1 Mbps throughput in a session, the average throughput received by an intermediate device in this cell or broadcast session (as the average throughput across all participating intermediate devices in such cell or service area) will be 800 Kbps.

Average throughput received by the intermediate device 16 across a cell or service area then becomes an important metric, and becomes an important factor in understanding efficiency or radio metric of a broadcast—as the % of the throughput sent by a session vs the throughput received by the group of devices. Further, it can then be learned how this efficiency of a broadcast session changes, depending on the MCS level chosen for the broadcast and the robustness of the SINRs of the participating devices. Separately, it can be learned how much the efficiency is dependent on the level of dormant capacity loading attempted vs the level of regular user traffic available across the service area.

Another useful feedback metric is coverage level, defined as the percentage of devices in the broadcast that experienced delivery failure rates of less than a defined threshold value.

At the start of a broadcast period, the DCCP system 1008 determines the Broadcast target throughput for the period. This can be done in different of ways including using a reasonable spectral efficiency target or the radio conditions at the intermediate device 16.

For the reasonable spectral efficiency target 1 bit/sec/Hz is often used as a thumb rule for wireless broadcast systems. The target is applied to target broadcast usage to determine Broadcast target throughput. In other words, multiply the total spectral bandwidth in the available radio resource blocks by the chosen spectral efficiency to get the target throughput. This can be done cell by cell in the service area, based on the available dormant capacity in each cell. A target throughput is thus derived per-cell. An aggregated target throughput value, across all the cells in the service area, then needs to be derived from the per-cell values. This is because the service provider 90 ultimately has to submit one target throughput value, per session, to the wireless network. The aggregation in the aggregator 1014 can be done in multiple ways, including but not limited to choosing the lowest number obtained across all the cells (least common denominator approach)—if coverage maximization is the goal; choosing the highest number obtained across all the cells (the Network can always scale the service back, cell-by-cell, if it cannot meet that requirement); or, determining an "adjusted mean" based on the spread of the individual per-cell throughput values.

The adjusted mean approach takes into account the throughput actually allocated to the service provider 90 by the communication network will lie somewhere between the requested target throughput value and the lowest throughput supportable across the cells in the service area. If the spread of the per-cell throughput values is high, the service could end up receiving a significantly lower throughput than the requested value. For example: if the target throughput values are spread between 10 Mbits/sec and 30 Mbits/sec, and the service provider 90 requests a mid-value of 20 Mbits/sec, the service provider 90 will realistically get a throughput somewhere between 10 and 20 Mbits/sec. This is because the cells with the higher available capacity levels (i.e., capable of providing greater than 20 Mbits/sec) will still only provide 20 Mbits/sec. However, the "less capable" cells will provide throughputs ranging from 10 to 20 Mbits/sec, depending on their available capacity (spectrum) levels.

If, however, the spread is narrow (e.g., between 15 and 20 Mbits/sec), the service provider 90 will not get an allocation far removed from its requested rate. Therefore, taking this spread into account is helpful. The idea here is to choose a net throughput target higher than the average; the deviation from the mean being determined by the spread (standard deviation); the higher the standard deviation, the higher the selected value is above the mean. For example, choosing a value like (Mean+1 Standard Deviation) would make sense.

The target spectral efficiency level can subsequently be adjusted (for future broadcast periods), taking into account achieved throughput and Coverage Level feedback. For the next broadcast period, for the same service area, target spectral efficiency can be adjusted up or down based on the feedback collected.

A more deterministic approach uses measurements of the radio conditions of the intermediate device, to determine a deliverable throughput target more accurately. For each participating intermediate device, the radio channel quality (measured by signal strength, signal/noise-interference ratio (SINR), channel quality indicators, and other similar metrics) is used to determine a target modulation and coding scheme (MCS) level for the intermediate device.

The mapped MCS level reflects the highest modulation order that the intermediate device, in its current radio conditions, can reliably demodulate; as well as the level of channel coding (forward error correction) that needs to be applied to correct errors. The MCS level reflects the applicable spectral efficiency target and is converted to target throughput (for the intermediate device), based on the number of available radio resource blocks (available spectrum). Once this is done, the individual (per-device) target throughputs can be aggregated across all participating intermediate devices 16 in the service area. As explained for the earlier method, the aggregation may involve choosing the mean target throughput value across all the intermediate devices, choosing a least common denominator choice, i.e. the lowest of the per-intermediate device values calculated across all the intermediate devices, choosing a highest common denominator value, i.e. the highest of the per-intermediate device values calculated across all the intermediate devices, choosing an "adjusted mean" value, factoring in the spread across all per-intermediate device target throughput values.

Once the overall target throughput for a broadcast period is determined (Broadcast target throughput), this is divided into multiple parallel broadcast sessions within the period.

Target throughput per Session=Broadcast target throughput/Throughput per Session For example, if the overall throughput target is 20 Mbits/sec, and it is desired to run broadcast sessions with 1 Mbit/sec each, 20 identical broadcast sessions are started up.

At the end of a broadcast period, DCCP system 1008 determines achieved device throughputs and Coverage Level. DCCP system 1008 also determines the Resource Usage—per-cell, and average across the cells in the service area, for the broadcast period. Available dormant capacity is also updated at this point.

For parallel unicast sessions, the DCCP system 1008 continues to manage dormant capacity. Unicast sessions are handled as described earlier, but with the target unicast usage value being used for Max Dormant Capacity, at least while broadcast sessions are simultaneously occurring.

Adjustments Based on Regular Network Traffic Load

Regular metrics from the communication network 14 inform the DCCP system 1008 as to whether the regular traffic load in the network has gone significantly up or down. If network load goes up significantly, DCCP system 1008 can shut down a number of broadcast sessions based on the estimated loading increase. Conversely, new broadcast sessions can be started up if network load is seen to have reduced significantly.

Radio Measurements may be leveraged to fine-tune operation of the system. In addition to collecting and using radio resource usage metrics to manage dormant capacity (as explained so far), DCCP system 1008 can also leverage network quality measurements. For example, signal strength and signal-noise ratio measurements can be used. In some wireless systems, it is possible to obtain signal strength and signal-noise ratio metrics specific to unicast and broadcast, i.e., determine how well the intermediate device can receive unicast signals as well as broadcast signals combined from multiple cells. Additionally, metrics such as latency and jitter can factor in as well.

Measurements can be collected in at least two ways. The first is by having the participating intermediate device 16 collect the radio metrics (e.g., from the modem processing unit in the intermediate device) and conveying them (over-the-top) to the service provider functionality located at the other end of the communication network 14. The intermediate device 16, in many ways, provides the best eyes-and-ears, since it can quantify the precise quality of experience it is receiving.

By deploying a software agents 1012A-1012C in the radio access network, e.g., at the cell level—for example, in an eNodeB in a cellular network. The software agent 1012 here provides a variety of network-side measurements, including radio resource usage information, directly to the service provider 90. Such information may include the regular usage being consumed so that the dormant capacity may be ascertained therefrom.

The DCCP system 1008 leverages the metrics to refine its dormant capacity management. For example, DCCP system 1008 then uses signal strength and or signal-noise ratio measurements to derive the appropriate modulation and coding scheme (MCS) level that the radio network might use to deliver content to a given intermediate device. Using this projected MCS level, DCCP system 1008 can better quantify a target throughput to be used for the intermediate device.

For broadcast, the same scheme can be used to determine the possible MCS level for each participating intermediate device 16 in the service area, derive the average MCS level usable for that population of intermediate devices 16, and then use the MCS level to set a more accurate target throughput for the broadcast period.

Additionally, metrics such as latency and jitter can be used to further refine the understanding at the DCCP system 1008's of the radio conditions of the intermediate devices, and further fine-tune dormant capacity management.

The DCCP system 1008 has an outer-loop parametric control system as illustrated in FIG. 10. Key operational parameters that drive DCCP system 1008 operation such as total usage threshold and Real Usage thresholds for Thread management are either configured (e.g., through a dashboard or programmatic API) or learned. A learning scheme uses historical data to determine day-of-week, time-of-day settings for the parameters. For example, total usage threshold values can be set for different times of the day, and different days of the week, by observing and storing past measurements of total usage, and assessing typical time-of-day, day-of-week total usage values.

In general, the DCCP system 1008 receives per-cell reports with the data described above from the communication network 14 and uses the metrics to estimate dormant capacity and service usage. The aggregator 1014 component then consolidates processing across sectors and service areas (for broadcast) and determines throughput to usage ratios and target throughputs (for intermediate devices or for broadcast periods). Feedback from the intermediate device 16 or 724 informs DCCP system 1008 on real throughput achieved by the intermediate devices 16 or 724. Finally, an outer-loop policy control module 1016 proactively configures the DCCP system 1008 operation with the parameters that drive its operation. The output from the DCCP system 1008 drives the operation of the service provider 90, informing the service as to when to start/pause/resume content delivery and what the target throughputs to intermediate devices are.

The DCCP system 1008 may be used for determining both broadcast and unicast for the mix of broadcast and unicast provided by the service provider 90. An optimum mix may be provided based upon the perimeters set forth above. The target throughput for a broadcast session using dormant capacity or unicast sessions is set forth.

The radio quality metric such as the signal strength or the signal to noise ratio are used to fine-tune the dormant capacity management and operational settings. Outer loop policy controls dynamically adjust the DCCP system operating parameters based upon feedback from the wireless network. The dynamic adjustment of thresholds such as the upper bound traffic usage threshold or the buffer may be changed. The DCCP for multiple unicast and broadcast cell configuration mode is provided. The system can accommodate a single-cell single carrier sector or sector with multiple carriers with or without carrier aggregation. The DCCP system 1008 for dual connectivity scenarios is enabled. Of course, the present system may be used with a variety of wireless technologies including LTE, 5G and satellite technologies.

Post-Positioning of Content

Figure 11:
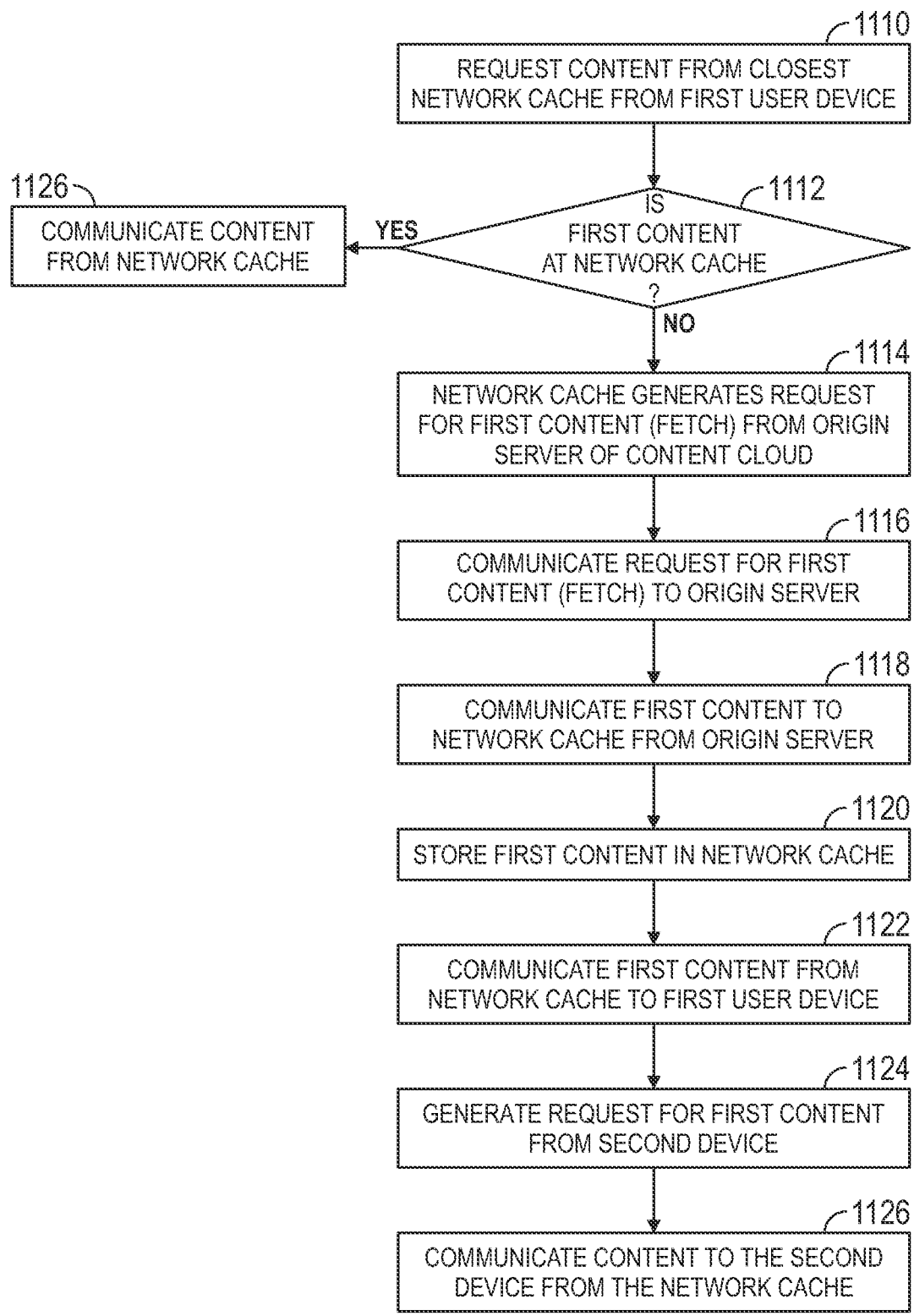
FIG. 11 is a flowchart of a method for post-positioning content.
Figure 12:
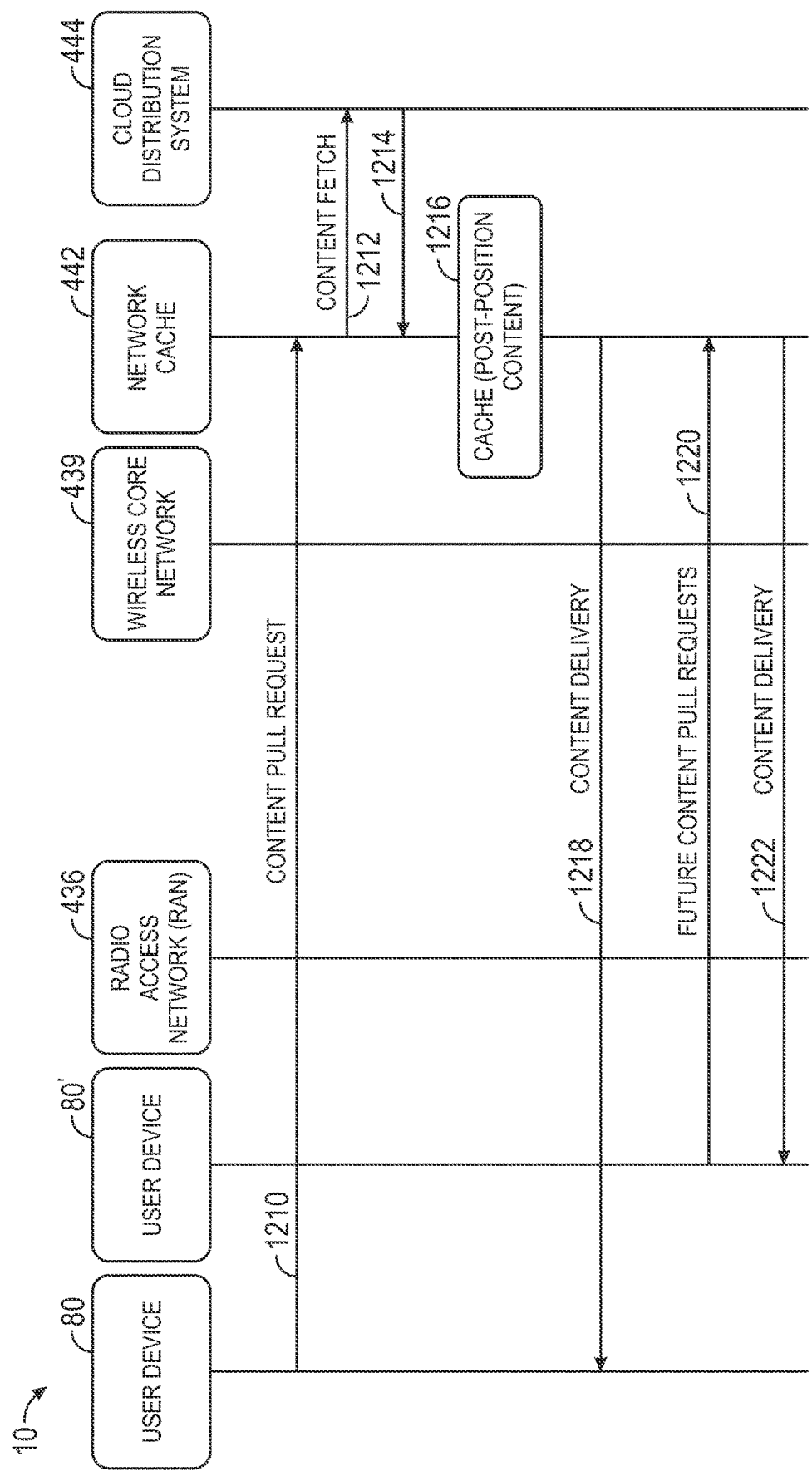
FIG. 12 is a signal diagram for post-positioning content as set forth in FIG. 11.

Referring now to FIGS. 11 and 12, a flow chart in FIG. 11 and signal diagram in FIG. 12 are shown for performing pre-positioning of content. Pre-positioning of content may also be referred to as "opportunistic caching" or "transparent" caching. Ultimately, positioning content at an appropriate level is useful in terms of the network resource use. The levels refer to the distance away from a user and level devices are the devices at those levels. In some examples set forth below, the first level is the intermediate device, the second level is the edge cache, the third level is the network cache and a fourth level is the origin server such as the cloud distribution system 444. Of course, the numbering of the levels is relative, and some levels may not be present.

Another way to view the content distribution system 10 is reference to upstream and downstream. In the figures downstream storage devices are to the left of the upstream storage devices. The most upstream storage device is the cloud distribution system 444 or origin server. The network cache 442 is downstream of the cloud distribution system 444. The edge cache 448 is a storage device downstream of both the network cache 442 and the cloud distribution system 444. The intermediate device 16 is a storage device downstream of the edge cache 448, the network cache and the cloud distribution system 444 (origin server). The user device 80 may also store content and is downstream of the intermediate device 16, the edge cache 448, the network cache 442 and the cloud distribution system 444. Of course, various other devices may be incorporated into a constructed system.

In step 1110 a user device 80 makes a request for content as a content pull request signal 1210. The pull request signal 1210 is communicated to the network cache 442. The user device 80 makes a request (e.g. HTTP request) for the piece of content. The request is routed by the network to the network cache closest to the user geographically.

The network cache 442 is placed strategically in the path of the content pull request signal 1210. Step 1112 determines whether the requested content is in the cache 442. If the requested content requested is not present in the network cache 442, the network cache 442 generates a content fetch signal 1212 in step 1114. In step 1116 the content fetch signal 1212 is communicated to the origin server which may be part of the cloud distribution system 444. In step 1118 a delivery signal 1214 the content from the cloud distribution system 444 to the network cache 442. In step 1120, the network cache 442 cache (stores) the content therein at 1216. In step 1122 the network cache 442 generates a content delivery signal 1218 and delivers the requested content to the requesting user. The content requested may be communicated using dormant or excess capacity of the network as determined by the DCCP as set forth in FIG. 10. While doing this, it should be noted that the network cache 442 also caches the content locally, so that future requests for the same content can be served from the network cache 442 which is physically located closer to the user device 80. In general, the network cache 442 caches (post-positions) the content locally, and returns the content to the user (e.g. in a response to the original HTTP request). The network cache 442 acts as a reverse proxy cache, in essence, forwarding the content request to the origin server.

Future requests for the same piece of content are served from the network cache 442 itself, i.e., where the content is post-positioned. That is, in step 1124 when the user device 80' generates a request signal such as a content pull signal 1220, the network cache 442 generates a response signal or content delivery signal 1222 from the network cache when the same content as was first requested in step 1110.

The post-positioning approach is inherently reactive in nature, i.e., in response to a content consumption request. Request routing schemes (e.g., using DNS or HTTP redirection) are used to route content requests to caching locations.

Pre-Positioning of Content

Figure 13:
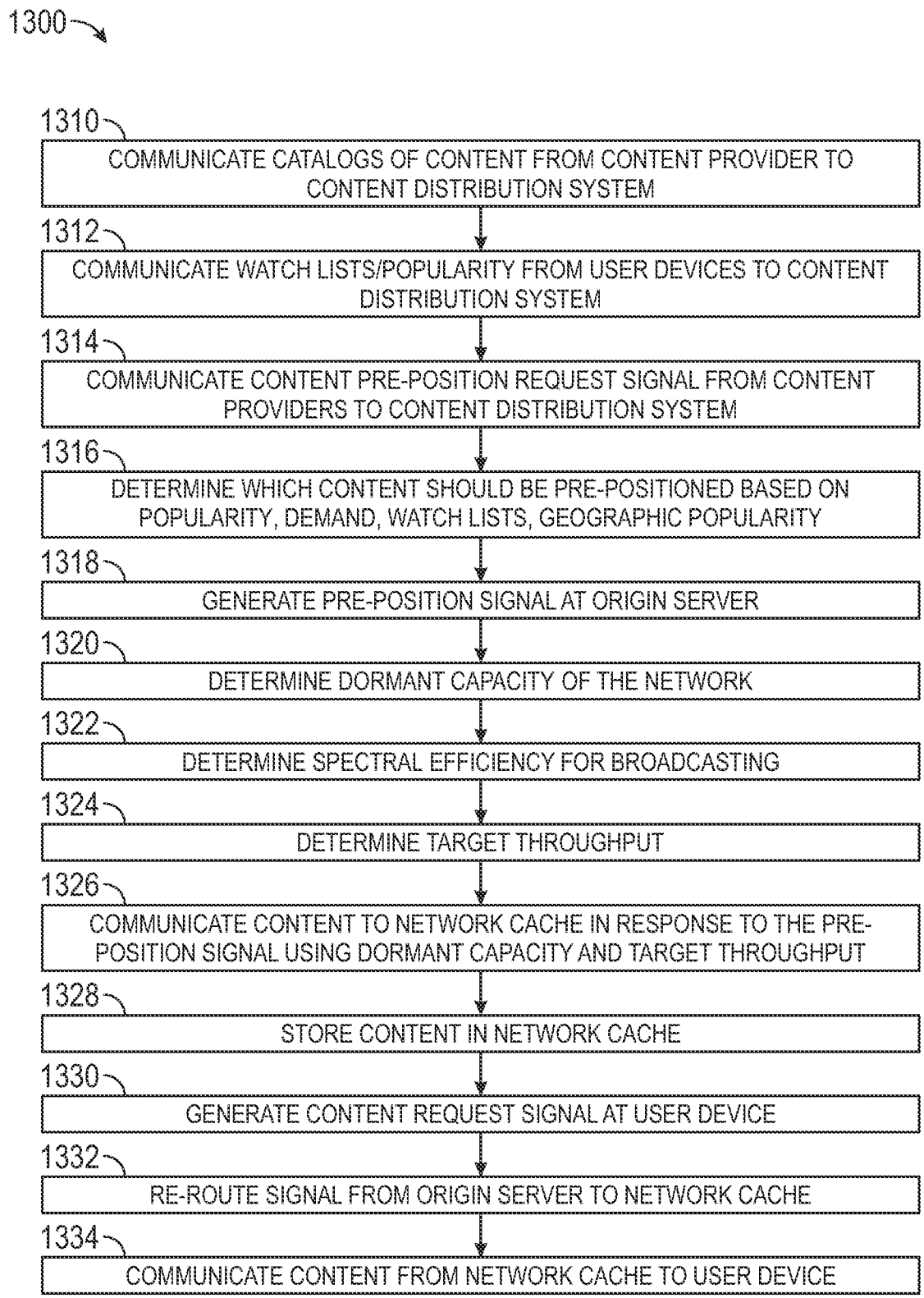
FIG. 13 is a flowchart of a method for pre-positioning content.
Figure 14:
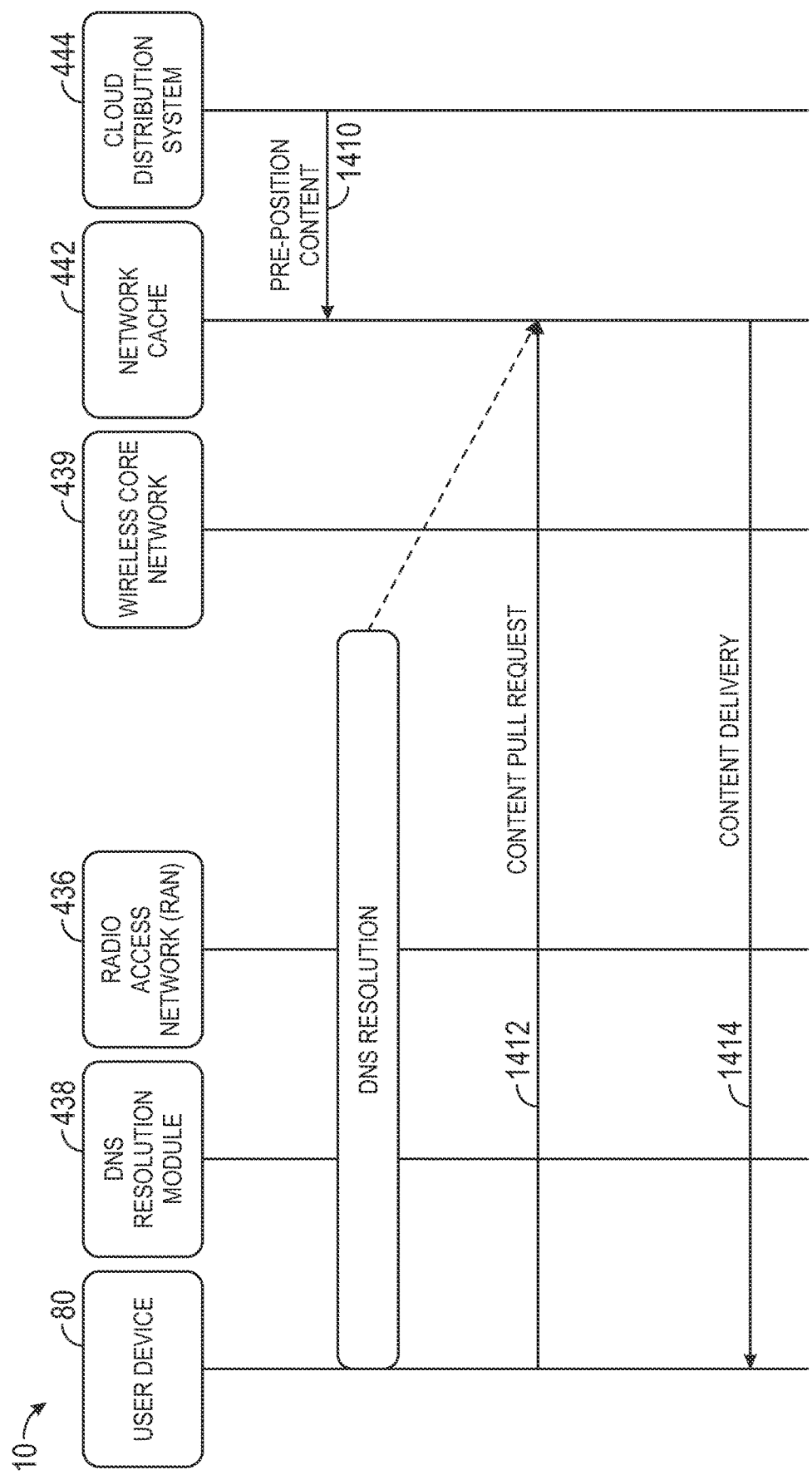
FIG. 14 is a signal diagram of the pre-positioning method set forth in FIG. 13.

Referring now to FIGS. 13 and 14, a pre-positioning mechanism is set forth that is proactive in nature, in that content is positioned at cache locations prior to requests for the content being received from users. With this method, the content distribution system starts off as a 100% post-positioning system operated according to FIGS. 11 and 12. As users start pulling in content, the network cache 442 pulls in and caches (post-positions) content from origin servers, based on its cache misses. In other words, if the network cache 442 does not have a piece of content being requested, it pulls in the content from the origin location such as the cloud distribution system 444 using the origin URL, caches the content and delivers the content to the user (post-positioning).

The content distribution system 10 or the cloud distribution system (which may be one in the same) forms a decision as to what content is to be pre-positioned (pre-positioned content). The decisions on what content to pre-position at various caching locations can be based on various inputs. For example, in step 1310 content delivered by content providers such as content received via catalogs from content providers are obtained. In step 1312 content popularity over all or in specific geographic locations may be determined. Watch lists from various devices may also be used to determine the popularity. The popularity of content pieces in general or the popularity of pieces of content in different geographical locations may be determined. Triggers from users such as users placing pieces of content on watch lists or consuming content of a watch list may affect the popularity. Likewise, similar content being consumed may be considered in the popularity. For example, if a piece of content is popular with certain users, pre-positioning the content in intermediate devices of other users with observed similar preferences may be performed.

In step 1314, content providers may also request content to be positioned in various caches or intermediate devices (specific locations).

In step 1316 the content distribution system determines which content is to be communicated based on steps 1310 through 1314. More specifically, the cloud distribution system 444 may use requests from content providers based on popularity, prior demand and the other factors alone or in combination to determine which content is to be prepositioned.

In step 1318, a pre-position signal 1410 is generated at the content distribution system and more specifically at an origin server such as the cloud distribution system 444.

In step 1320, the dormant capacity of the network may be determined. The available capacity (the dormant capacity) for communicating content by broadcast or unicast may be determined. The dormant capacity may be determined as set forth in FIG. 10.

In step 1322, the spectral capacity of the system may be determined. The modulation and coding scheme may be used to determine the spectral capacity as well as the available spectrum. In step 1324 the spectral capacity may be used to determine the target throughput for communicating the content to the network cache 442. In step 1326 content is communicated from the origin server such as the cloud distribution system 444 to the network cache 442 by broadcasting using the target throughput. In step 1328 in the content is stored at the network cache 442.

In step 1330, the user requests the content with a content request signal 1412. In step 1332, the DNS resolution module 438 may re-route the signal (e.g., via DNS resolution) to the network cache 442 instead of the origin server by changing the URL. The content request signal 1412 (e.g., an HTTP request) reaches the network cache 442. In step 1334 a content delivery signal 1414 is used to deliver the content to the user device 80 from the network cache 442.

Figure 15:
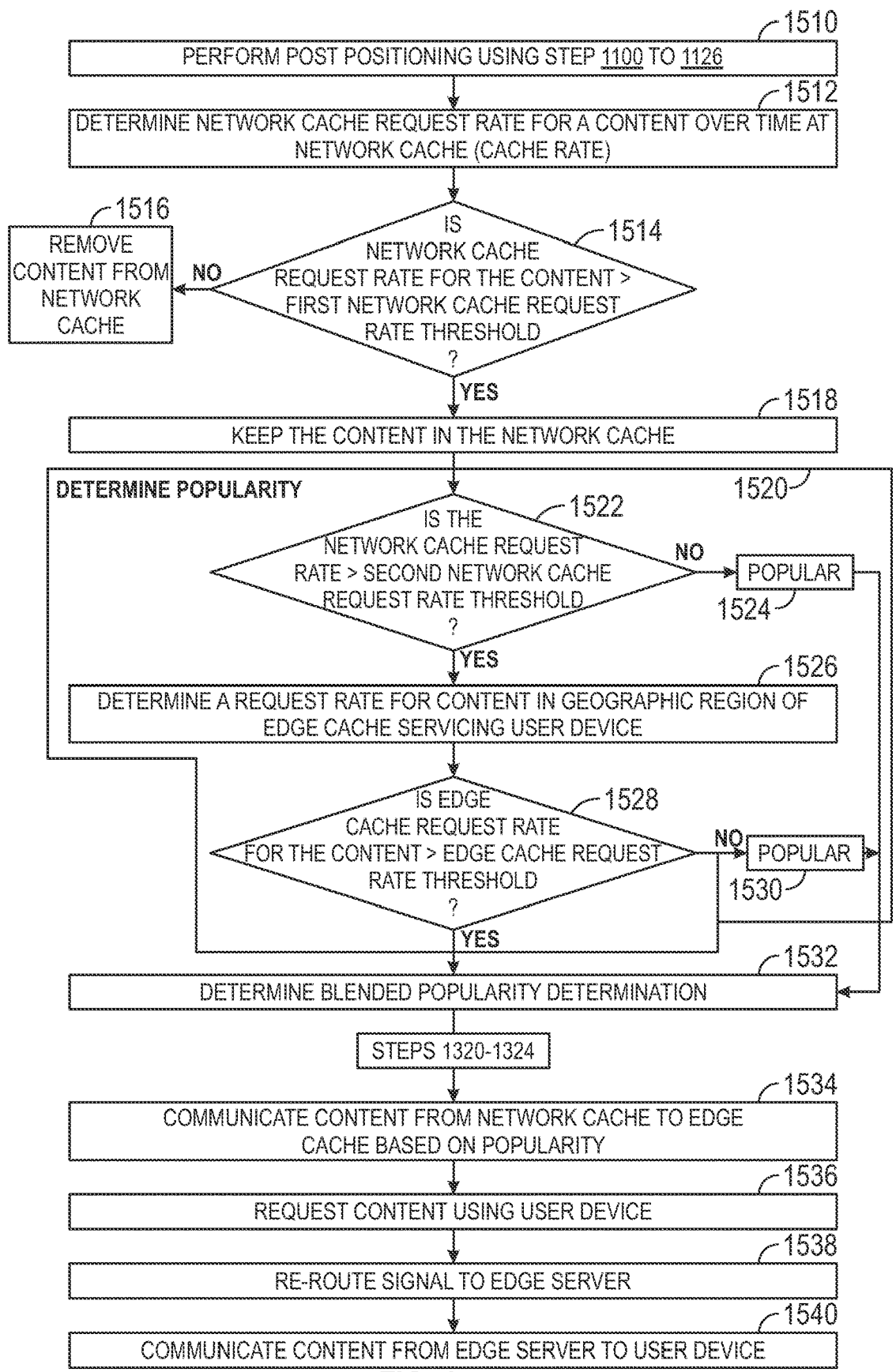
FIG. 15 is a flowchart of a method for pre-positioning content in an edge cache.
Figure 16:
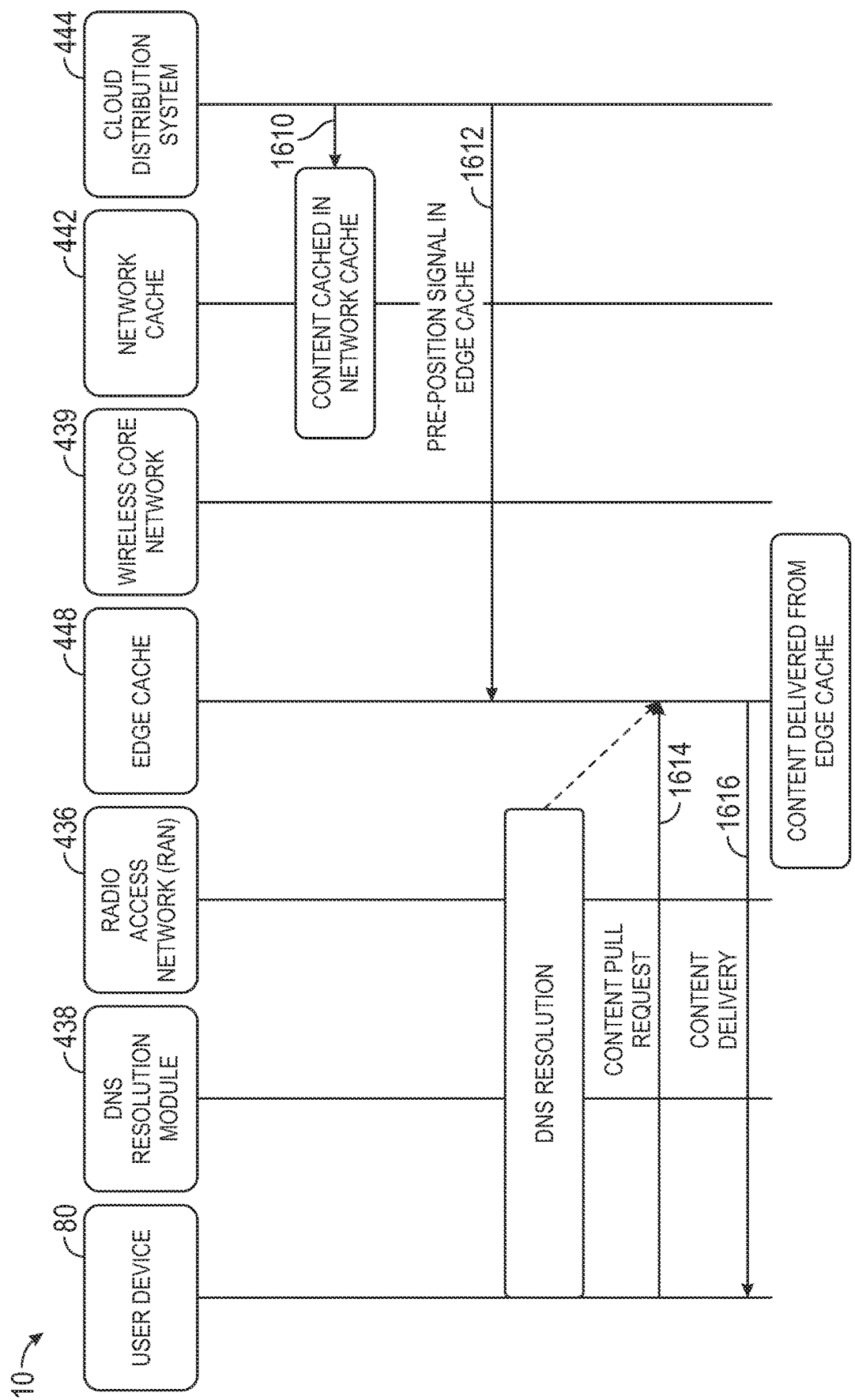
FIG. 16 is a signal diagram of a method for performing FIG. 16.

Referring now to FIGS. 15 and 16, in the various examples pre-positioning content based on post-positioning, i.e., leveraging content post-positioned in caching locations to pre-position the content at various closer locations in the system is provided. Pre-positioning post-positioned content at edge cache locations in the network, e.g., close to cell sites in the wireless access network is performed. The network cache 442 is merely one example of cache. Pre-positioning post-positioned content may be performed at intermediate storage (caching) devices, e.g., in a home or enterprise as well. The end user can consume the content from the intermediate storage device or the closest cache location which reduces the burden on the network. As will be described in more detail below multi-tiered caching (post-positioning combined with pre-positioning at multiple caching levels in the system) may also be performed. At any pre-positioning level using dormant wireless network capacity to pre-position content in intermediate storage devices may be used.

The network cache 442 manages its cache inventory, based on the cache hits for content that is post-positioned. For example, cached content that is getting fewer hits may be displaced from the cache, to accommodate content pieces that are gaining in popularity.

The network cache 442 also pre-positions, at other (closer to the user) caching locations, content that is seeing large request rates in its own cache. These can be edge cache locations, e.g., in an edge cache location closer to a cell site, or all the way down in an intermediate storage device in user premises. This is referred to as "pre-positioning based on post-positioning."

Pre-Positioning in Edge Cache

To begin with, the content under consideration is post-positioned in the network cache in step 1510 by performing some or all of the steps 1110 to 1126. This is illustrated by the signal 1610 in the signal diagram. In step 1512 the request rate for a content at the network cache 442 is determined. The number of hits or request rate means the number of times a particular content was requested from downstream devices such as user devices or intermediate devices. The number of hits may also be determined over a time period. Downstream in this example, is based on the direction toward the user device. The origin server (the cloud distribution system 444) is the most upstream and thus the network cache 442 is downstream of the cloud distribution system 444 relative to which the edge cache 448, the intermediate device 16 and the user device 80 are all respectively downstream. In step 1514 the request rate is compared to a first network cache threshold. When the request rate is below a first network cache rate threshold, the content is removed from the network cache 442. When the network cache request rate is greater than the threshold, the content remains stored in the network cache 442 in step 1518.

In steps 1520 the popularity of the content is used to determine whether to store the content in in the edge cache 448. The popularity may be determined in many ways including as set forth in steps 1522 to 1526. It should be remembered that each network may have a plurality of edge caches distributed in a plurality of geographic regions.

In step 1522 the request rate for the content at the network cache 442 is compared to a second network cache request rate threshold. The request rate was determined in step 1512. When the network cache request rate for the content is greater than the second network cache request rate threshold the content may be deemed popular.

In step 1526, a request rate for content in a geographical region of an edge cache is determined. The request rate corresponds to the devices, such as the user device or intermediate device, in the geographic region of the edge cache that have hit or requested content from the network cache 442. When devices have requested the content from network cache in a particular geographic region corresponding to the edge cache 448, the request rate is increased. In step 1528, when the edge request rate is greater than an edge request rate threshold, the content may be deemed popular in step 1530. Both steps 1524 and 1530 may be blended to determine whether to cache the content at the edge cache 448. Thus, a general caching request may be made based upon step 1522. However, a specific geographic determination may be made with respect to the edge cache and its geographical user or intermediate devices in steps 1526 and 1528. In step 1532, a blended popularity determination is performed. The popularity in steps 1522 through 1526 may be blended to form a popularity determination. However, as mentioned above, only one of the types of popularities may be considered by this system. In the blended popularity request rates for different types of downstream devices like network and edges caches may be considered. Further groups of downstream devices may be considered and compared to a request rate threshold. For example, a network cache request rate and edge cache request rates for edge caches for at least two or more edge caches downstream of the network cache may be used to form a blended request rate In step 1534, when the popularity is greater than one of the request rate thresholds described above or the blended popularity is greater than a threshold, the content is communication from the network cache 442 to an edge cache by the pre-position signal 1612. The content may be communicated from the network cache 442 or the origin server such as the cloud distribution system 444. In step 1536, a request for the content is generated at the user device 80 and intermediate device. The user device 80 may generate a pull request signal 1614 that has an address location for the content. The DNS resolution module 438 may change the address (URL) location to the edge cache 448 rather than network cache 442 or the origin server such as the cloud distribution system 444. The content pull request signal 1614 is thus rerouted to the edge server in step 1538.

In step 1540, the content is communication from the edge server to the requesting device, such as the user device 80, in a content delivery signal 1616. By communicating the content from the edge cache 448, less burden is placed upon the edge cache 448 is located closer to the user device 80. The edge cache may thus also be located close to the radial axis network 436 geographically. Any other devices in the geographic region of the edge server will thus receive the content directly from the edge server.

It should be noted that the communication of content from the network cache to the edge cache in step 1534 may be performed using dormant capacity to the network. Likewise, the spectral efficiency of the network may also be considered during the communication process. That is, steps 1320 through 1324 may be performed prior to the communication of content from the network cache to the edge cache. That is, the communication of content from the edge cache 448 may be based upon the dormant capacity, the spectral efficiency and the target throughput for the network.

Pre-Positioning Intermediate Storage Device

Figure 17A:
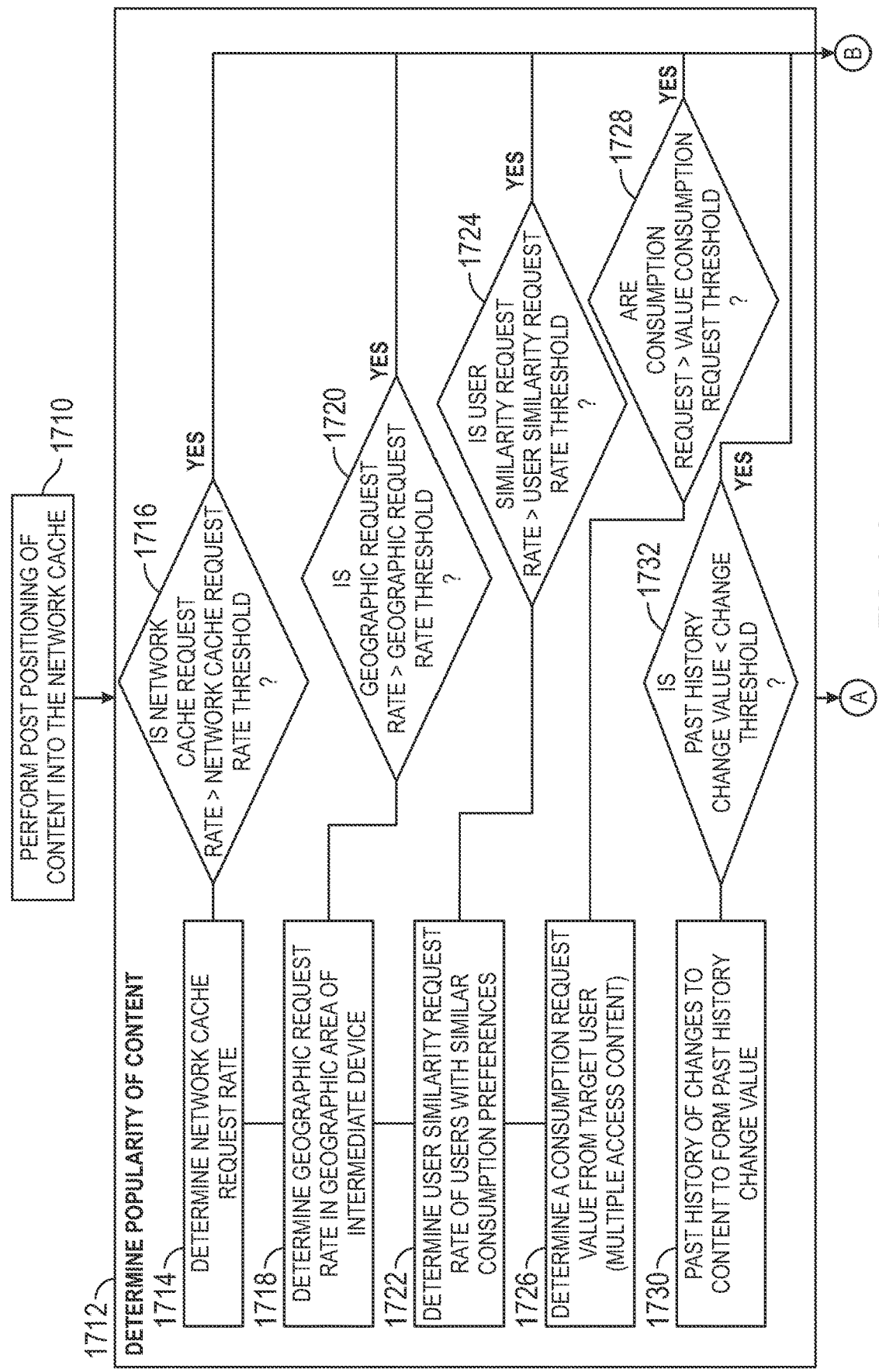
Figure 18:
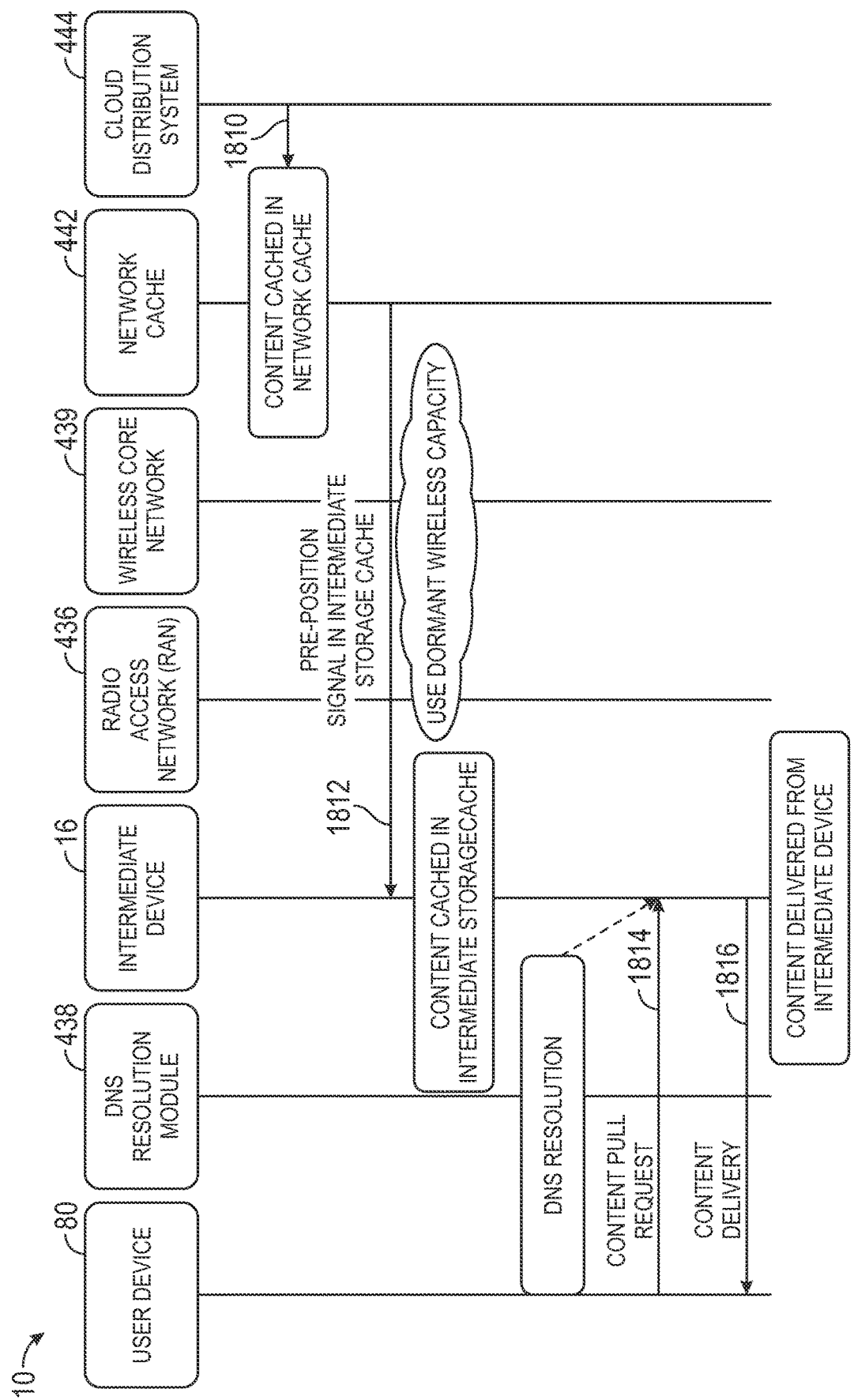
FIG. 18 is a signal diagram of the method of FIG. 17.
Figure 19:
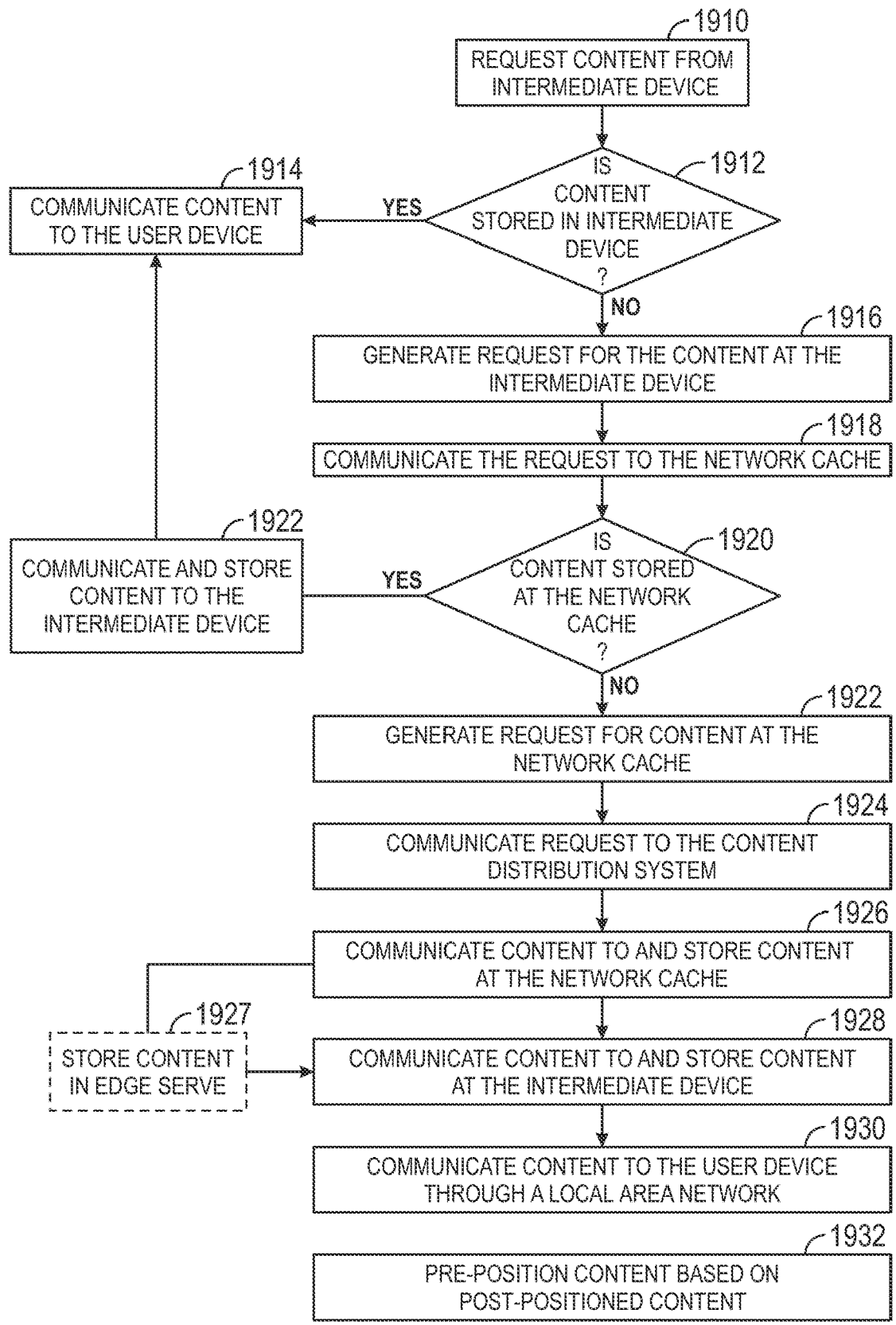
FIG. 19 is a flowchart of a method for multi-tier post-positioning.
Figure 20:
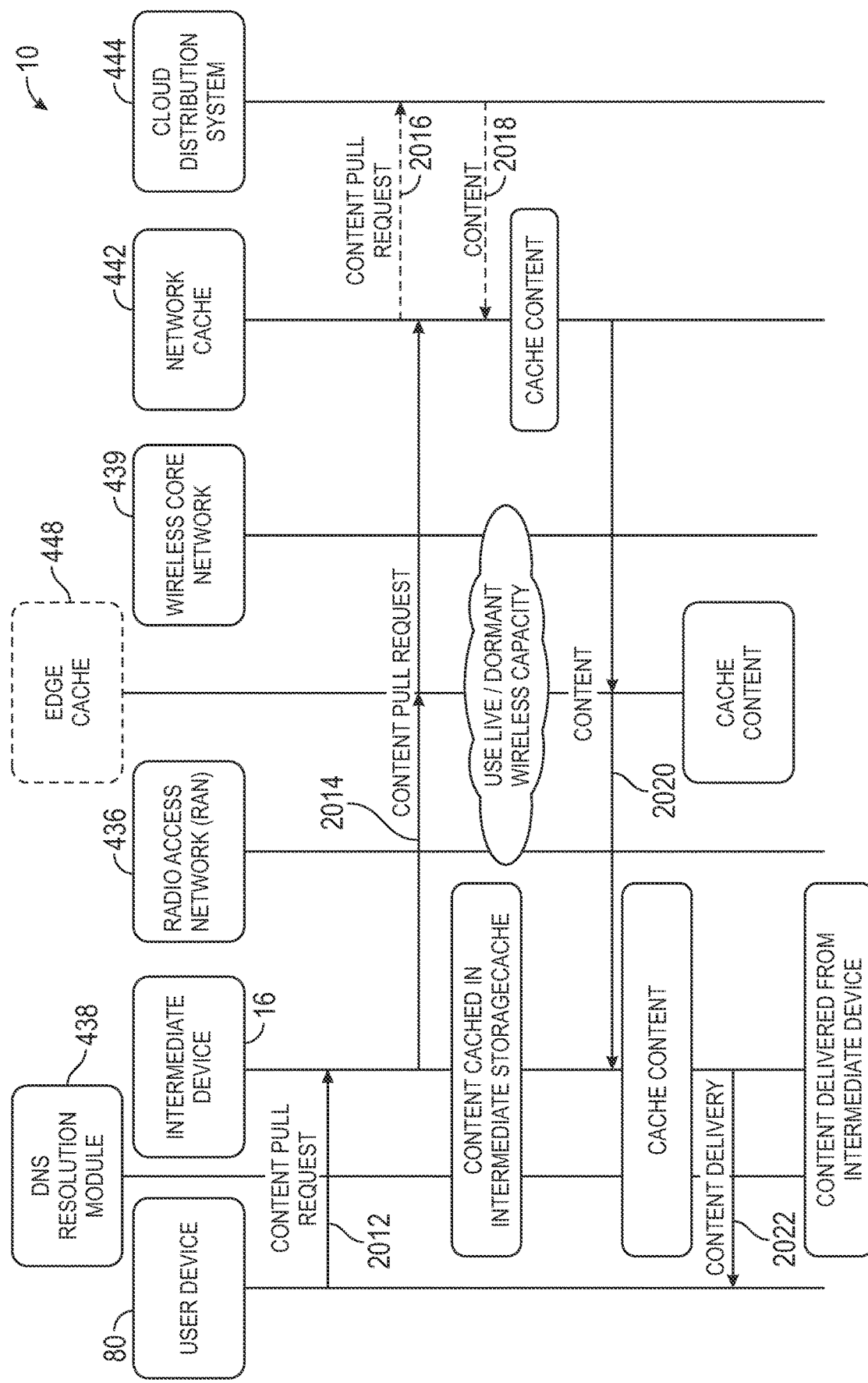
FIG. 20 is a signal diagram of the method of FIG. 19.

Referring now to FIGS. 17A, 17B and 18, a method for pre-positioning the content at an intermediate device 16 (intermediate caching device) is set forth. The content in the network cache 442 may be prepositioned in the intermediate device 16 which is located in an end-user location such as a home, enterprise, venues, roadside assistance site and the like. The user device can then consume the content over the local networks with high performance and low latency because the cache at the intermediate caching device 16 is local and thus the broader network is taxed every time the content is consumed.

In step 1710, post positioning of content into the network cache is performed as described above in step 1100-1126. Some or all of the steps may be performed using the pre-position signal 1810. The method of FIG. 17 may also perform the purging of content from the network cache in steps 1512-1516.

In step 1712, the popularity of the content may be used as a factor in whether to communicate or cache the content in the intermediate device 16. For example, in step 1714, the network cache request rate is determined. In step 1716, it is determined whether the network cache request rate is greater than a network cache request rate threshold.

In step 1718, it is determined whether the geographic request rate in the geographic area of the intermediate device is greater than a geographic request rate threshold in step 1720. That is, step 1718 and 1720 correspond to the geographic area of the intermediate device and whether the request rate is greater than a geographic request rate threshold. That is, when user devices hit or request the content from the network cache 442 in the area of the intermediate device 16, the request rate is increased and thus the content may be popular.

In step 1722, a user similarity request rate is determined. The user similarity request rate is the similarity of users with similar consumption preferences. When the request rate of users with similar consumption preferences is greater than user similarity request rate threshold in step 1724, the content may be considered popular.

In step 1726, a consumption request rate or value from a target user may also be considered. That is, prior consumption requests from a particular user, such as gaming content or various applications, may be accessed by the same user multiple times. When the consumption request rate is greater than a consumption rate threshold in step 1728, the content may be determined to be popular.

In step 1730, the history of changes to content from past history change values may be determined. That is, when content is known to get modify infrequently, this implies that the repeated refreshes of the content may not be needed to the intermediate storage device. In step 1732, the past history change value determined in step 1730 is compared to a past history change threshold. When the past history change value is less than a past history change threshold in step 1732, the content may be deemed popular.

Steps 1716, 1720, 1724, 1728, and 1732 may all be blended to form a popularity determination. One or more of the steps 1716-1732 alone or in combination may be used to determine the blended popularity determination in step 1734. In step 1736, based upon the popularity determined in step 1734, content may be communicated from the network cache 442 (or the origin server 444) to the intermediate device using a prepositioned signal 1812. Prior to step 1736, the system may also consider steps 1320-1324. That is, the content distribution system may determine when dormant capacity is available, the spectral efficiency for broadcasting and determining the target throughput from the spectral efficiency. In step 1736, the content may be communicated to the intermediate device using the dormant capacity, the spectral efficiency and the target throughput for broadcasting. The content may be broadcasted to one or more intermediate device in step 1736. In step 1738, the content is stored in the intermediate user device or devices.

In step 1740, content is requested from a user device 80 using a content pull request signal 1814. The content pull request signal may have an address location for the content being the network cache 442 or the origin server (cloud distribution system 444). Thus, DNS resolution at the DNS resolution module 438 may change the address location of the content to the intermediate device 16. Thus, the content pull request signal 1814 is rerouted in step 1742. In step 1744, content is delivered from the intermediate 16 to the user device 80 using the content delivery signal 1816. The user device 80 thus consumes the content thereafter.

With such this approach, the content distribution system 10 needs to know nothing about the actual assets. The distribution system 10 uses content file names and URLs, and does not need metadata related to the content being pre-positioned, or even know about the relationships of asset files to one another (e.g. which asset files make up a content bundle).

The content distribution system 10 operates with different types of content (movies/shows, games, apps, software etc.) seamlessly and in the same manner, without needing to have any content-related knowledge of what is being transported and cached.

Complex integrations of the content distribution network with content provider systems, i.e., for content discovery (as is typically required with a classical pre-positioning approach). Knowledge of what is popular, and what content to be pre-positioned, is gained purely from a crowd-source approach of observing what is actually being consumed by users.

As mentioned above using dormant capacity in the underlying wireless network (e.g. LTE, 5G and others) to pre-position content in intermediate storage devices may be used.

The content distribution system 10 interfaces with the wireless network (e.g. LTE, 5G etc.) to obtain metrics quantifying network capacity usage (e.g. % of Physical Radio Blocks used by traffic within a cell).

The content distribution system 10 determines the quantum of dormant capacity available in the network, real-time (e.g. in terms of % of Physical Radio Blocks available within a cell). Dormant capacity is the residual unused capacity in the wireless network, i.e. capacity remaining unused after the needs of all live users have been met. (Using dormant capacity implies not contending for network capacity with live users. The user is not charged for dormant capacity usage, e.g. it does not contribute to the user's usage caps etc.).

The content distribution system 10 pre-positions content to each storage device, using a target throughput based on: (a) the available dormant capacity at that point in time; and (b) factoring in the radio conditions of the device, and hence the spectral efficiency that can be applied to the data delivery.

Multi-Tier Post-Positioning/Caching

The content distribution system 10 may also be used for multi-tier post positioning and caching. Caching is supported all the way down to the storage devices at the premises of the end user or business. In step 1920, a request for content from an intermediate device 16 is performed from a user device 80. A content pull request signal 2012 is generated at the user device 80 and communicated to the intermediate device 16. The pull request signals described herein each have content identifiers to identify the content wanted. If the content is stored at the intermediate device as determined in step 1912, the content is communicated to the user device from the intermediate device in step 1914. However, if the content is not located at the intermediate device as determined in step 1912, step 1916 generates a request for content as a content pull request signal 2014. In step 1918, the content pull request signal 2014 is communicated to the network cache 442. In step 1920, it is determined whether the content is stored at the network cache 442. When the content is stored at the network cache 442, the content is communicated to the intermediate device in step 1922 where it is stored. The intermediate device 16 then communicates the content to the user device in step 1914.

Referring back to step 1920, when the content is not stored at the network cache 442, a content pull request signal 2016 may be generated for the content. In step 1924, the content pull request signal is communicated from the network cache 442 to the origin server such as the cloud distribution system 444. The content is communicated in a content signal from the cloud distribution system 444 to the network cache 442 in step 1926. The network cache 442 communicates and stores the content in the intermediate device in step 1928. However, in between, step 1927 may store the content in the edge server 448. That is, the content signal 2020 may be communicated from the network 442 to the edge cache 448 and then from the edge cache 448 to the intermediate device 16. Likewise, when the content pull request 2014 is generated from the intermediate device 16, it may be communicated to the edge cache and determined whether the content is within the edge cache 448 prior to determining whether the content is in the network cache 442. In step 1930, the intermediate device 16 communicates the content to the user device using the content signal 2022 that is communicated through a local area network. Thus, along the way, the content is cached at various geographic locations within the network. More or fewer levels may be incorporated into the system.

One advantage of the process is that the requested content is cached on demand at multiple tiers of the system. Future requests for this content to the intermediate device (i.e. from other end-user devices in the home/enterprise/venue/etc.) are served by the intermediate device.

The post-positioning of the content in the intermediate device forms post-positioned content that can be followed by pre-positioning of related content at the intermediate device in step 1932. For example, if this post-positioned content is an episode of a show, the system could then pre-position additional episodes of the show (or episodes of another show of the same genre) at the same intermediate device.

The system manages the cache inventory at the intermediate device, based on popularity, what has been viewed by the associated users, etc. This may be performed using the hit determinations described above to determine popularity.

In the above flow, live and/or dormant capacity can be used to deliver the requested content to the intermediate device, even if the user wishes to consume the content live. If the available dormant capacity in the network at the time of delivery of the content provides a delivery throughput that equals or exceeds the playout rate of the video, the system can fulfill the request entirely using dormant capacity. Essentially, the content gets downloaded to the intermediate device at a rate equal to, or faster than, the rate at which the content is being consumed (live) by the end-user device. (For example, if the download rate, using dormant capacity, is twice the playout rate, the entire video gets downloaded to the intermediate device by the time the user has played half the video).

If the available "dormant throughput" is lower than the playout rate, live system capacity will need to be used to deliver the content to the user. In other words, the system contends with other users' flows to deliver the requested content at the required rate.

Figure 21:
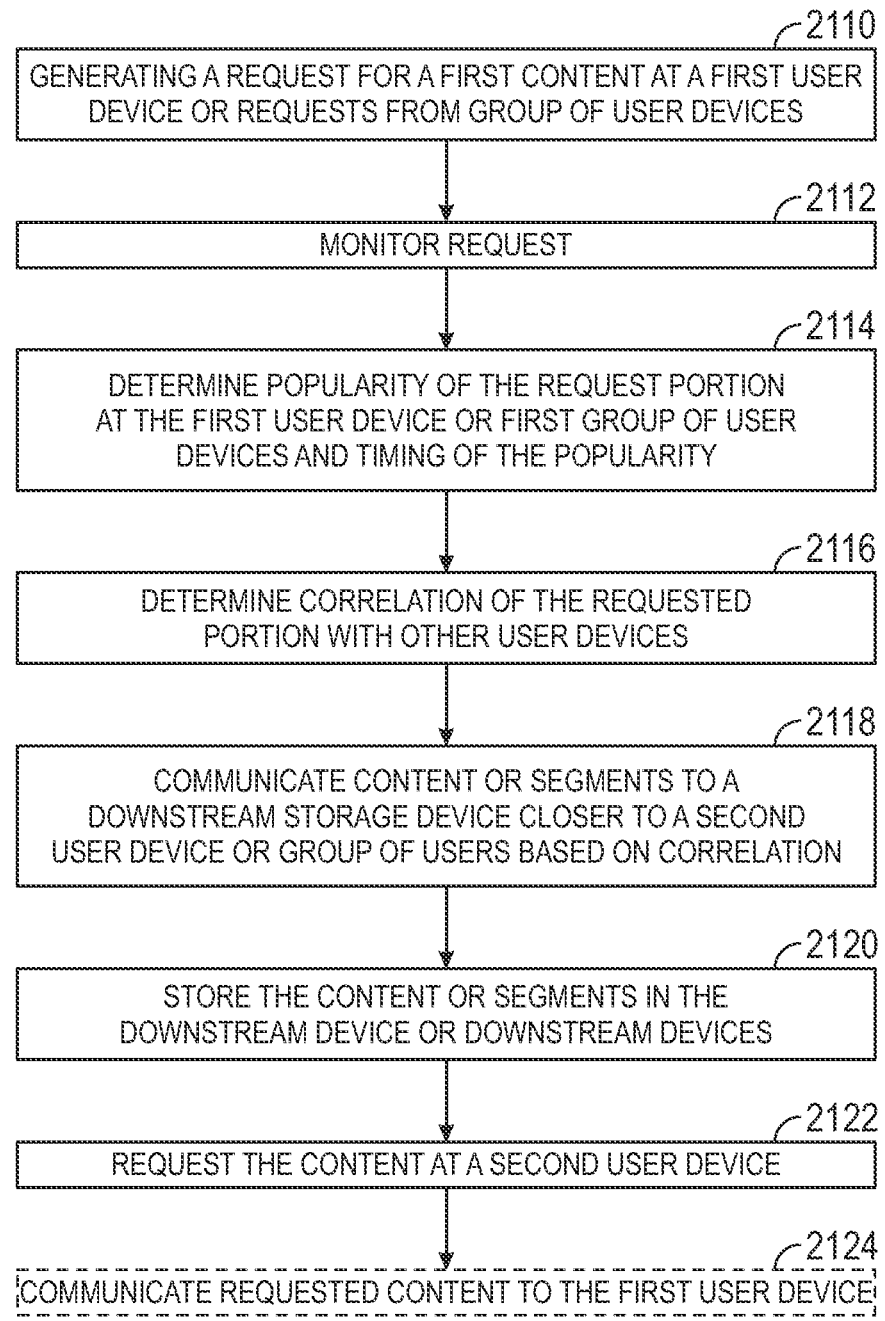
FIG. 21 is a flowchart of a method operating the content distribution system.

Referring now to FIG. 21, a method for communicating content to other devices based upon actions of various users is set forth. In step 2110, a request for a first content is generated at a first user device or at a group of user devices. The request for content may be an initial request for a manifest for a content that has a content identifier or a URL associated therewith. The URL may be an origin server URL. For an initial request, the content distribution system discovers from the first request a presence of the first content within a content distribution network and the uniform resource locator of the first content. Ultimately, the content is communicated to one or more downstream devices based on discovering and various other processing steps. The first content may also be a content segment. That is, the first user device or a group of user devices may generate a request for a particular content segment of a particular content. The content or the segment may be specific to a bit rate. The content requested may be in response to a manifest that is received. A manifest, playlist or folder, as mentioned above, may be received at a user device to indicate the various segments of a particular content. As mentioned above, each of the segments may have one or more bit rate portions or versions that are available to be communicated to each user. In step 2112, the request for the first content is monitored by the content distribution system 10. Request from all over the content distribution system and the user devices therein are monitored. When a content is first requested the content distribution system the URL and the presence of the content within the content distribution system are known. In step 2114, the popularity of the requested portion is monitored and corresponded to a first user device or a group of user devices. That is, the request or a demand for the requested portion in step 2110 has its popularity determined by the content distribution system 10. The timing of the popularity is also determined in step 2114. That is, the popularity is correlated with a time so that over time the trend of popularity may be determined. As the trend is higher, the popularity increases and the need to preposition the content may be evident. In step 2116, the popularity of the requested portion may be correlated with other user devices in the system. User devices have profiles associated with them and therefore the likes and tendencies of the various users is known. When the correlation of popular content is determined, step 2118 communicates the content or the content segments to a downstream storage device that is closer to a second user or a second group of users that have a profile that correlates with the content. That is, the correlating step in 2116 correlates the content or the users of the content with the second user device or a second group of user devices. In step 2120, the content or the content segments are communicated to downstream devices closer to the second user device or a second group of user devices. As illustrated in FIG. 5, various network paths or arms are associated with the content distribution system. The content may therefore be placed at various downstream devices. The downstream devices, as mentioned above, may be network caches that are closer to each user. The downstream devices may or may not include the intermediate devices. The content may be also communicated to intermediate devices as well as to other downstream devices. In step 2122, the content may be requested at a second user device or one of the second group of user devices. The content is communicated from the closest location, such as an intermediate device, or one of the other downstream devices to which the content has been downloaded. It should be noted that the various segments that are communicated may be bit rate specific. That is, various bit versions of the content segments may be communicated and not other segments. This is based upon the popularity or the demand for the content. It should be noted that the request for the content may be communicated to the first user device in step 2124. However, this is an optional step in that the content may not actually be communicated to the first user device based upon the request. For example, a manifest may be requested but the content may not be communicated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating a first request for first content by a first user device in a first branch of a plurality of branches of a content distribution system, said first branch comprising a first network cache, a first edge cache and a first intermediate device;

discovering from the first request a presence of the first content within a content distribution network and a uniform resource locator of the first content at a DNS module;

determining a content priority of the first content;

communicating the first content to the first user device through the first branch and the first edge cache;

based on the first request for the first content, discovering the presence of the first content, the uniform resource locator of the first content and the content priority of the first content at a second user device in a second branch different than the first branch, said second user device different than the first user device, said second branch comprising a second edge cache coupled to a second intermediate device and coupled to a second network cache, pre-positioning the first content by, communicating the first content to the second branch comprising the second intermediate device closer to the second user device through the second edge cache and the second network cache without communicating the first content to the first user device using the second intermediate device; and storing the first content in the second intermediate device as pre-positioned content; and communicating the first content to the second user device from the second intermediate device.

2. The method of claim 1 wherein communicating the first content to the second user device from the second intermediate device comprises communicating in response to the second user device generating a second request.

3. The method of claim 1 wherein communicating the first content to the second intermediate device comprises communicating the first content to the second intermediate device closer to the second user device using dormant capacity.

4. The method of claim 1 wherein communicating the first content to the second intermediate device comprises communicating the first content to an intermediate storage device using dormant capacity.

5. The method of claim 1 wherein communicating the first content to the second intermediate device comprises communicating the first content to a plurality of intermediate storage devices at least one of which is closer to the second user device.

6. The method of claim 1 wherein communicating the first content to the second intermediate device comprises communicating the first content to a plurality of intermediate storage devices at least one of which is closer to the second user device using dormant capacity.

7. The method of claim 1 wherein communicating the first content to the second intermediate device comprises communicating the first content to a plurality of downstream storage devices closer to a plurality of user devices including the second user device.

8. The method of claim 1 wherein communicating the first content to the second intermediate device comprises communicating the first content to a plurality of downstream storage devices closer to a plurality of user devices including the second user device using dormant capacity.

9. The method of claim 1 wherein communicating the first content to the second intermediate device comprises communicating the first content to a plurality of downstream storage devices closer to a plurality of user devices including the second user device and communicating the first content to an intermediate device closer to the second user device.

10. The method of claim 1 wherein communicating the first content to the second intermediate device comprises communicating the first content to a plurality of downstream storage devices closer to a plurality of user devices including the second user device and communicating the first content to a plurality of intermediate devices at least one of which is closer to the second user device.

11. The method of claim 1 wherein communicating the first content to the second intermediate device comprises communicating the first content to a plurality of downstream storage devices closer to a plurality of user devices including the second user device using dormant capacity and communicating the first content to an intermediate device closer to the second user device using the dormant capacity.

12. The method of claim 1 wherein communicating the first content to the second intermediate device comprises communicating the first content to a plurality of downstream storage devices closer to a plurality of user devices including the second user device using dormant capacity and communicating the first content to a plurality of intermediate devices at least one of which is closer to the second user device using the dormant capacity.

13. The method of claim 1 wherein communicating the first content to the second intermediate device comprises communicating the first content to a plurality of downstream storage devices closer to a plurality of user devices including the second user device using broadcasting.

14. The method of claim 1 wherein communicating the first content to the second intermediate device comprises communicating the first content to a plurality of downstream storage devices closer to a plurality of user devices including the second user device using unicasting.

15. The method of claim 1 wherein communicating the first content to the second intermediate device comprises communicating the first content to a plurality of downstream storage devices closer to a plurality of user devices including the second user device using broadcasting and unicasting.

16. The method of claim 1 wherein communicating the first content to the second intermediate device comprises communicating the first content to a plurality of downstream storage devices closer to a plurality of user devices including the second user device using broadcasting, unicasting or both based on the content priority.

17. The method of claim 1 wherein determining the content priority for the first content is based on at least one of a wish list or a content timeliness indicator.

18. The method of claim 1 wherein determining the content priority is based on at least one of content popularity, a likelihood of content consumption, consumption profiles, and viewing patterns of a plurality of devices in a service area.

19. The method of claim 1 wherein communicating the first content to the second intermediate device comprises communicating the first content to a plurality of downstream storage devices closer to a plurality of user devices including the second user device using broadcasting, unicasting or both based on radio conditions at the downstream storage devices.

20. The method of claim 1 wherein communicating the first content to the second intermediate device comprises communicating the first content to a plurality of downstream storage devices closer to a plurality of user devices including the second user device using broadcasting, unicasting or both based on available network capacity available for pre-positioning.

21. The method of claim 1 further comprising determining from the first request for the first content based on an origin uniform resource locator of the first content.

22. The method of claim 1 wherein the first content comprises at least one of a manifest file, a folder, a playlist or a set of manifests.

23. The method of claim 1 further comprising determining from the first request for the first content, second content different than the first content based on the first content, and pre-positioning the second content by, communicating the second content to the second intermediate device closer to the second user device, storing the second content in the second intermediate device as pre-positioned content, and communicating the second content to the second user device from the second intermediate device.

24. The method of claim 23 wherein the second content comprises at least one of a manifest file, a folder, a playlist and a set of manifests.

25. The method of claim 1 further comprising determining a second content from an origin uniform resource locator of the first content, and thereafter pre-positioning the second content by communicating the second content to the second intermediate device closer to the second user device, storing the second content in the second intermediate device as pre-positioned content, and communicating the second content to the second user device from the second intermediate device.

26. The method of claim 1 further comprising determining a second content from the first request for the first content, said first content comprises the second content, and pre-positioning the second content by, communicating the second content to the second intermediate device closer to the second user device, storing the second content in the second intermediate device as pre-positioned content, and communicating the second content to the second user device from the second intermediate device.

27. The method of claim 1 further comprising determining a second content from the first request for the first content, said second content comprising the first content, and further comprising pre-positioning the second content by communicating the second content to the second intermediate device closer to the second user device, storing the second content in the second intermediate device as pre-positioned content, and communicating the second content to the second user device from the second intermediate device.

28. The method of claim 27 wherein the first content is less than 10 percent of the second content.

29. The method of claim 27 wherein the first content are first bytes of the second content.

30. The method of claim 1 further comprising determining a plurality of content segments in the first content and URL identifiers for each segment of the plurality of content segments from the first request for the first content, and thereafter pre-positioning at least one of the plurality of content segments based on the URL identifiers by communicating the at least one of the plurality of content segments to the second intermediate device closer to the second user device, storing the at least one of plurality of content segments in the second intermediate device as pre-positioned content, and communicating the at least one of the plurality of content segments to the second user device from the second intermediate device.

31. The method of claim 1 wherein communicating the first content to the second intermediate device comprises communicating the first content to the second edge cache disposed in a base station, a cell tower or a wireless network system component.

32. The method of claim 1 further comprising determining a second content from the first content, said second content related to the first content, and thereafter pre-positioning the second content by, communicating the second content to the second intermediate device closer to the second user device, storing the second content in the second intermediate device as pre-positioned content, and communicating the second content to the second user device from the second intermediate device.

33. The method of claim 32 wherein determining the second content comprises determining the second content using collaborative filtering.

34. The method of claim 32 wherein after communicating the first content to the second intermediate device, communicating the second content to the second intermediate device based on the first content.

35. The method of claim 1 wherein determining the content priority comprises determining a popularity of the first content and communicating the first content to the second intermediate device in response to the popularity.

36. The method of claim 35 wherein determining the popularity of the first content comprises comparing a request rate for the first content from a second request or a plurality of further requests to a first threshold and, when the request rate is greater than the first threshold, communicating the first content to the second intermediate device.

37. The method of claim 35 wherein determining the content priority comprises determining the popularity of the first content comprises learning of the popularity of the first content from a content provider system or an external source.

38. The method of claim 35 wherein determining the content priority comprises determining the popularity of the first content comprises learning of a timeliness of the popularity of the first content from a content provider system or an external source.

39. The method of claim 35 wherein determining the content priority comprises determining the popularity of the first content comprises comparing a request rate for the first content from a plurality of requests at an edge cache to a request rate threshold and, when the request rate to the edge cache is greater than the request rate threshold, communicating the first content to the second intermediate device.

40. The method of claim 35 wherein determining the content priority comprises determining the popularity of the first content comprises combining at least two of a network cache request rate for the first content and a plurality of edge cache request rates for the first content, to form a blended request rate for the first content and comparing the blended request rate to a request rate threshold and, when the blended request rate is greater than the request rate threshold, communicating the first content to the second intermediate device.

41. The method of claim 35 wherein determining the content priority comprises determining the popularity of the first content comprises comparing a downstream storage device request rate for a plurality of downstream storage devices to a second threshold and, when the downstream storage device request rate is greater the second threshold, communicating the first content to the second intermediate device.

42. The method of claim 35 wherein determining the content priority comprises determining the popularity of the first content comprises comparing a consumption rate for the first content from the first user device to a consumption rate threshold and, when the consumption rate is greater the consumption rate threshold, communicating the first content to the second intermediate device.

43. The method of claim 35 further comprising determining a past history change value and wherein determining the content priority comprises determining the popularity of the first content comprises comparing the past history change value to a past history change threshold and, when the past history change value is less than the past history change threshold, communicating the first content to the second intermediate device.

44. The method of claim 35 wherein determining the content priority comprises determining the popularity of the first content and timing of the popularity and communicating the first content to the second intermediate device in response to a popularity and a timing of the popularity.

45. The method of claim 35 wherein determining the content priority comprises determining the popularity for the first content within a first group of devices and communicating the first content to downstream storage devices closer to a second group of devices based on collaborative filtering of the second group of devices based on a plurality of requests for the first content from the first group of devices.

46. The method of claim 1 further comprising determining a demand for the first content within a first group of devices and communicating the first content to downstream storage devices closer to a second group of devices in response to the demand for the first content within the first group of devices and a timing of the demand.

47. The method of claim 1 wherein determining content priority comprises determining a popularity of first content segments of the first content at the first user device or within a first group of devices and wherein communicating the first content to the second intermediate device comprises communicating second content segments of the first content to downstream storage devices closer to a second group of devices in response to the popularity of the first content segments within the first user device or the first group of devices.

48. The method of claim 47 further comprising pre-positioning the first content in downstream storage devices closer to the first user device or the first group of user devices with second content segments in response to the popularity of the first content segments within the first user device or the first group of devices.

49. The method of claim 1 wherein determining content priority comprises determining a popularity of first content segments of the first content at the first user device or within a first group of devices and wherein communicating the first content to the second intermediate device comprises communicating second content segments of the first content to downstream storage devices closer to a second group of devices in response to the popularity and a timing of the popularity of the first content segments within the first group of devices.

50. The method of claim 49 further comprising pre-positioning the first content in downstream storage devices closer to the first user device or the first group of user devices with the second content segments in response to the timing of the popularity of the first content segments within the first user device or the first group of devices.

51. The method of claim 1 wherein determining content priority comprises determining a popularity of first content at the first user device or within a first group of devices and further comprising communicating second content to the second intermediate device closer to a second group of devices in response to the popularity of the first content within the first user device or the first group of devices.

52. The method of claim 51 further comprising pre-positioning the second content in downstream storage devices closer to the first user device or the first group of user devices in response to the popularity of the first content within the first user device or the first group of devices.

53. The method of claim 1 wherein determining content priority comprises determining a popularity of first content at the first user device or within a first group of devices and further comprising communicating second content to the second intermediate device closer to a second group of devices in response to a timing of the popularity of the first content within the first group of devices.

54. The method of claim 53 further comprising pre-positioning the first content in downstream storage devices closer to the first user device or the first group of user devices with the second content in response to the timing of the popularity of the first content within the first user device or the first group of devices.

55. The method of claim 1 wherein determining content priority comprises determining a popularity of live content watched by a first group of user devices as individual streams and communicating the live content to the second user device or a plurality of user devices based on popularity and collaborative filtering.

56. The method of claim 55 further comprising determining a popularity of live content watched by a first group of user devices as individual streams and communicating the live content to the second user device or a plurality of user devices comprising comparing a number of users in the first group and based on a threshold of group of users and anticipated users, establishing a broadcast session.

57. A system comprising: a first user device in a first branch of a content distribution system generating a first request for first content, said first branch comprising a first edge cache coupled to a first network cache and a first intermediate device;
 a DNS module discovering from the first request a presence of the first content within a content distribution network and a uniform resource locator of the first content;
 in the content distribution system, determining a content priority of the first content;
 said content distribution system, communicating the first content to the first user device through the first branch and the first edge cache;
 a second user device in a second branch comprising a second edge cache coupled to a second intermediate device and a second network cache, said second user device different than the first user device; and
 based on the first request for the first content, the DNS module discovering the presence of the first content, the uniform resource locator of the first content and the content priority of the first content at the second user device, said content distribution system programmed to pre-position the first content by being programmed to communicate the first content to the second branch comprising the second intermediate device closer to a second user device through the second edge cache and the second network cache without communicating the first content to the first user device using the second intermediate device; and
 store the first content in the second intermediate device as pre-positioned content; and
 said content distribution system programmed to communicate the first content to the second user device from the second intermediate device.

58. The system of claim 57 wherein the content distribution system is programmed to communicate the first content to the second user device in response to the second user device generating a second request.

59. The system of claim 57 wherein the content distribution system is programmed to communicate the first content to the second intermediate device closer to the second user device using dormant capacity.

60. The system of claim 57 wherein the content distribution system is programmed to communicate the first content to an intermediate storage device.

61. The system of claim 57 wherein the content distribution system is programmed to communicate the first content to an intermediate storage device using dormant capacity.

62. The system of claim 57 wherein the content distribution system is programmed to communicate the first content to a plurality of intermediate storage devices at least one of which is closer to the second user device.

63. The system of claim 57 wherein the content distribution system is programmed to communicate the first content to a plurality of intermediate storage devices at least one of which is closer to the second user device using dormant capacity.

64. The system of claim 57 wherein the content distribution system is programmed to communicate the first content to a plurality of downstream storage devices closer to a plurality of user devices including the second user device.

65. The system of claim 57 wherein the content distribution system is programmed to communicate the first content to a plurality of downstream storage devices closer to a plurality of user devices including the second user device using dormant capacity.

66. The system of claim 57 wherein the content distribution system is programmed to communicate the first content to a plurality of downstream storage devices closer to a plurality of user devices including the second user device and communicate the first content to an intermediate device closer to the second user device.

67. The system of claim 57 wherein the content distribution system is programmed to communicate the first content to a plurality of downstream storage devices closer to a plurality of user devices including the second user device and programmed to communicate the first content to a plurality of intermediate devices at least one of which is closer to the second user device.

68. The system of claim 57 wherein the content distribution system is programmed to communicate the first content to a plurality of downstream storage devices closer to a plurality of user devices including the second user device using dormant capacity and programmed to communicate the first content to an intermediate device closer to the second user device using the dormant capacity.

69. The system of claim 57 wherein the content distribution system is programmed to communicate the first content to a plurality of downstream storage devices closer to a plurality of user devices including the second user device using dormant capacity and programmed to communicate the first content to a plurality of intermediate devices at least one of which is closer to the second user device using the dormant capacity.

70. The system of claim 57 wherein the content distribution system is programmed to communicate the first content to a plurality of downstream storage devices closer to a plurality of user devices including the second user device using broadcasting.

71. The system of claim 57 wherein the content distribution system is programmed to communicate the first content to a plurality of downstream storage devices closer to a plurality of user devices including the second user device using unicasting.

72. The system of claim 57 wherein the content distribution system is programmed to communicate the first content to a plurality of downstream storage devices closer to a plurality of user devices including the second user device using broadcasting and unicasting.

73. The system of claim 57 wherein the content distribution system is programmed to communicate the first content to a plurality of downstream storage devices closer to a plurality of user devices including the second user device using broadcasting, unicasting or both based on the content priority.

74. The system of claim 73 wherein the content distribution system is programmed to determine the content priority for the first content based on at least one of a wish list or a content timeliness indicator.

75. The system of claim 73 wherein the content distribution system is programmed to determine the content priority based on at least one of content popularity, a likelihood of content consumption, consumption profiles, and viewing patterns of a plurality of devices in a service area.

76. The system of claim 57 wherein the content distribution system is programmed to communicate the first content to a plurality of downstream storage devices closer to a plurality of user devices including the second user device using broadcasting, unicasting or both based on radio conditions at the downstream storage devices.

77. The system of claim 57 wherein the content distribution system is programmed to communicate the first content to a plurality of downstream storage devices closer to a plurality of user devices including the second user device using broadcasting, unicasting or both based on available network capacity available for pre-positioning.

78. The system of claim 57 wherein the content distribution system is programmed to determine from the first request for the first content an origin uniform resource locator of the first content.

79. The system of claim 57 wherein the first content comprises at least one of a manifest file, a folder, a playlist or a set of manifests.

80. The system of claim 57 wherein the content distribution system is programmed to determine from the first request for the first content, second content based on the first content, and programmed to pre-position the second content by being programmed to, communicate the second content to the second intermediate device closer to the second user device, store the second content in the second intermediate device as pre-positioned content, and communicate the second content to the second user device from the second intermediate device.

81. The system of claim 80 wherein the second content comprises at least one of a manifest file, a folder, a playlist and a set of manifests.

82. The system of claim 57 wherein the content distribution system is programmed to determine a second content from an origin uniform resource locator of the first content, and programmed to pre-position the second content by being programmed to communicate the second content to the second intermediate device closer to the second user device, store the second content in the second intermediate device as pre-positioned content, and communicate the second content to the second user device from the second intermediate device.

83. The system of claim 57 wherein the content distribution system is programmed to determine a second content from the first request for the first content, said first content comprises the second content, and programmed to pre-position the second content by being programmed to communicate the second content to the second intermediate device closer to the second user device, store the second content in the downstream storage device as pre-positioned content, and communicate the second content to the second user device from the second intermediate device.

84. The system of claim 57 wherein the content distribution system is programmed to determine a second content from the first request for the first content, said second content comprising the first content, and programmed to pre-position the second content by being programmed to communicate the second content to the downstream storage device closer to the second user device, store the second content in the second intermediate device as pre-positioned content, and communicate the second content to the second user device from the second intermediate device.

85. The system of claim 84 wherein the first content is less than 10 percent of the second content.

86. The system of claim 84 wherein the first content are first bytes of the second content.

87. The system of claim 57 wherein the content distribution system is programmed to determine a plurality of content segments in the first content and URL identifiers for each segment of the plurality of content segments from the first request for the first content, and programmed to pre-position at least one of the plurality of content segments based on the URL identifiers by being programmed to communicate the at least one of the plurality of content segments to the second intermediate device closer to the second user device, store the at least one of the plurality of content segments in the second intermediate device as pre-positioned content, and communicate the at least one of plurality of content segments to the second user device from the second intermediate device.

88. The system of claim 57 wherein the content distribution system is programmed to communicate the first content to an edge cache.

89. The system of claim 57 wherein the content distribution system is programmed to communicate the first content to an edge cache disposed in a base station, a cell tower or a wireless network system component.

90. The system of claim 57 wherein the content distribution system is programmed to determine a second content from the first content, said second content related to the first content, and programmed to pre-positioning the second content by being programmed to communicate the second content to the second intermediate device closer to the second user device, store the second content in the second intermediate device as pre-positioned content, and communicate the second content to the second user device from the second intermediate device.

91. The system of claim 90 wherein the content distribution system is programmed to determine the second content using collaborative filtering.

92. The system of claim 90 wherein the content distribution system is programmed to communicate the second content to the second intermediate device based on the first content after communicating the first content to the second intermediate device.

93. The system of claim 57 wherein the content distribution system is programmed to determine a popularity of the first content based on the content priority and communicate the first content to the second intermediate device in response to the popularity.

94. The system of claim 93 wherein the content distribution system is programmed to determine the popularity of the first content by comparing a request rate for the first content from a second request or a plurality of further requests to a first threshold and programmed to communicating the first content to the second intermediate device.

95. The system of claim 93 wherein the content distribution system is programmed to determine the popularity of the first content by learning of the popularity of the first content from a content provider system or an external source.

96. The system of claim 93 wherein the content distribution system is programmed to determine the popularity of the first content by learning of a timeliness of the popularity of the first content from a content provider system or an external source.

97. The system of claim 93 wherein the content distribution system is programmed to determine the popularity of the first content by comparing a request rate for the first content from a plurality of requests at an edge cache to a request rate threshold and, communicate the first content to the second intermediate device when the request rate to the edge cache is greater than the request rate threshold.

98. The system of claim 93 wherein the content distribution system is programmed to determine the popularity of the first content by being programmed to combine at least two of a network cache request rate for the first content and a plurality of edge cache request rates for the first content, to form a blended request rate for the first content, and compare the blended request rate to a request rate threshold and, communicate the first content to the second intermediate device when the blended request rate is greater than the request rate threshold.

99. The system of claim 93 wherein the content distribution system is programmed to determine the popularity of the first content comprises comparing a downstream storage device request rate for a plurality of downstream storage devices to a second threshold and programmed to communicate the first content to the downstream storage device when the downstream storage device request rate is greater the second threshold.

100. The system of claim 93 wherein the content distribution system is programmed to determine the popularity of the first content by comparing a consumption rate for the first content from the first user device to a consumption rate threshold and, programmed to communicating the first content to the second intermediate device when the consumption rate is greater the consumption rate threshold.

101. The system of claim 93 wherein the content distribution system is programmed to determine a past history change value and programmed to compare the past history change value to a past history change threshold and, programmed to communicate the first content to the second intermediate device when the past history change value is less than the past history change threshold.

102. The system of claim 93 wherein the content distribution system is programmed to determine the popularity of the first content and timing of the popularity and programmed to communicate the first content to the second intermediate device in response to a popularity and a timing of the popularity.

103. The system of claim 93 wherein the content distribution system is programmed to determine the popularity for the first content within a first group of devices and programmed to communicate the first content to downstream storage devices closer to a second group of devices based on collaborative filtering of the second group of devices based on a plurality of requests for the first content from the first group of devices.

104. The system of claim 57 wherein the content distribution system is programmed to determine a demand for the first content within a first group of devices and programmed to communicate the first content to downstream storage devices closer to a second group of devices in response to the demand for the first content within the first group of devices and a timing of the demand.

105. The system of claim 57 wherein the content distribution system is programmed to determine a popularity of first content segments of the first content at the first user device or within a first group of devices based on the content priority and programmed to communicate second content segments of the first content to downstream storage devices closer to a second group of devices in response to the popularity of the first content segments within the first user device or the first group of devices.

106. The system of claim 57 wherein the content distribution system is programmed to pre-position the first content in downstream storage devices closer to the first user device or a first group of user devices with second content segments in response to a popularity of first content segments within the first user device or the first group of devices.

107. The system of claim 57 wherein the content distribution system is programmed to determine a popularity of first content segments of the first content at the first user device or within a first group of devices based on the content priority and programmed to communicate second content segments of the first content to downstream storage devices closer to a second group of devices in response to the popularity and a timing of the popularity of the first content segments within the first group of devices.

108. The system of claim 107 wherein the content distribution system is programmed to pre-position the first content in downstream storage devices closer to the first user device or the first group of user devices with the second content segments in response to the timing of the popularity of the first content segments within the first user device or the first group of devices.

109. The system of claim 57 wherein the content distribution system is programmed to determine a popularity of first content at the first user device or within a first group of devices based on the content priority and programmed to communicate second content to the second intermediate device closer to a second group of devices in response to the popularity of the first content within the first user device or the first group of devices.

110. The system of claim 109 wherein the content distribution system is programmed to pre-position the second content in downstream storage devices closer to the first user device or the first group of user devices in response to the popularity of the first content within the first user device or the first group of devices.

111. The system of claim 57 wherein the content distribution system is programmed to determine a popularity of first content at the first user device or within a first group of devices based on the content priority and further programmed to communicate second content to the second intermediate device closer to a second group of devices in response to a timing of the popularity of the first content within the first group of devices.

112. The system of claim 111 wherein the content distribution system is programmed to pre-position the first content in downstream storage devices closer to the first user device or the first group of user devices with the second content in response to the timing of the popularity of the first content within the first user device or the first group of devices.

113. The system of claim 57 wherein the content distribution system is programmed to determine a popularity of live content watched by a first group of user devices as individual streams based on the content priority and communicating the live content to the second user device or a plurality of user devices based on popularity and collaborative filtering.

114. The system of claim 113 wherein the content distribution system is programmed to determine a popularity of live content watched by a first group of user devices as individual streams and communicate the live content to the second user device or a plurality of user devices by comparing a number of users in the first group and based on a threshold of group of users and anticipated users and programmed to establish a broadcast session.

\* \* \* \* \*